US012544867B1

(12) United States Patent
Sun et al.

(10) Patent No.: US 12,544,867 B1
(45) Date of Patent: Feb. 10, 2026

(54) OPERATION AND MAINTENANCE SYSTEM FOR AIR CONDITIONER PRODUCTION, AND PRODUCTION METHOD

(71) Applicants: QINGDAO HISENSE HITACHI AIR-CONDITIONING SYSTEMS CO., LTD., Shandong (CN); QINGDAO UNIVERSITY OF TECHNOLOGY, Shandong (CN)

(72) Inventors: Xiaohan Sun, Qingdao (CN); He Zhang, Qingdao (CN); Zhigang Zhou, Qingdao (CN); Changhe Li, Qingdao (CN); Hu Li, Qingdao (CN); Yuewen Feng, Qingdao (CN); Junjie Zhuang, Qingdao (CN); Min Yang, Qingdao (CN); Lina Li, Qingdao (CN); Yanbin Zhang, Qingdao (CN); Mingshun Su, Qingdao (CN); Xiao Ma, Qingdao (CN); Wanshuai Xu, Qingdao (CN); Benkai Li, Qingdao (CN)

(73) Assignees: QINGDAO HISENSE HITACHI AIR-CONDITIONING SYSTEMS CO., LTD., Shangdong (CN); QINGDAO UNIVERSITY OF TECHNOLOGY, Shangdong (CN)

( * ) Notice: Subject to any disclaimer, the term of this patent is extended or adjusted under 35 U.S.C. 154(b) by 0 days.

(21) Appl. No.: 19/347,727

(22) Filed: Oct. 2, 2025

(30) Foreign Application Priority Data

Mar. 27, 2025 (CN) .......................... 202510379262.1

(51) Int. Cl.
*B23P 15/26* (2006.01)
*B21D 53/02* (2006.01)
(Continued)

(52) U.S. Cl.
CPC ............ *B23P 15/26* (2013.01); *B21D 53/022* (2013.01); *B23P 21/00* (2013.01); *B23P 23/00* (2013.01);
(Continued)

(58) Field of Classification Search
CPC ........... B23P 15/26; B23P 21/00; B23P 23/00; B21D 53/022; F24F 1/0067; F28D 1/047; F28F 2280/00
See application file for complete search history.

(56) References Cited

U.S. PATENT DOCUMENTS 4,195,540 A * 4/1980 Franks .................... B65H 33/16
198/418.3
4,321,739 A * 3/1982 Martin .................. B21D 53/085
29/726

(Continued)

FOREIGN PATENT DOCUMENTS

CN 114424167 4/2022
CN 117974002 5/2024
(Continued)

*Primary Examiner* — Ryan J. Walters
(74) *Attorney, Agent, or Firm* — JCIPRNET

(57) ABSTRACT

Some embodiments of the present disclosure disclose an operation and maintenance system for air conditioner production and a production method. The operation and maintenance system for air conditioner production includes: a heat exchanger general production system, an indoor unit production system, an outdoor unit production system, a material storage system, a conveying system, a packaging system, and a control system. The control system communicates with the heat exchanger general production system, the indoor unit production system, the outdoor unit production system, the material storage system, the packaging system, and the conveying system.

20 Claims, 29 Drawing Sheets

(51) Int. Cl.
  *B23P 21/00* (2006.01)
  *B23P 23/00* (2006.01)
  *F24F 1/0067* (2019.01)
  *F28D 1/047* (2006.01)

(52) U.S. Cl.
  CPC ............ *F24F 1/0067* (2019.02); *F28D 1/047* (2013.01); *F28F 2280/00* (2013.01)

(56) References Cited

U.S. PATENT DOCUMENTS

| | | | | |
|---|---|---|---|---|
| 4,768,641 | A * | 9/1988 | Hibi | B21D 53/085 |
| | | | | 198/408 |
| 4,898,232 | A * | 2/1990 | Ochiai | F28F 1/32 |
| | | | | 29/890.035 |
| 4,901,414 | A * | 2/1990 | Breda | B23P 15/26 |
| | | | | 29/890.039 |
| 5,934,443 | A * | 8/1999 | Pardi | B23P 15/26 |
| | | | | 198/444 |
| 5,979,041 | A * | 11/1999 | Werner | B23P 19/04 |
| | | | | 29/721 |
| 9,290,333 | B2 * | 3/2016 | Skanse | B65G 47/54 |
| 9,987,673 | B2 * | 6/2018 | Karasawa | B21D 53/022 |
| 2016/0325339 | A1 * | 11/2016 | Karasawa | B21D 28/002 |
| 2021/0285662 | A1 * | 9/2021 | Baba | B21D 53/085 |

FOREIGN PATENT DOCUMENTS

| | | |
|---|---|---|
| CN | 118886664 | 11/2024 |
| CN | 119299489 | 1/2025 |

* cited by examiner

730

OPERATION AND MAINTENANCE SYSTEM FOR AIR CONDITIONER PRODUCTION, AND PRODUCTION METHOD

CROSS-REFERENCE TO RELATED APPLICATION

This application claims the priority benefit of China application serial no. 202510379262.1, filed on Mar. 27, 2025. The entirety of the above-mentioned patent application is hereby incorporated by reference herein and made a part of this specification.

BACKGROUND

Technical Field

Some embodiments of the present disclosure relate to the technical field of air conditioner production systems, in particular to an operation and maintenance system for air conditioner production and a production method.

Description of Related Art

At present, an air conditioner production system includes an indoor unit production line and an outdoor unit production line. The indoor unit production line includes production of an indoor heat exchanger, and the outdoor unit production line includes production of an outdoor heat exchanger. The indoor unit production line and the outdoor unit production line are respectively provided with indoor heat exchanger and outdoor heat exchanger production units, resulting in large spatial layout and high layout cost of the production system.

SUMMARY

Some embodiments of the present disclosure provide an operation and maintenance system for air conditioner production, and the system includes:
 a heat exchanger general production system, including:
 an indoor heat exchanger fin production unit, configured to produce an indoor heat exchanger fin;
 an outdoor heat exchanger fin production unit, configured to produce an outdoor heat exchanger fin;
 a plurality of heat exchanger general production units, configured to use the outdoor heat exchanger fin and a heat exchanger material to produce an unbent outdoor heat exchanger, and to use the indoor heat exchanger fin and a heat exchanger material to produce an indoor heat exchanger;
 an indoor unit production system, including a plurality of indoor unit production units configured to use the indoor heat exchanger and an indoor unit material to produce an indoor unit;
 a bending unit, configured to bend the unbent outdoor heat exchanger into an outdoor heat exchanger;
 an outdoor unit production system, including a plurality of outdoor unit production units configured to use the outdoor heat exchanger and an outdoor unit material to produce an outdoor unit;
 a material storage system, configured to store the heat exchanger material, the indoor unit material, and the outdoor unit material;
 a packaging system, configured to receive and package the indoor unit and the outdoor unit;
 a conveying system, configured to convey the heat exchanger material to the heat exchanger general production system, convey the indoor unit material to the indoor unit production system, convey the outdoor unit material to the outdoor unit production system, and convey a packaging material and the indoor unit and the outdoor unit to the packaging system, and including a crane system, the crane system includes:
 a track, part of which is positioned above the heat exchanger general production system, the indoor unit production system, the outdoor unit production system, and the material storage system;
 a crane, located on the track, the crane including a grasping device and a position sensing device;
 a control system, communicating with the heat exchanger general production system, the indoor unit production system, the outdoor unit production system, the material storage system, the packaging system, and the conveying system; the control system being configured to control the conveying system to convey materials, control the indoor heat exchanger fin production unit and the general production units to produce the indoor heat exchanger, and the indoor unit production system to use the indoor heat exchanger and the indoor unit material to produce the indoor unit, control the outdoor heat exchanger fin production unit, the general production units, and the bending unit to produce the outdoor heat exchanger, and the outdoor unit production system to use the outdoor heat exchanger and the outdoor unit material to produce the outdoor unit, and control the packaging system to package the material and the indoor unit and the outdoor unit;
 wherein the indoor unit production system and the outdoor unit production system are arranged side by side between the heat exchanger general production system and the material storage system;
 wherein the track includes:
 a crane standby track section;
 a material track section, located above the material storage system;
 a heat exchanger track section, located above the heat exchanger general production system;
 an indoor unit track section, located above the indoor unit production system;
 an outdoor unit track section, located above the outdoor unit production system;
 a packaging track section, located above the packaging system;
 a first track section, connecting the material track section and the heat exchanger track section, the first track section being located between the indoor unit track section and the outdoor unit track section;
 a second track section, connecting the heat exchanger track section and the indoor unit track section;
 a third track section, connecting the first track section and the indoor unit track section;
 a fourth track section, connecting the indoor unit track section and the crane standby track section;
 a fifth track section, connecting the first track section and the outdoor unit track section;
 a sixth track section, connecting the packaging track section and the crane standby track section; and
 a seventh track section, connecting the material track section and the packaging system track section;
 wherein the crane is configured to run to the material track section to grasp the heat exchanger material, pass through the first track section and arrive at the heat exchanger track section and release the heat exchanger material to the heat exchanger general production system, and then pass through the second track section and the indoor unit track section and arrive at the fourth track section;

wherein the crane is configured to run to the material track section to grasp the indoor unit material, pass through the first track section and the third track section and arrive at the indoor unit track section and release the indoor unit material to the indoor unit production system, and then arrive at the fourth track section;

wherein the crane is configured to run to the material track section to grasp the outdoor unit material, pass through the first track section and the fifth track section and arrive at the outdoor unit track section and release the outdoor unit material to the outdoor unit production system, and then arrive at the sixth track section;

wherein the material storage system is configured to store the packaging material;

wherein the packaging system is located below the sixth track section of the conveying system, and the material track section and the sixth track section are connected through the seventh track section;

wherein the crane of the conveying system is configured to run to the material track section to grasp the packaging material, release the packaging material to the packaging system when arriving at a position above the packaging system after passing through the seventh track section, and then pass through the sixth track section and arrive at the crane standby track section.

Some embodiments of the present disclosure provide a production method of an operation and maintenance system for air conditioner production.

acquiring air conditioner demand information;

determining a production flow according to the air conditioner demand information; and controlling working states of the heat exchanger general production system, the indoor unit production system, and the outdoor unit production system according to the production flow; when producing the outdoor unit in the production flow, controlling the outdoor heat exchanger fin production unit, the general production units, and the bending unit to produce the outdoor heat exchanger, and controlling the outdoor unit production system to produce the outdoor unit; when producing the indoor unit in the production flow, controlling the indoor heat exchanger fin production unit and the general production units to produce the indoor heat exchanger, and controlling the indoor unit production system to produce the indoor unit;

wherein, a required number of indoor units and a required number of outdoor units corresponding to an air conditioner model to be produced are determined according to the air conditioner demand information, and a number n of indoor heat exchangers to be continuously produced is determined, which includes:

controlling the heat exchanger general production system to first produce an outdoor heat exchanger to the outdoor unit production system, and then produce n indoor heat exchangers to the indoor unit production system;

when the number of the indoor units reaches the required number of indoor units and the number of the outdoor units does not reach the required number of outdoor units, changing the production flow to controlling the heat exchanger general production system to produce the outdoor heat exchanger to the outdoor unit production system;

when the number of the outdoor units reaches the required number of outdoor units and the number of the indoor units does not reach the required number of indoor units, changing the production flow to controlling the heat exchanger general production system to produce the indoor unit heat exchanger to the indoor unit production system, wherein n is a natural number;

wherein the determining the number n of indoor heat exchangers to be continuously produced includes:

determining a time t3 for producing the indoor units and a time t4 for producing the outdoor units according to the air conditioner model to be produced, and determining the n by dividing the time t4 for the outdoor units by the time t3 for the indoor units and then performing rounding; or determining the number n of indoor heat exchangers to be continuously produced as being a number n of the indoor units included in one set of air conditioner system;

wherein, when the production flow is to produce an outdoor heat exchanger, the outdoor heat exchanger fin production unit is controlled to produce an outdoor heat exchanger fin, a pipe bending unit of the general production units cuts a tube through a first cutting station, an operating frequency of a pipe expansion unit of the general production units is a first frequency, and the bending unit bends the unbent outdoor heat exchanger;

when the production flow is to produce an indoor heat exchanger, the indoor heat exchanger fin production unit is controlled to produce an indoor heat exchanger fin, the pipe bending unit of the general production units cuts a tube through a second cutting station, the operating frequency of the pipe expansion unit of the general production units is a second frequency, and the bending unit do not work;

wherein the second frequency is less than the first frequency;

wherein the acquiring the air conditioner demand information includes:

acquiring an order, and acquiring the air conditioner demand information according to the order;

and/or, predicting air conditioner demand information for a future time period based on historical data;

wherein, the crane of the conveying system identifies a storage position of a material and loads the material;

the crane identifies a position of a target unit shelf, and transfers a material to the target unit shelf;

a material quantity on the unit shelf is detected, and the conveying system is controlled to convey a material when the material quantity is lower than a threshold;

wherein when a detection result of a detection unit is unqualified, the conveying system conveys materials before the detection unit and re-produces the material before the detection unit, includes:

detecting, by a detection unit, components within the production system;

when the detection unit detects an unqualified product, outputting the unqualified product from the production flow through the unqualified conveyor line, and transmitting unqualification information to the control system;

in response to the unqualification information, the control system instructing the conveying system to supplement production materials for an upstream process associated with the detection unit; and after a planned production number of the current production flow is finished, starting a supplementary production flow to re-produce components corresponding to the unqualified components by using the supplemented production materials;

wherein the conveying system transmits the conveyed material information to the control system;

an end plate information creating unit of the heat exchanger general production system uses a unique identification of each end plate to form end plate information and create the end plate information onto the end plate; the control system acquires the end plate information;

a support plate information creating unit of the indoor unit production system or the outdoor unit production system forms a unique identification of each support plate as support plate information and create the support plate information onto the support plate; the control system acquires the support plate information;

the control system associates the end plate information, the support plate information and the conveyed material information, and records production product information and production process information;

wherein the control system transmits the conveyed material information to an end plate information creating unit, and the end plate information creating unit uses the material information and a unique identification of each end plate to from end plate information and create the end plate information onto the end plate;

wherein operation state information of an equipment of the production unit is detected;

an equipment failure is determined or predicted according to the operation state information;

wherein a unit lighting equipment of the production unit is controlled to be in a normally-off state; and when the equipment failure of the production unit is determined or predicted, the unit lighting equipment corresponding to the production unit is controlled to light up.

BRIEF DESCRIPTION OF THE DRAWINGS

In order to illustrate the technical solutions in some embodiments of the present disclosure or the prior art more clearly, the accompanying drawings used in the embodiments or the prior art description will be briefly described below. Obviously, the drawings in the following description are some embodiments of the present disclosure, for those of ordinary skill in the art, other drawings can be obtained according to these drawings without any creative efforts.

DESCRIPTION OF THE EMBODIMENTS

Figure 1:
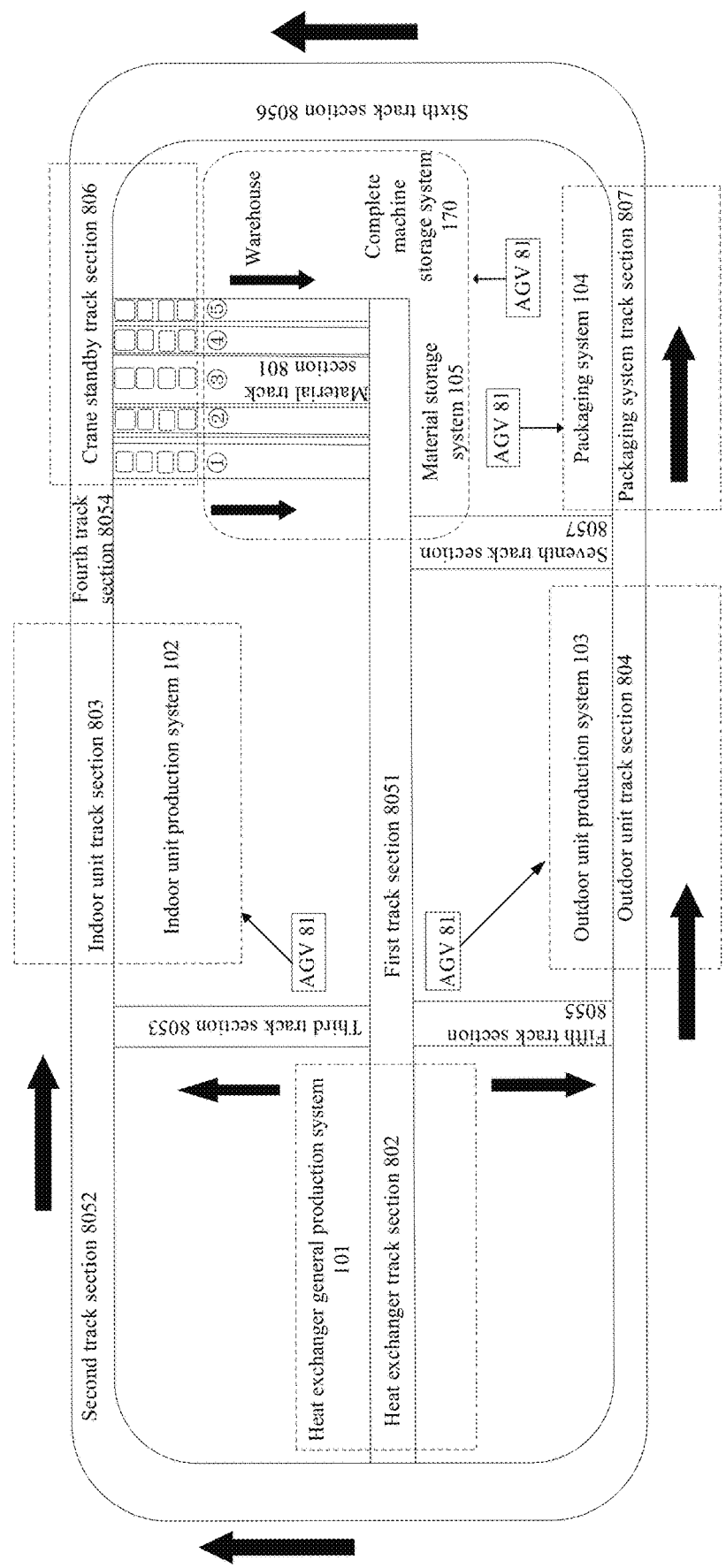
FIG. 1 is a schematic diagram of a layout of an operation and maintenance system for air conditioner production provided by some embodiments of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. All other embodiments obtained by a person of ordinary skill in the art based on the embodiments in the present disclosure without creative efforts are within the protection scope of the present disclosure.

In the description of the present disclosure, it should be understood that orientation or position relationships that are indicated by the terms "center", "above", "front", "rear" "under", "left", "right", "vertical", "horizontal", "top", "bottom", "inside", and "outside", and the like are orientation or position relationships shown based on the accompany drawings, and are merely for convenience of the description of the present disclosure and simplifying description, rather than indicating or implying that the indicated appliance or element must have a particular orientation or being constructed and operated in a particular orientation, and are therefore not to be construed as limitation of the present disclosure.

The terms "first" and "second" are used for purposes of description only, and cannot be understood to indicate or imply relative importance or implicitly indicate the number of technical features indicated. Therefore, the features defined by "first" and "second" may explicitly or implicitly include one or more of the features. In the descriptions of the present disclosure, unless otherwise stated, "a plurality of" means two or more.

In the descriptions of the present disclosure, it should be noted that, unless otherwise clearly specified and limited, the terms "mounted", "connected with each other", "connected" should be understood in a broad sense, for example, it can be a fixed connection or a detachable connection, or an integrated connection; it may be mechanical connection or electrical connection; it may be directly connected, or may be indirectly connected through an intermediary, it may be the internal communication between two elements. Those of ordinary skill in the art can understand the specific meanings of the above terms in the present disclosure according to specific situations.

In some embodiments of the present disclosure, unless otherwise clearly specified and defined, the first feature "above" or "under" the second feature may include the first feature and the second feature in direct contact, or the first feature and the second feature not in direct contact but through the contact of other features between them. Moreover, the first feature is "on top of", "above" and "on" the second feature include that the first feature is directly above and obliquely above the second feature, or simply means that the first feature is higher in level than the second feature. The first feature is "at the bottom of", "below", and "under" the second feature include that the first feature is directly below an obliquely below the second feature, or simply means that the level height of the first feature is less than the second feature.

The following disclosure provides many different embodiments or examples for implementing different structures of some embodiments of the present disclosure. In order to simplify the disclosure of some embodiments of the present disclosure, the components and settings of specific examples are described below. Of course, they are only examples and are not intended to limit some embodiments of the present disclosure. In addition, some embodiments of the present disclosure may repeat reference numerals and/or reference letters in different examples, and this repetition is for the purpose of simplification and clarity, and does not indicate the relationship between the various embodiments and/or settings discussed. In addition, some embodiments of the present disclosure provide examples of various specific processes and materials, but those of ordinary skill in the art can be aware of applications of other processes and/or uses of other materials.

Figure 2:
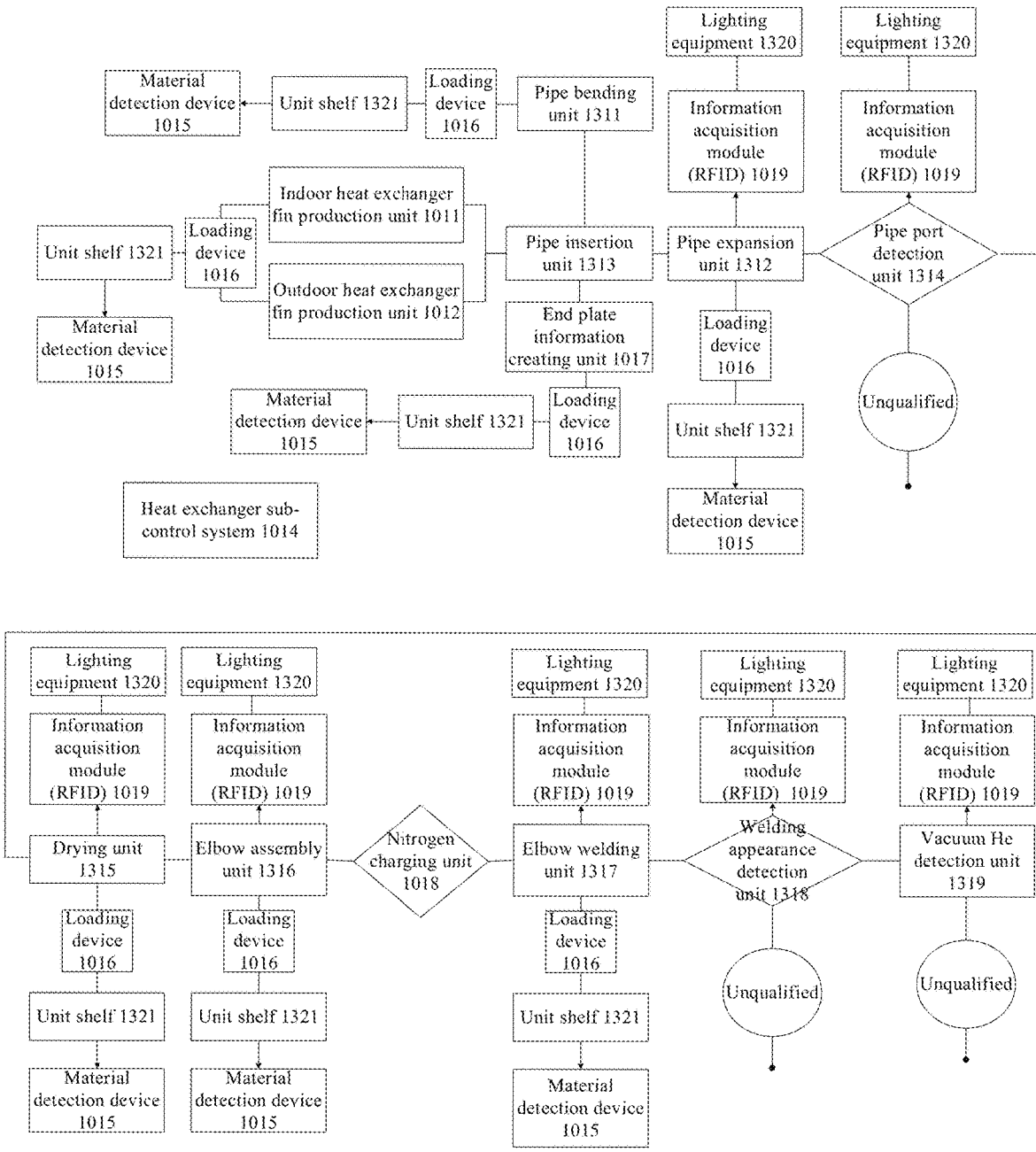
FIG. 2 is a schematic diagram of a heat exchanger general production system provided by some embodiments of the present disclosure.
Figure 6:
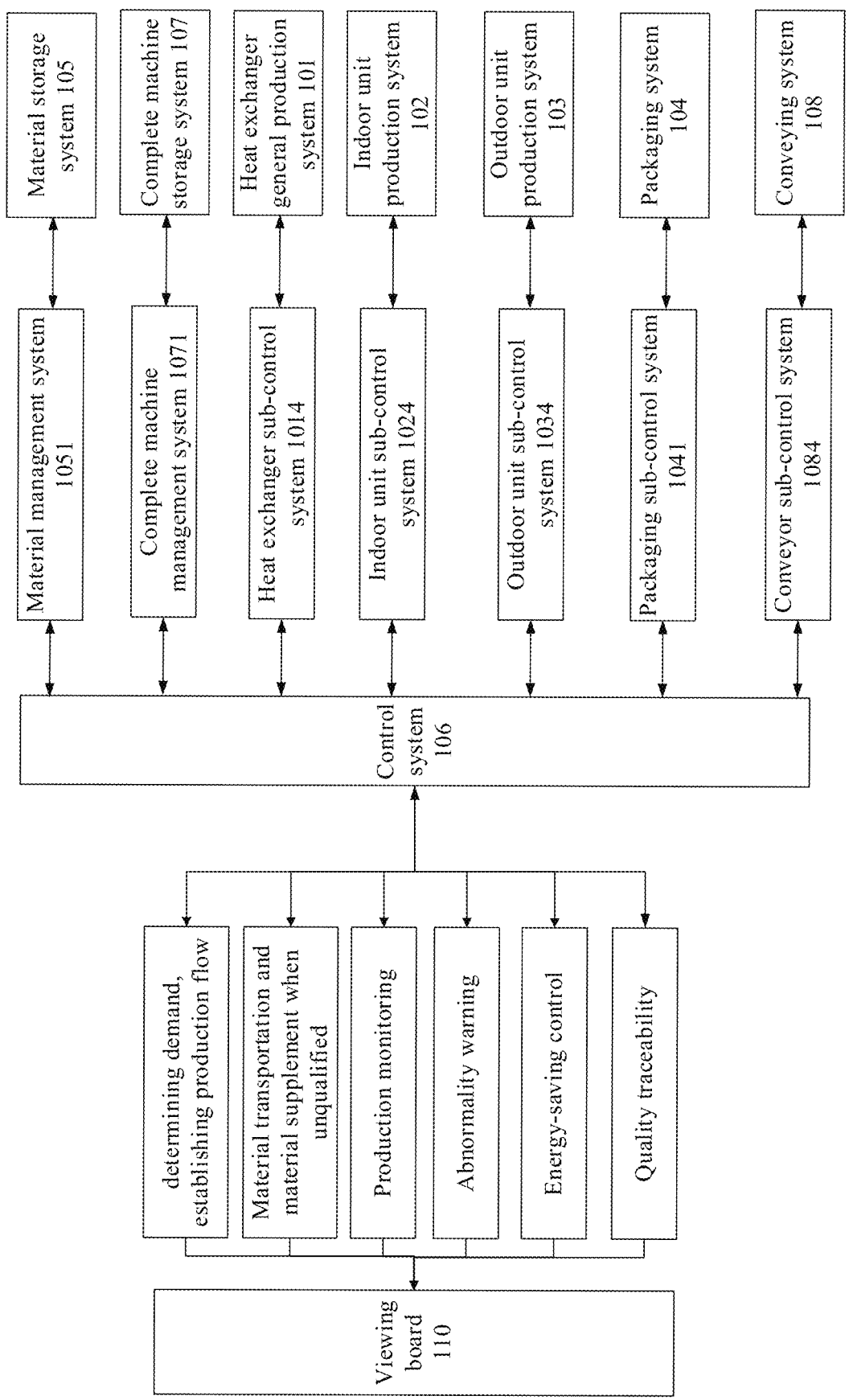
FIG. 6 is a schematic diagram of a system architecture provided by some embodiments of the present disclosure.

In some embodiments, as shown in FIGS. 1 and 6, the operation and maintenance system for air conditioner production 100 includes a heat exchanger general production system 101, an indoor unit production system 102, an outdoor unit production system 103, a material storage system 105, a conveying system 108, and a control system 106. In some embodiments, the heat exchanger general production system 101 is configured to produce a heat exchanger. As shown in FIG. 2, the heat exchanger general production system 101 includes an indoor heat exchanger fin production unit 1011, an outdoor heat exchanger fin production unit 1012, and a plurality of heat exchanger general production units 1013. The indoor heat exchanger fin production unit 1011 is configured to produce an indoor heat exchanger fin. The outdoor heat exchanger fin production unit 1012 is configured to produce an outdoor heat exchanger fin. Since the specifications of the indoor heat exchanger fins and the outdoor heat exchanger fins are different, the fin production unit is divided into an indoor heat exchanger fin production unit 1011 and an outdoor heat exchanger fin production unit 1012. The specifications of the fins may include, for example, a fin length, a fin hole pitch, and the like.

In some embodiments, as shown in FIG. 2, the heat exchanger general production unit 1013 includes a pipe bending unit 1311, the pipe bending unit 1311 includes a first cutting station configured to cut an outdoor heat exchanger tube and a second cutting station configured to cut an indoor heat exchanger tube. In some embodiments, the heat exchanger general production unit 1013 includes a pipe expansion unit 1312, and an operating frequency of the pipe expansion unit 1312 includes a first frequency for producing an outdoor heat exchanger and a second frequency for producing an indoor heat exchanger. In some embodiments, the plurality of heat exchanger general production units 1013 are configured to use the outdoor heat exchanger fin and a heat exchanger material to produce an unbent outdoor heat exchanger, and to use the indoor heat exchanger fin and a heat exchanger material to produce an indoor heat exchanger.

In some embodiments, as shown in FIG. 2, the starting units are the indoor heat exchanger fin production unit 1011 and the outdoor heat exchanger fin production unit 1012, which are the starting points of a heat exchanger production, and are used for producing heat dissipation fins used by the indoor unit and the outdoor unit, respectively. At the end plate information creating unit 1017, a unique identification identifier is created for the end plate of the heat exchanger, typically in the form of an RFID (radio frequency identification) tag, and this information will be used for traceability and management during the entire production process. The end plate information creating unit 1017 is configured to use a unique identification of each end plate to form end plate information and create the end plate information onto the end plate. This end plate information constitutes the identity information source of the heat exchanger and even the complete machine assembled in the future, and is the starting point of the whole information traceability chain.

As shown in FIG. 2, the core production flow is performed in the following logical sequence: the pipe insertion unit 1313 stacks the produced fins and inserts pipelines such as a copper pipe into the fins. The pipe bending unit 1311 bends and forms the pipelines to meet the design requirements of different heat exchangers. The pipe expansion unit 1312 mechanically expands the pipelines inserted into the fins, ensuring that the pipelines are in close contact with the fins, so as to improve the heat exchange efficiency. The pipe port detection unit 1314 performs quality detection on the port of the pipe after the expansion. The drying unit 1315 performs a drying process on the semi-finished heat exchanger. The elbow assembly unit 1316 assembles a connection elbow of the heat exchanger. The nitrogen charging unit 1018 charges nitrogen into the interior of the heat exchanger, to prepare for welding and provide preliminary air tightness protection. The elbow welding unit 1317 welds the assembled elbow. The welding appearance detection unit 1318 detects the appearance quality of the welding point. The vacuum He detection unit 1319 places the heat exchanger in a vacuum environment and performs precise leak detection using helium mass spectrometry to ensure the tightness of the product.

Each production unit is provided with a unit shelf 1321 besides it, for temporary storage of materials or semi-finished products to be processed. The loading device 1016 is responsible for automatically supplying materials from the shelves to the corresponding production units. A material detection device 1015 is provided at a key station of the production unit, and is configured to monitor the availability and quantity of materials to ensure the continuity of production. Starting from the pipe expansion unit 1312, a plurality of subsequent key units (such as the pipe port detection unit 1314, the drying unit 1315, the elbow assembly unit 1316, the elbow welding unit 1317, the welding appearance detection unit 1318, and the vacuum He detection unit 1319, etc.) are each equipped with an RFID information acquisition module 1019. These modules are configured to read and write the electronic label information on the product in progress, thus realizing the whole traceability of the production process. In some embodiments, as shown in FIG. 2, the workshop is a black light workshop, in which no normally-on lighting equipment is provided. Each production unit is equipped with a lighting equipment 1320, which is in a normally-off state. The lighting equipment 1320 is located on each production unit. The lighting equipment 1320 is lighten up when the operation of the equipment has failure or abnormality, so that the corresponding production unit is lighted, to provide convenience for the maintenance by the engineer, which can save a lot of energy and greatly reduce the energy consumption of the production system.

As shown in FIG. 2, the quality control nodes in a handling process of an unqualified product are shown. For example, in the processes at the pipe port detection unit 1314, the welding appearance detection unit 1318, and the vacuum He detection unit 1319, once the detection result is unqualified, the product will be sorted out and entered into the repair or scrap process, without flowing into the next process. When the product is unqualified, it will be output through an unqualified conveyor line, and the control system is notified. The control system controls the conveying system to convey all materials in the upstream processes of the detection unit in the packaging system. When a detection unit detects that it is unqualified, the production flow is adjusted accordingly. In FIG. 2, the heat exchanger sub-control system 1014 performs centralized control and scheduling, and it is responsible for coordinating the working states, the material conveyances, and the quality data collection and processing of the respective units.

Figure 3A:
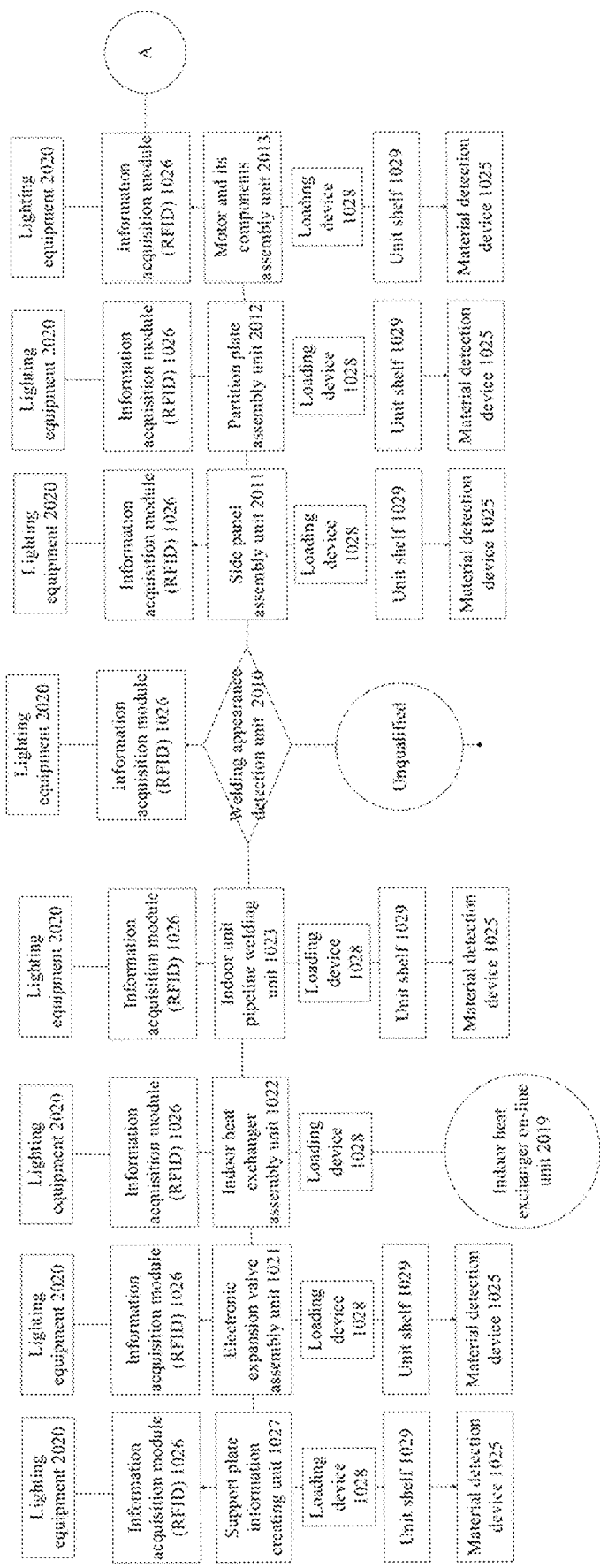
FIG. 3A and FIG. 3B are schematic diagrams of an indoor unit production system provided by some embodiments of the present disclosure.
Figure 3B:
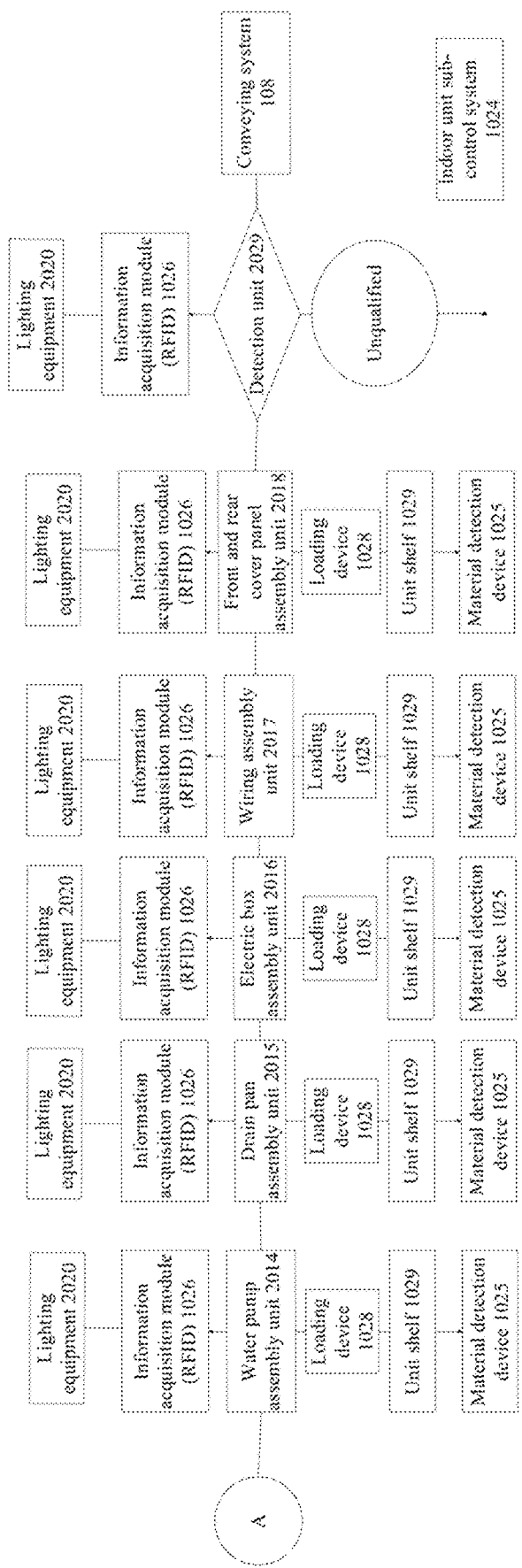
Figure 4A:
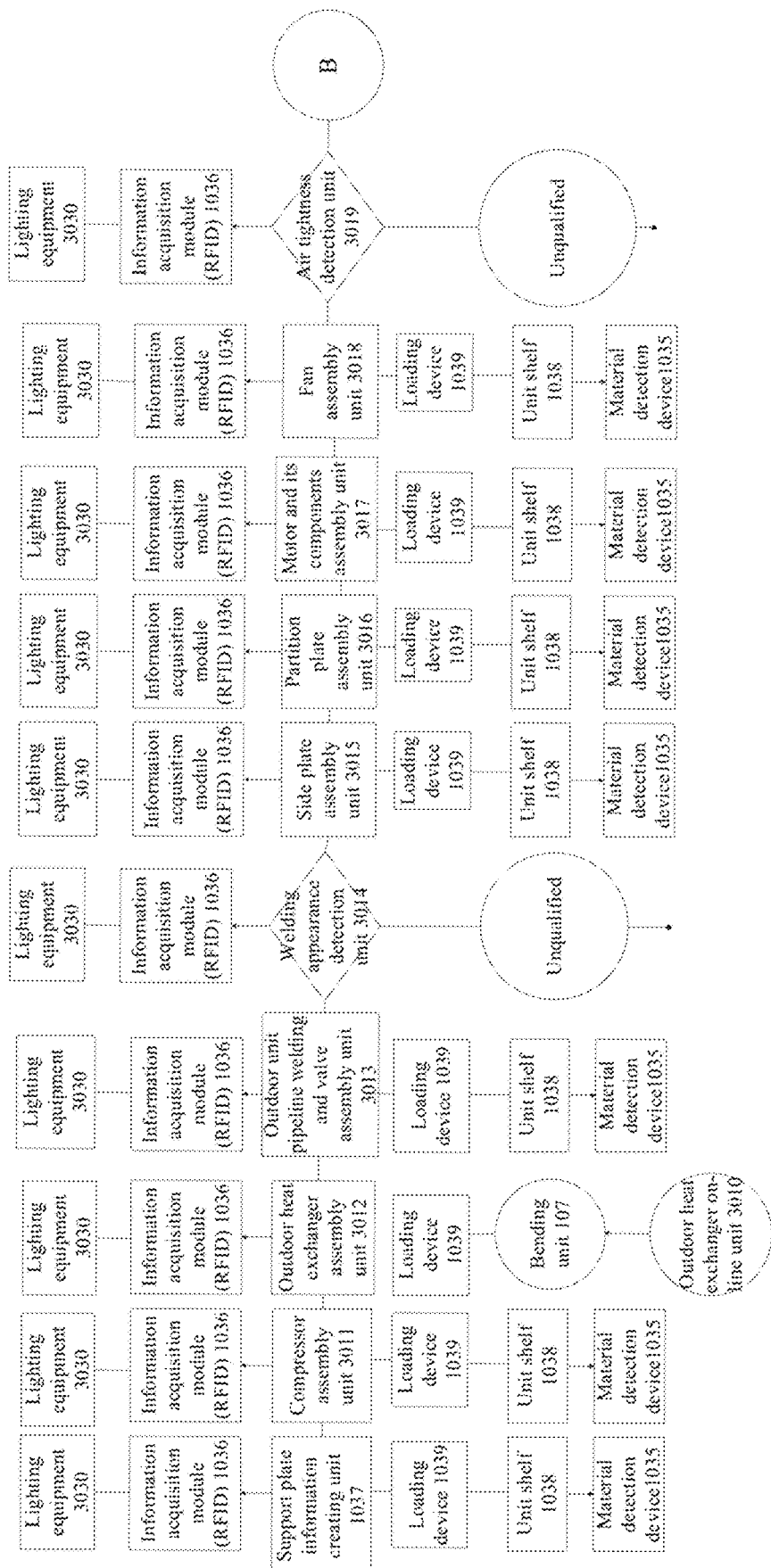
FIG. 4A and FIG. 4B are schematic diagrams of an outdoor unit production system provided by some embodiments of the present disclosure.
Figure 4B:
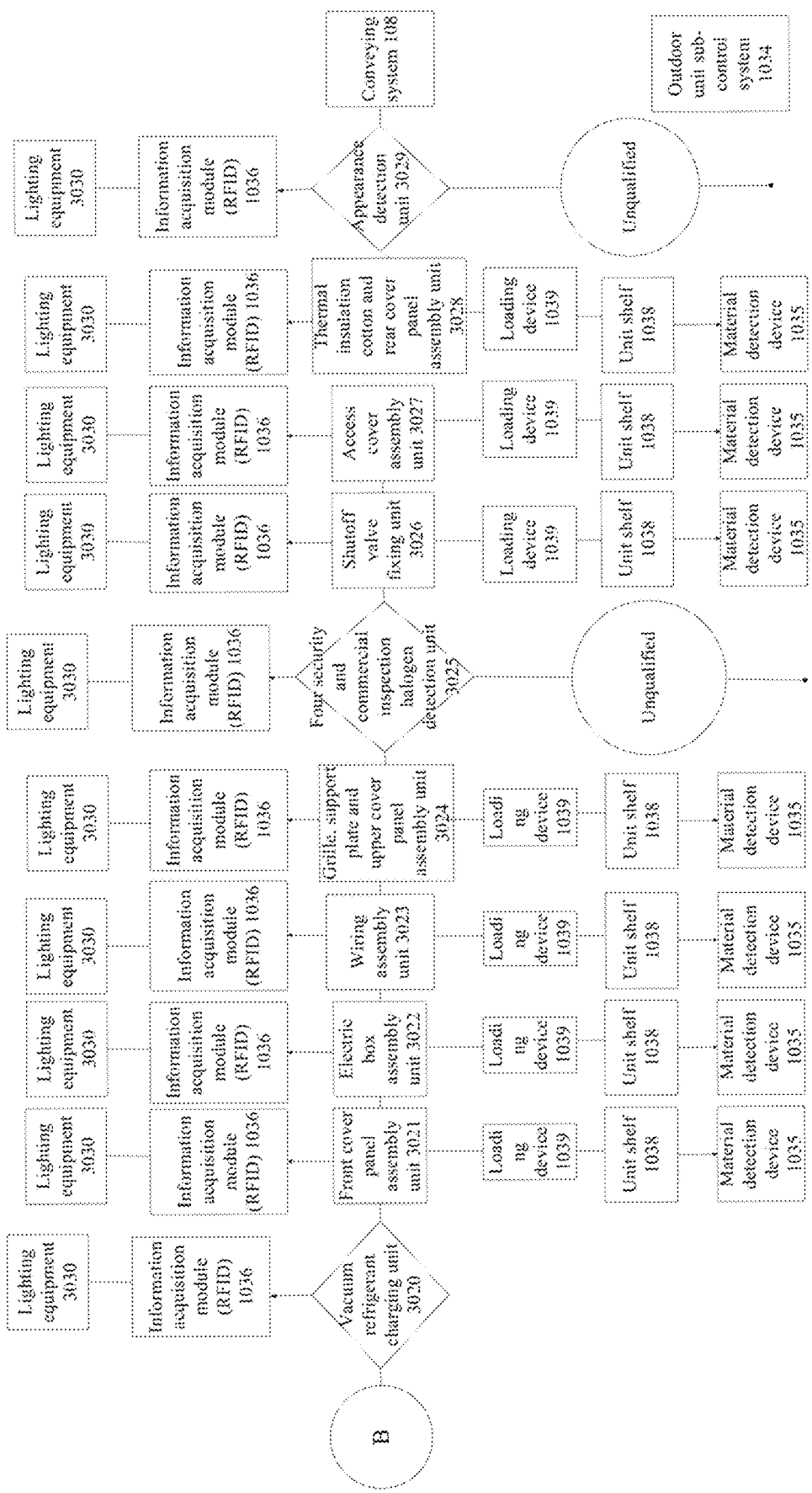

In some embodiments, as shown in FIG. 3A and FIG. 3B, the indoor unit production system 102 is configured to use an indoor heat exchanger and an indoor unit material to produce an indoor unit. The indoor unit production system 102 includes a plurality of indoor unit production units. In some embodiments, as shown in FIG. 4A and FIG. 4B, the operation and maintenance system for air conditioner production 100 further includes a bending unit 107 configured to bend the unbent outdoor heat exchanger into an outdoor heat exchanger. The outdoor unit production system 103 is configured to use the outdoor heat exchanger and an outdoor unit material to produce an outdoor unit. The outdoor unit production system 103 includes a plurality of outdoor unit production units. A bending unit 107 is located in and controlled by the outdoor unit production system 103. In some embodiments, the bending unit 107 may also be located in and controlled by the indoor unit production system 102. In some embodiments, the material storage system 105 is configured to store the heat exchanger material, the indoor unit material, and the outdoor unit material. The conveying system 108 is configured to convey the heat exchanger material to the heat exchanger general production system 101, convey the indoor unit material to the indoor unit production system 102, and convey the outdoor unit material to the outdoor unit production system 103.

In some embodiments, as shown in FIG. 3A and FIG. 3B, the production line starts at the indoor heat exchanger on-line unit 2019. Here, a qualified indoor heat exchanger that has been manufactured and detected in the heat exchanger general production system 101 is conveyed to the indoor unit production system 102. Before formal assembly, the support plate information creating unit 1027 creates a unique electronic identification (such as an RFID tag) for the support plate carrying the components of the indoor unit. The support plate will accompany the product to go through the entire production line, and its identity information is bound to the product information, and it is the key to realize the whole traceability of a single product. The support plate information creating unit is configured to form a unique identification of each support plate as support plate information and create the support plate information onto the support plate. When a complete machine is on-line, the control system will read the end plate information of the on-line heat exchanger, and instruct to associate and bind the source information with the unique information of the current support plate. Since then, the support plate becomes a mobile carrier that aggregates all the information of the specific product in all subsequent assembly, welding and detection processes.

As shown in FIG. 3A and FIG. 3B, the core assembly flow units operate in the following control sequence: the indoor heat exchanger assembly unit 1022 firmly mounts the on-line heat exchanger onto the support plate or a machine seat. The electronic expansion valve assembly unit 1021 assembles an electronic expansion valve for accurately controlling the flow rate of the refrigerant. The indoor unit pipeline welding unit 1023 automatically welds the electronic expansion valve and other internal pipelines with the heat exchanger. The welding appearance detection unit 2010 performs on-line detection on the quality of the welding point through technology such as machine vision. A product that is detected to be unqualified will be diverted from this station and will not enter the subsequent processes. When the product is unqualified, it will be output through an unqualified conveyor line, and the control system is notified. The control system controls the conveying system to convey all materials in the upstream processes of the detection unit in the packaging system. When the detection unit detects that it is unqualified, the production flow is adjusted accordingly. The side panel assembly unit 2011 assembles a side structure panel of the indoor unit. The partition plate assembly unit 2012 assembles the partition plates of the internal functional region. The motor and its components assembly unit 2013 mounts the motor that drive the fan and the related components thereof. The water pump assembly unit 2014 mounts a water pump for discharging condensed water. The drain pan assembly unit 2015 assembles a drain pan for collecting and guiding the condensed water. The electric box assembly unit 2016 mounts an electric control box including a main control board and electronic components. The wiring assembly unit 2017 performs electrical wiring between the motor, the sensors, the main control board, and the like. The front and rear cover panel assembly unit 2018 assembles the outer shell parts of the indoor unit, so as to complete the packaging of the complete machine.

After the assembly of the complete machine is completed, the detection unit 2029 conducts a comprehensive functional and performance detection. The detection result here also determines whether the product is qualified or not. The unqualified product will be disposed of, and the qualified product will enter the next process. When the product is unqualified, it will be output through an unqualified conveyor line, and the control system is notified. The control system controls the conveying system to convey all materials in the upstream processes of the detection unit in the packaging system. When the detection unit detects that it is unqualified, the production flow is adjusted accordingly. The finished indoor unit that has been assembled and detected and confirmed to be qualified is conveyed from the end of the production line by the conveying system 108 and sent to the packaging system or the finished product warehouse. As shown in FIG. 3A and FIG. 3B, each assembly and detection unit is equipped with an RFID information acquisition module 1026. When a product passes, the system will automatically read and write the label on the support plate, record information such as the completion condition of the current process, the batch of materials used, the process parameters, and the like, and upload the data to the indoor unit sub-control system 1024. Each assembly unit is equipped with a material supply system besides it, the material supply system includes a unit shelf 1029 for storing parts, a loading device 1028 that automatically sends materials to the assembly position, and a material detection device 1025 that monitors the remaining amount of materials in real time, which jointly ensures the automation and continuity of production. The indoor unit sub-control system 1024 manages and coordinates all hardware equipment, material flow and information interaction of the whole indoor unit production line, ensuring the efficiency and accuracy of the production flow. In some embodiments, as shown in FIG. 3A and FIG. 3B, the workshop is a black light workshop, in which no normally-on lighting equipment is provided. Each production unit is equipped with a lighting equipment 2020, which is in a normally-off state. The lighting equipment 2020 is located on each production unit. The lighting equipment 2020 is lighten up when the operation of the equipment has failure or abnormality, so that the corresponding production unit is lighted, to provide convenience for the maintenance by the engineer, which can save a lot of energy and greatly reduce the energy consumption of the production system.

In some embodiments, as shown in FIG. 4A and FIG. 4B, the production line starts with the outdoor heat exchanger on-line unit 3010, at which location the detected and qualified outdoor heat exchanger conveyed from the heat exchanger general production system 101 enters the outdoor unit production system 103. The support plate information creating unit 1037, similarly to the support plate information creating unit 1027 in the indoor unit production system 102, creates a unique RFID electronic tag for the support plate carrying the components of the outdoor unit, thereby realizing the binding of the product and the support plate, and laying a foundation for information traceability of all subsequent processes.

As shown in FIG. 4A and FIG. 4B, the core assembly and detection flow units operate in the following control sequence: the outdoor heat exchanger assembly unit 3012 mounts and fixes the heat exchanger onto the machine seat. The compressor assembly unit 3011 mounts a compressor of the air conditioner system. The outdoor unit pipeline welding and valve assembly unit 3013 performs pipeline connection and automatic welding between the compressors, the heat exchangers and various types of valves (such as shutoff valves). The welding appearance detection unit 3014 performs on-line visual detection on the welding quality of the pipelines, and the unqualified product will be identified and diverted. When the product is unqualified, it will be output through an unqualified conveyor line, and the control system is notified. The control system controls the conveying system to convey all materials in the upstream processes of the detection unit in the packaging system. When the detection unit detects that it is unqualified, the production flow is adjusted accordingly. The side plate assembly unit 3015 assembles the side sheet metal parts of the outdoor unit. The partition plate assembly unit 3016 mounts the internal partition plates for partitioning different functional regions, such as a compression compartment and a fan compartment. The motor and its components assembly unit 3017 mounts the motor of the fan and the support components thereof. The fan assembly unit 3018 mounts the fan blades to the motor. The air tightness detection unit 3019 pressurizes the entire refrigerant pipeline system to detect whether there is a leakage. This is an important quality control node, where an unqualified product will be excluded. The vacuum refrigerant charging unit 3020 performs a vacuum process on a pipeline system that is qualified in air tightness, and accurately charges the refrigerant according to the standard amount. The front cover panel assembly unit 3021 mounts the front shell panel. The electric box assembly unit 3022 mounts a control box in which electric components such as a control circuit and wiring terminals are integrated. The wiring assembly unit 3023 performs all electrical connections between the compressors, the motors, the sensors, and the electric box. The grille, support plate and upper cover panel assembly unit 3024 performs mountings of the fan grille, the top support structure and the upper cover panel, and up to this point, the physical assembly of the complete machine is completed.

The four security and commercial inspection halogen detection unit 3025 conducts a comprehensive pre-shipping compulsory detection on the complete machine, including the electrical safety performance testing (safety regulation), the commercial performance index testing, the halogen leakage detection, and the like. The shutoff valve fixing unit 3026 finally fixes the external shutoff valve. The access cover assembly unit 3027 mounts the access cover panel for later maintenance. The thermal insulation cotton and rear cover panel assembly unit 3028 wraps the thermal insulation cotton on the specific pipelines and mounts the rear cover panel. The appearance detection unit 3029 detects the final appearance of the finished outdoor unit to ensure that there are no defects such as scratches or dents. Only the qualified product that have passed all the assembly and detection processes will be conveyed from the end of the production line to the packaging region by the conveying system 108.

Each unit is deployed with an information acquisition module (RFID) 1036, which reads and writes product information in real time, records the assembly data and the detection results, and forms an entire electronic file for the product. Each assembly unit is equipped with a unit shelf 1038, a loading device 1039, and a material detection device 1035, thereby realizing unmanned and accurate supply of parts. FIG. 4A and FIG. 4B clearly marks multiple "unqualified" diversion paths, such as the welding appearance detection, the air tightness detection, the final security detection and appearance detection, which constitute a strict on-line quality control system. When the product is unqualified, it will be output through an unqualified conveyor line, and the control system is notified. The control system controls the conveying system to convey all materials in the upstream processes of the detection unit in the packaging system. When the detection unit detects that it is unqualified, the production flow is adjusted accordingly. The outdoor unit sub-control system 1034 is the control portion of the outdoor unit production system 103, and it uniformly schedules all the automation equipment, processes large quantities of production data, and executes complex quality control logics. In some embodiments, as shown in FIG. 4A and FIG. 4B, the workshop is a black light workshop, in which no normally-on lighting equipment is provided. Each production unit is equipped with a lighting equipment 3030, which is in a normally-off state. The lighting equipment 3030 is located on each production unit. The lighting equipment 3030 is lighten up when the operation of the equipment has failure or abnormality, so that the corresponding production unit is lighted, to provide convenience for the maintenance by the engineer, which can save a lot of energy and greatly reduce the energy consumption of the production system.

Figure 5:
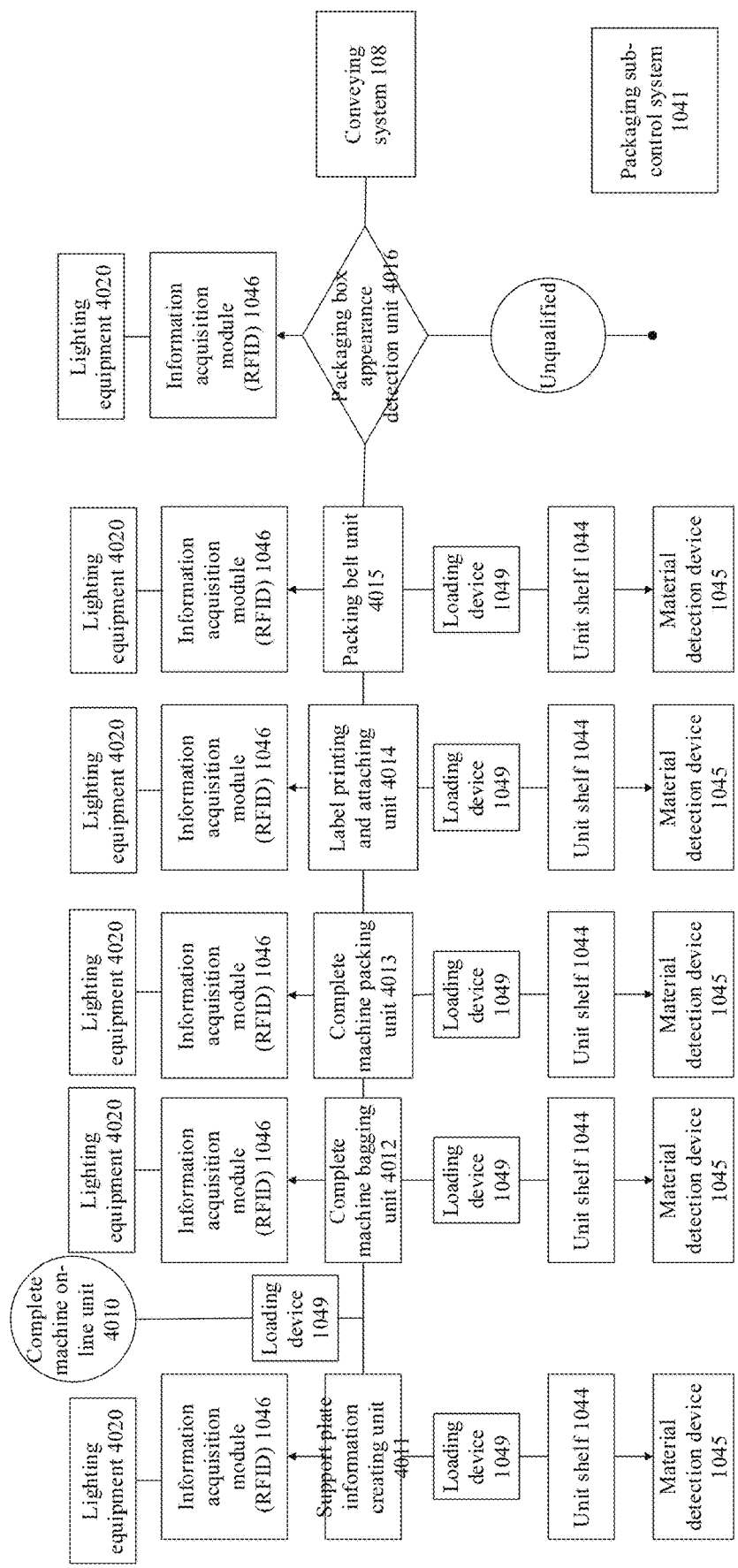
FIG. 5 is a schematic diagram of a packaging system provided by some embodiments of the present disclosure.

In some embodiments, as shown in FIG. 5, the starting point of the production line is the complete machine on-line unit 4010, the starting point of the production flow of the packaging system 104. The qualified finished product off-line from the indoor unit production system 102 or the outdoor unit production system 103 is conveyed by the conveying equipment of the conveying system 108 to the complete machine on-line unit 4010 of the packaging system 104. At this location, the support plate information creating unit 4011 creates a unique electronic identification (e.g., an RFID tag) for a support plate or a base seat for carrying and conveying the packaged finished product. At the same time, the packaging system 104 will associate the information of the complete machine that is about to get on-line (by scanning its ID bound during the assembly process) with this new support plate ID, thereby extending the production history data chain of the product to the packaging and storage stages.

As shown in FIG. 5, the core flow of the automated packaging is performed in the following control sequence: the complete machine bagging unit 4012 automatically bags the complete machine with a dust-proof and moisture-proof protective plastic bag. The complete machine packing unit 4013 puts the bagged complete machine into a pre-formed corrugated paper packaging box. The label printing and attaching unit 4014 automatically prints a label containing information such as a model number, a serial number, a specification, and a bar code based on the read product information, and accurately attaches the label to a designated position of the packaging box by a device such as a robot arm. The packing belt unit 4015 sends the packaging box into an automatic baling machine, which bundles and reinforces the packaging box using the packing belts, so as to ensure the stability during transportation. At the label printing and attaching unit, the packaging sub-control system receives through the control system the support plate information associated with the present complete machine to be packaged. Based on the support plate information, the control system automatically traces back to the source end plate information bound at the initial stage of assembly, and retrieves and integrates all the material information, the supplier information, the production process information of each process and the quality detection results related to the product. These pieces of integrated complete information are transmitted to the production information creating unit (i.e. the present unit), to create a production label containing the unique product serial number, the QR code, etc., and automatically attach it to a designated position of the packing box. Up to this point, the whole flow information traceability chain starting from the core components is finally solidified on the packaging, and the final output of information traceability is completed.

After finishing all the packaging processes, the packaging box appearance detection unit 4016 performs on-line detection on the final appearance of the packaging box by a machine vision technology or other technologies, to check whether there are problems such as breakage, skew of the label, and loose of the packing belts. This is an important quality control node. A product having a detection result of "qualified" will be proceeded to the next process; while for a product having a detection result of "unqualified", the packaging system 104 will issue an instruction to sort this product out from the main line, and perform manual processing or rework for this product. When the product is unqualified, it will be output through an unqualified conveyor line, and the control system is notified. The control system controls the conveying system to convey all materials in the upstream processes of the detection unit in the packaging system. When the detection unit detects that it is unqualified, the production flow is adjusted accordingly. The qualified finished product that has passed all the packaging processes and appearance detection is automatically picked up from the end of the packaging line by the conveying system 108, and is transported to a designated location in the finished product warehouse or is directly sent to the delivery region according to an instruction by the control system 106.

Each of the units (the bagging, packing, label attaching, and packing belt units) is equipped with an information acquisition module (RFID) 1046, which is configured to track the progress of the product on the packaging line in real time and record the completion state of each process step, ensuring the complete data traceability of the packaging process. Each of the units is similarly equipped with a unit shelf 1044, a loading device 1049 and a material detection device 1045, which are configured to automatically supply consumables such as packaging bags, paper boxes, label papers, and packing belts, and monitor the remaining amounts of the consumables in real time, and automatically alarm or trigger material supplement when needed, thus ensuring the continuous and stable operation of the packaging line. All automation devices, information acquisition modules, material supply units, and conveyance scheduling of the entire packaging system 104 are centrally controlled and coordinated by the packaging sub-control system 1041, which also performs data interaction with the control system 106. In some embodiments, as shown in FIG. 5, the workshop is a black light workshop, in which no normally-on lighting equipment is provided. Each production unit is equipped with a lighting equipment 4020, which is in a normally-off state. The lighting equipment 4020 is located on each production unit. The lighting equipment 4020 is lighten up when the operation of the equipment has failure or abnormality, so that the corresponding production unit is lighted, to provide convenience for the maintenance by the engineer, which can save a lot of energy and greatly reduce the energy consumption of the production system.

In some embodiments, as shown in FIG. 6, the control system 106 communicates with the heat exchanger general production system 101, the indoor unit production system 102, the outdoor unit production system 103, the material storage system 105, and the conveying system 108. The control system 106 is configured to uniformly and coordinately control the operating states of all the systems, and acquire relevant information of all the systems. In some embodiments, the control system 106 is configured to control the conveying system 108 to convey materials, control the indoor heat exchanger fin production unit 1011 and the heat exchanger general production units 1013 to produce the indoor heat exchanger, and control the indoor unit production system 102 to use the indoor heat exchanger and the indoor unit material to produce the indoor unit, control the outdoor heat exchanger fin production unit 1012, the heat exchanger general production units 1013, and the bending unit 107 to produce the outdoor heat exchanger, and control the outdoor unit production system 103 to use the outdoor heat exchanger and the outdoor unit material to produce the outdoor unit. By producing the indoor heat exchanger and the outdoor heat exchanger by the heat exchanger general production system 101, and by controlling the heat exchanger general production system 101 to produce the outdoor heat exchanger or the indoor heat exchanger according to the production demands for the indoor units and the outdoor units, the spatial layout and layout cost of the entire production system are effectively reduced.

In some embodiments, as shown in FIG. 6, the operation and maintenance system for air conditioner production 100 can be understood as three main levels from left to right and from top to bottom: a decision management layer, a central control layer, and an equipment execution layer. The viewing board 110 is a human-computer interaction and high-level management interface for the entire manufacturing system. It is not only the visual window of the production states, but also the input end of the production decisions and the collection of the management functions. Its core functional modules include: demand determination, production flow establishment: order information is received (or predicted based on big data), production plan and process flow is automatically analyzed and generated. Material transportation and material supplement when unqualified: based on the production plan and the real-time inventory, a material transportation instruction is issued, and a supplement or rework process can be automatically triggered when an unqualified product is detected. Production monitoring: key performance indicators such as the operation states, the equipment parameters, the quantity of work-in-progress, and the production rhythm of each production line are displayed in real-time. Abnormality warning: through real-time analysis of the equipment state data, potential equipment failures or process abnormalities are predicted and alerted in advance, so as to achieve predictive maintenance. Energy-saving control: according to the production load, the energy consumption of non-critical equipment, such as the lighting equipment, the standby equipment, and the like, is adjusted, so as to achieve green manufacturing. Quality traceability: a query interface is provided, and by entering information such as a product serial number or the like, the whole life cycle production data of the product from the warehousing of the materials to the delivery of the finished product out from the warehouse can be traced.

The control system 106 is the "brain" of the entire system and plays a central role in connecting the preceding with the following. It receives a high-level instruction from the viewing board 110, decomposes the instruction into executable, specific task instructions, and sends the instructions to the subsystems of each of the equipment execution layers. At the same time, it collects the state information, production data and detection results uploaded by all the sub-control systems in real time, processes and analyses them, and then feeds back to the viewing board 110 for display and decision support.

The equipment execution layer consists of a series of functionally independent and distributed sub-control systems, each of which is responsible for managing a specific production region. Such distributed control architecture improves the robustness and response speed of the system. The material management system 1051 and the complete machine management system 1071 are responsible for automatic warehousing management of raw materials, semi-finished products and finished products, and control the operations of the material storage system 105 and the complete machine storage system 170 respectively, so as to realize automatic inventory of the materials and accurate entry and exit of the materials to/from the warehouse. The heat exchanger sub-control system 1014 is responsible for the automatic production of the heat exchangers, and controls the operation of the heat exchanger general production system. The indoor unit sub-control system 1024 is responsible for the automatic assembly and detection of the indoor units, and controls the operation of the indoor unit production system 102. The outdoor unit sub-control system 1034 is responsible for the automatic assembly and detection of the outdoor units, and controls the operation of the outdoor unit production system 103. The packaging sub-control system 1041 is responsible for the automated packaging of the finished products. The operation of the packaging system 104 is controlled. The conveyor sub-control system 1084 is responsible for scheduling logistics equipment such as AGVs and conveyor belts, realizing automatic flow of materials and products among the subsystems, and controlling the operation of the conveying system 108.

In some embodiments, the heat exchanger general production system 101 includes a heat exchanger sub-control system 1014, an indoor unit production system 102 including an indoor unit sub-control system 1024, and an outdoor unit production system 103 including an outdoor unit sub-control system 1034. The heat exchanger sub-control system 1014, the indoor unit sub-control system 1024, and the outdoor unit sub-control system 1034 are each configured to communicate with the control system 106 for data transmission and interaction, respectively. The heat exchanger sub-control system 1014, the indoor unit sub-control system 1024, and the outdoor unit sub-control system 1034 are configured to receive detection information of the respective production systems and control the operation states of the respective related production systems, respectively. Each of the sub-control systems processes the data and then uploads it to the control system, thereby the amount of information transmission and the computing pressure of the control system can be reduced.

In some embodiments, as shown in FIG. 6, the conveying system 108 includes a conveyor sub-control system 1084, and the conveyor sub-control system 1084 communicates with the control system 106. In some embodiments, the conveying system 108 is not provided with the control system, but is instead managed and controlled by the material management system 1051. The complete machine storage system 170 is managed and controlled by the complete machine management system 1071.

Figure 7:
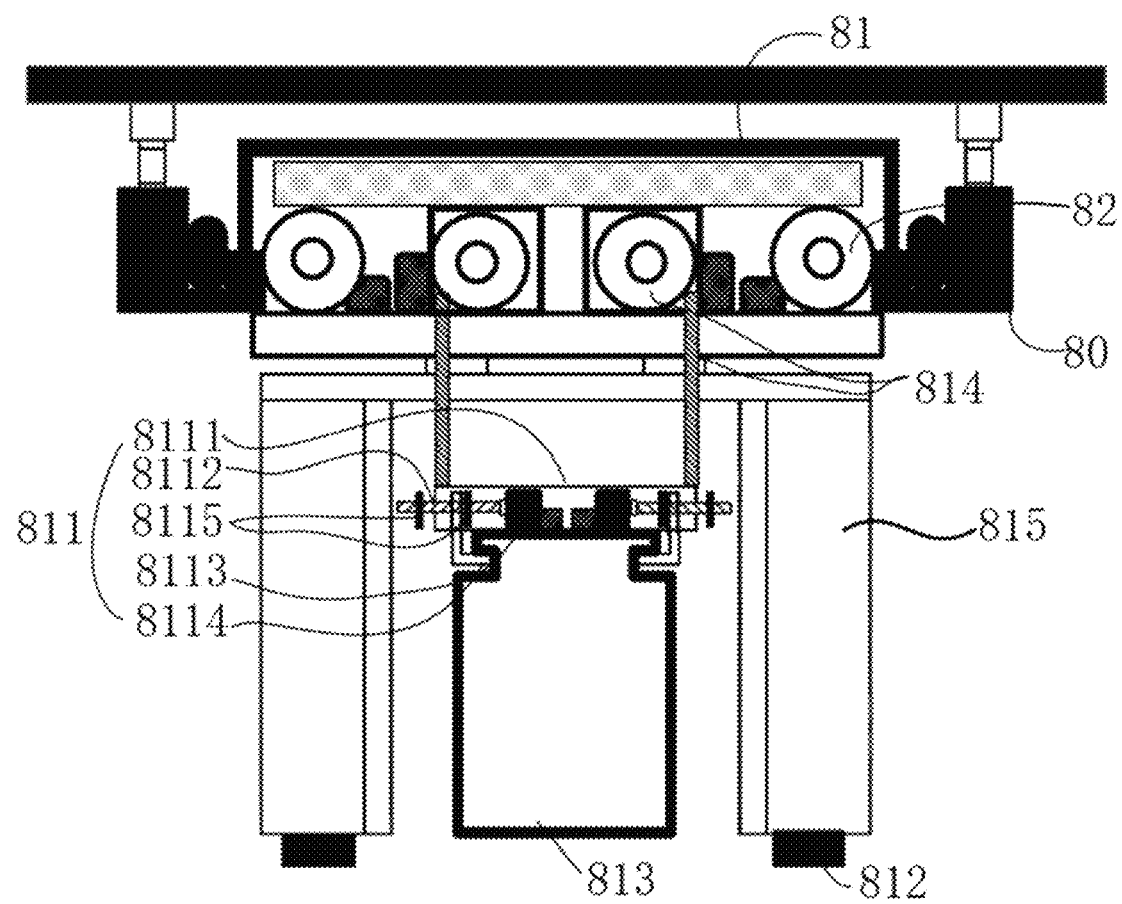
FIG. 7 is a schematic diagram of a crane system provided by some embodiments of the present disclosure.

In some embodiments, as shown in FIG. 7, and in connection with FIG. 5, the conveying system 108 includes a crane system, which includes a track 80 and a crane 81. A part of the track is positioned above the heat exchanger general production system 101, the indoor unit production system 102, the outdoor unit production system 103, and the material storage system 105, to facilitate the loading of the materials by the crane 81. The crane 81 is located on the track 80, and the crane 81 includes a grasping device 811 and a position sensing device 812. The grasping device 811 is configured to grasp materials, and the position sensing device 812 is configured to sense whether the crane arrives at the production unit or the material storage system.

In some embodiments, the crane system includes a material container 813 for storing materials; the grasping device 811 is configured to grasp the material container 813. By providing the material container 813, the grasping device 811 only needs to grasp the material container 813, and the complexity of the design of the grasping device 811 caused by grasping different materials can be avoided. The crane system includes a traveling mechanism 82 configured to drive the crane 81 to travel on the track 80. In some embodiments, the grasping device 811 is connected to the crane 81 by a lifting mechanism 814. The lifting mechanism 814 includes a lifting motor and a lifting rope. The grasping device 811 includes a base 8111, a lead screw 8112, a lead screw driving mechanism 8113, and a clamp 8114. The base 8111 is connected with the lifting mechanism 814. Two lead screws 8112, two lead screw driving mechanisms 8113, and two clamp 8114 are provided, and each of the lead screw driving mechanisms 8113 drives one of the lead screws 8112 to rotate to drive one of the clamps 8114 to move. The lead screw 8112 is rotatably mounted on the base 8111. The lead screw driving mechanism 8113 is configured to drive the lead screw 8112 to rotate, and the clamp 8114 is screw-jointed with the lead screw 8112. The two lead screw driving mechanisms 8113 respectively drive the two lead screws 8112 to rotate to control the opening and closing of the two clamps 8114.

In some embodiments, the lead screw rotates to control the distance between the two clamps to increase, so as to achieve the opening of the clamps; the lead screw rotates in a reverse direction to control the distance between the two clamps to reduce, so as to achieve the closing of the clamps to clamp the material container. In some embodiments, the grasping device includes a clamp limiting member 8115 configured to limit the position of the clamp 8114. Each clamp 8114 corresponds to two clamp limiting members 8115, one clamp limiting member 8115 corresponding to the open position of the clamp, and one clamp limiting member 8115 corresponding to the closed position of the clamp.

In some embodiments, the crane 81 includes two cantilever arms 815 located on both sides of the grasping device, and a position sensing device 812 is provide at the bottom end of each of the cantilever arms 815 to facilitate the position sensing device 812 to sense the position. In some embodiments, the position sensing device 812 is a laser scanning equipment. In some embodiments, the track is a closed endless track to enable cyclic material loading. In some embodiments, the indoor unit production system and the outdoor unit production system are arranged side by side between the heat exchanger general production system and the material storage system.

In some embodiments, as shown in FIG. 1, in the direction of the production line, the heat exchanger general production system 101, the side-by-side indoor unit production system 102 and outdoor unit production system 103, and the material storage system 105 are sequentially arranged.

The indoor unit production system 102 and the outdoor unit production system 103 are arranged side by side downstream of the heat exchanger general production system 101, so as to facilitate the conveyances of the heat exchangers to the indoor unit production system 102 and the outdoor unit production system 103, respectively.

The track 80 includes a crane standby track section 806, a material track section 801, a heat exchanger track section 802, an indoor unit track section 803, an outdoor unit track section 804, a packaging track section 807, a first track section 8051, a second track section 8052, a third track section 8053, a fourth track section 8054, a fifth track section 8055, a sixth track section 8056, and a seventh track section 8057. In some embodiments, the material track section 801 includes five sub-track sections, namely, an indoor unit heat exchanger material track section ①, an outdoor unit heat exchanger material track section ②, an indoor unit material track section ③, an outdoor unit material track section ④, and a packaging material track section 5. These five sub-track sections are arranged separately from each other and can operate without conflicting with each other, and separately operate corresponding to their target systems for transportation, and materials are transported sequentially according to the track sequence.

The material track section 801 is located above the material storage system 105, the heat exchanger track section 802 is located above the heat exchanger general production system 101, the indoor unit track section 803 is located above the indoor unit production system 102, and the outdoor unit track section 804 is located above the outdoor unit production system 103.

The first track section 8051 connects the material track section 801 and the heat exchanger track section 802, and the first track section 8051 is located between the indoor unit track section 803 and the outdoor unit track section 804. The second track section 8052 connects the heat exchanger track section 802 and the indoor unit track section 803. The third track section 8053 connects the first track section 8051 and the indoor unit track section 803. The fourth track section 8054 connects the indoor unit track section 803 and the material track section 801. The fifth track section 8055 connects the first track section 8051 and the outdoor unit track section 804. The sixth track section 8056 connects the outdoor unit track section 804 and the material track section 801.

The crane is configured to run to the material track section and grasp the material container in which the heat exchanger material is placed, pass through the first track section and arrive at the heat exchanger track section and release the heat exchanger material to the heat exchanger general production system, and then pass through the second track section and the indoor unit track section and arrive at the fourth track section; run to the material track section to grasp the material container in which the indoor unit material is placed, pass through the first track section and the third track section and arrive at the indoor unit track section and release the indoor unit material to the indoor unit production system, and then arrive at the fourth track section; and run to the material track section to grasp the material container in which the outdoor unit material is placed, pass through the first track section and the fifth track section and arrive at the outdoor unit track section and release the outdoor unit material to the outdoor unit production system, and then arrive at the sixth track section.

In some embodiments, the track 80 includes a crane standby track section 806 located between the fourth track section 8054 and the material track section 801, and located between the sixth track section 8056 and the material track section 801. The fourth track section 8054 is or is not in connection with the sixth track section 8056. The crane 81 is configured to arrive at the crane standby track section 806 after completing the conveying of the materials, so as to standby at the crane standby track section 806.

In some embodiments, as shown in FIG. 6, the material storage system 105 includes a material management system 1051 configured to manage the material information, and the material management system 1051 communicates with the control system 106 to upload the material information to the control system.

In some embodiments, as shown in FIG. 1, the operation and maintenance system for air conditioner production 100 further includes a packaging system 104 configured to receive and package the indoor unit and the outdoor unit. The crane system is configured to transport the packaging materials to the packaging system. The packaging materials are divided into an indoor unit packaging material and an outdoor unit packaging material, both of which can be simultaneously or separately transported to the packaging system. The ground transfer device is configured to transport the indoor unit and the outdoor unit to the packaging system.

The control system determines whether an indoor unit or an outdoor unit is about to arrive at the packaging system according to the production states of the outdoor unit production system and the indoor unit production system, and transmits relevant information to the packaging system. When an indoor unit arrives at the packaging system, the packaging system loads an indoor unit packaging material and performs indoor unit packaging, and when an outdoor unit arrives at the packaging system, the packaging system loads an outdoor unit packaging material and performs outdoor unit packaging.

In some embodiments, the packaging materials are stored in the material storage system.

In some embodiments, the packaging system is located below the sixth track section of the conveying system, and the material track section and the sixth track section are connected through the seventh track section 8057.

The crane is configured to run to the material track section to grasp the material container in which the packaging material is placed, release the packaging material to the packaging system 104 when arriving at the packaging system track section 807 after passing through the seventh track section 8057, and then pass through the sixth track section 8056 and arrive at the crane standby track section 806.

In some embodiments, the packaging system is located downstream of the outdoor unit production system, and the material storage system is located downstream of the indoor unit production system.

The seventh track section of the conveying system is located between the outdoor unit production system and the packaging system.

This layout mode makes the structure layout of the whole production system more reasonable and the material transportation smoother, and the production efficiency can be improved.

In some embodiments, the material storage system includes a material storage shelf and a material handling device.

The material storage shelf is configured to store the materials.

The material handling device receives conveyed material information, and when the material handling device identifies a material on the material storage shelf as a conveyed material, it handles the conveyed material to the conveying system.

The conveyed material information is generated by the control system and transmitted to the material handling device.

In some embodiments, the control system communicates with the material management system, the conveyed material information is transmitted by the control system to the material management system, and the material management system transmits the conveyed material information to the material handling device.

In some embodiments, the material handling device determines whether the handling of the conveyed material is completed, after the handling of the conveyed material is completed, the material handling device transmits information to the material management system, the material management system changes the material information, and the material management system controls the conveying system to perform the conveying and transmits the information to the control system.

In some embodiments, the material storage system includes a material warehousing information acquisition module configured to acquire material warehousing information and transmit the material warehousing information to the material management system.

In some embodiments, the material warehousing information acquisition module is an RFID code scanning equipment.

When the materials are warehoused, the warehousing time, quantity, specification, model, supplier information and storage location of the materials are first formed into an electronic label, and the electronic label is attached to the corresponding shelf. The materials are placed on the corresponding shelf. After the materials are warehoused, the material storage system records the relevant information and transmits it to the control system.

In some embodiments, the material storage shelf includes a heat exchanger material storage shelf, an indoor unit material storage shelf, an outdoor unit material storage shelf, and correspondingly, the material track section of the conveying system includes a heat exchanger material track section located above the heat exchanger material storage shelf, an outdoor unit material track section located above the outdoor unit material storage shelf, and an indoor unit material track section located above the indoor unit material storage shelf.

In some embodiments, the heat exchanger material storage shelf is divided into an indoor heat exchanger material storage shelf and an outdoor heat exchanger material storage shelf, to facilitate the transportation of the materials.

In some embodiments, the material storage shelves adopt a multi-layer shelf structure, and each shelf corresponds to a specific material, which is corresponded by a specific material handling device and a specific crane to ensure reasonable storage and convenient access of the materials.

In some embodiments of FIG. 1, the fully automatic intelligent production system further includes a complete machine storage system configured for storing the complete machine packaged by the packaging system.

In some embodiments, the complete machine storage system and the material storage system are two independent systems.

The complete machine storage system includes a complete machine warehousing information acquisition unit and a complete machine management system.

The complete machine warehousing information acquisition unit is configured to acquire complete machine warehousing information and transmit the complete machine warehousing information to a complete machine management system.

The complete machine management system is configured to manage the complete machine information, and the complete machine management system communicates with the control system to upload the complete machine information to the control system.

In some embodiments, the ground transfer device is configured to convey the complete machine packaged by the packaging system to the complete machine storage system.

In some embodiments, the ground transfer device is an AGV (Automated Guided Vehicle).

In some embodiments, the complete machine storage system includes a multi-layer shelf structure, and when a complete machine is packaged and warehoused, the complete machine management system first issues an instruction for a corresponding transportation shelf, and upon receiving the instruction, the complete machine warehousing AGV transports the packaged complete machine to a specific shelf, and the warehousing handling robot handles the complete machine onto the specific shelf. The AGV carrying the complete machine enters information through the warehousing information acquisition unit (i.e., an RFID tag code scanning equipment) deployed on the shelf, and the information is transmitted to the complete machine storage system at the same time. The information includes warehousing time, quantity, specification, model, storage location, etc.

In some embodiments, the packaged complete machine is also stored in the material storage system, and the material management system is configured to manage the complete machine information and upload the complete machine information to the control system.

In some embodiments, a material storage system configured for storing complete machines forms the warehouse.

The arrangement of the warehouse, the heat exchanger general production system, the indoor unit production system, the outdoor unit production system, and the packaging system forms a final assembly production line. The crane conveying system is arranged around this production line, a ground transfer device is adopted between the systems, and a roller conveyor line is adopted within each system.

The ground transfer device is configured to receive control information of the control system, and transfer the assembled components between the units in accordance with the control information.

The ground transfer device is configured to transport the indoor heat exchanger to the indoor unit production system, transport the outdoor heat exchanger to the outdoor unit production system, transport the outdoor unit and the indoor unit to the packaging system, and transport the complete machine packaged by the packaging system to the complete machine storage system.

In some embodiments, the ground transfer device is universal, and transfer between any two systems can be carried out by the ground transfer device.

In some embodiments, the ground transfer device is only responsible for transfer between two systems, and includes a first ground transfer device between the heat exchanger general production system and the indoor unit production system, a second ground transfer device between the heat exchanger general production system and the outdoor unit production system, a third ground transfer device between the indoor unit production system and the packaging system, a fourth ground transfer device between the outdoor unit production system and the packaging system, and a fifth ground transfer device between the packaging system and the complete machine storage system.

The control system monitors detection information of the end detection unit of the production system through each sub-control system; outputs control information to the ground transfer device according to the detection information; and when the end detection unit of the production system detects that it is qualified, controls a ground transfer device to transfer the assembled components between the units through a sub-control system corresponding to the ground transfer device. The roller conveyor line is configured to connect the production units within each production system.

In some embodiments of FIGS. 2-5, the heat exchanger general production system, the indoor unit production system, the outdoor unit production system, and the packaging system each include a plurality of unit shelves located adjacent to the production unit and configured for receiving materials conveyed by the conveying system.

The unit shelf includes an identification or a signal generating device to be sensed by the position sensing device of the conveying system. The position sensing device of the crane senses the identification or a signal of the signal generating device, and when the crane arrives at a corresponding unit shelf, the crane stops and transfers the materials in the material container of the crane to the unit shelf.

The production unit includes a loading device and a material detection device.

The loading device is configured to load the materials on the unit shelf to the production unit.

The material detection device is configured to detect the quantity of materials on the unit shelf, and the control system is configured to control the conveying system to convey materials when the quantity of materials is lower than a threshold.

The unit shelf includes a material container placement region and a material temporary storage region, the material container conveyed by the crane can be placed in the material container placement region, and the materials in the material container can be loaded to the material temporary storage region by the loading device.

In some embodiments, the material container is placed in the material container placement region, and when a condition where the material detection device detects a shortage of materials and the detection unit detects that it is unqualified occurs, the crane system grasps the material container to the material storage system to re-supplement the materials. When the product is unqualified, it will be output through an unqualified conveyor line, and the control system is notified. The control system controls the conveying system to convey all materials in the upstream processes of the detection unit in the packaging system. When the detection unit detects that it is unqualified, the production flow is adjusted accordingly.

In some embodiments of FIGS. 2-5, the heat exchanger general production system, the indoor unit production system, the outdoor unit production system, and the packaging system each include a plurality of detection units, and the detection units are configured to detect whether it is qualified or not, and when the detection result by the detection unit is unqualified, output it through the unqualified conveyor line, and transmit unqualification information to the sub-control system, and the sub-control system transmits the information to the control system.

In some embodiments, after the detection unit acquires detection data, it transmits the detection data to the sub-control system where the detection unit is located, and the sub-control system determines whether it is qualified or not according to the detection data, conveys it to the next process when it is qualified, and outputs it through the unqualified conveyor line when it is unqualified.

The control system controls the conveying system to convey the materials before the detection unit and reproduce them.

In some embodiments of FIG. 2, the heat exchanger general production system includes an end plate information creating unit.

The end plate information creating unit is configured to use a unique identification of each end plate to form end plate information and create the end plate information onto the end plate.

The production units of the heat exchanger general production system each include an information acquisition module configured to acquire end plate information arriving at the production unit, and transmit the end plate information to the control system through the sub-control system, so as to facilitate the monitoring of the control system.

The information acquisition module uploads the acquired end plate information to the control system, and the control system associates the material information of the heat exchanger with the end plate information.

In some embodiments, the control system is configured to transmit material information for the conveyed heat exchanger and the corresponding indoor unit or outdoor unit to the end plate information creating unit, and the end plate information creating unit is configured to use the unique identification of the end plate and the material information associated with this unique identification to form the end plate information.

When the end plate is an indoor unit end plate, the end plate information includes a unique identification of the end plate and information of all materials forming the indoor unit; when the end plate is an outdoor unit end plate, the end plate information includes a unique identification of the end plate and information of all materials forming the outdoor unit. Therefore, when a failure occurs during the use of the air conditioner, all the material information can be acquired through the end plate information, so as to achieve quality traceability.

In some embodiments of FIG. 3A, FIG. 3B, FIG. 4A and FIG. 4B, the indoor unit production system and the outdoor unit production system include a support plate information creating unit.

The support plate information creating unit is configured to form a unique identification of each support plate as support plate information and create the support plate information onto the support plate.

The production units of the indoor unit production system and the outdoor unit production system are each provided with the information acquisition module configured to acquire support plate information arriving at the production unit; and transmit the support plate information to the control system through the sub-control system, so as to facilitate the monitoring of the control system.

The information acquisition module uploads the acquired support plate information to the control system through the sub-control system, the control system associates the support plate information with the indoor unit material or the outdoor unit material, and the control system is configured to monitor the support plate information of the production unit.

The packaging system includes a packaging sub-control system that communicates with the control system for data interaction. In some embodiments of FIG. 5, the packaging system includes a support plate information creating unit configured to create a unique identification of each support plate onto the support plate.

The production unit of the packaging system is provided with an information acquisition module (RFID) configured to acquire packaging support plate information arriving at the production unit; and transmit the packaging support plate information to the control system through the sub-control system, so as to facilitate the monitoring of the control system.

In some embodiments, the control system transmits that the indoor unit or the outdoor unit is about to arrive, and transmits a mark of the indoor unit or the outdoor unit to the support plate information creating unit, and the support plate information creating unit creates the mark of the indoor unit or the outdoor unit and the unique identification of the support plate onto the support plate. When the indoor unit is about to arrive, the packaging system controls the loading device to load the packaging material of the indoor unit, and when the outdoor unit is about to arrive, the packaging system controls the loading device to load the packaging material of the outdoor unit.

The information acquisition module may further acquire the mark of the indoor unit or the outdoor unit, and when the mark is the indoor unit, the packaging material of the indoor unit is loaded, and when the mark is the outdoor unit, the packaging material of the outdoor unit is loaded.

The packaging system includes a production information creating unit configured to create a production label onto the packaging.

The production information creating unit receives production information formed by material information, supplier information, production product information, production process information, and the like associated with the end plate information transmitted by the control system through the packaging sub-control system, and uses the production information to create a production label and place it onto the packaging.

The material information includes the material name and the material batch number.

The production product information includes:

Product number: it uniquely identifies the product, facilitating tracking during the production process.

Product model and specification: it specifies the specific model and specification of the product.

Production Date: it records the date when the product is manufactured.

Production batch number: it is bound to the production management system and is configured for tracing the production process.

The production process information includes:

Process route: it records the processing process flow of the product.

Position information: it records the position of the materials or the product on the production line.

Processing parameters: the working temperature, time and pressure of the production equipment at this station.

Process Information: it records the current completed processes of the product.

Quality detection results: it records the results of the product in each of the detection processes.

In some embodiments, the information acquisition module is an RFID code scanning device. The RFID code scanning equipment communicates with the self-control system, tracks the encoded data during the assembly process and uploads the data in real time, and performs information interaction, thereby ensuring the transparency and traceability of the production process.

Through the linkage of the warehousing information acquisition unit, the information acquisition module, the end plate information creating unit, the support plate information creating unit, and the packaging information creating unit, the production is monitored in real time, and the information exchange, traceability and closed loop from the material warehousing to the complete machine warehousing are realized.

In some embodiments, the production unit includes a production unit state detection module.

The production unit state detection module is configured to detect the operation state information of equipment of the production unit.

The control system is configured to determine or predict an equipment failure according to the operation state information. When it is determined that there is an equipment failure, the control system issues a warning message and notifies maintenance personnel to perform maintenance, so as to ensure that the equipment operates without abnormality.

In some embodiments, the sub-control system determines or predicts an equipment failure according to the operation state information. When it is determined that there is an equipment failure, the sub-control system informs the control system, and the control system issues a warning message and notifies maintenance personnel to perform maintenance, so as to ensure that the equipment operates without abnormality.

In some embodiments, the production unit state detection module includes sensors such as temperature, pressure, vibration, humidity, air tightness, piezoelectric resistance sensors, and the like.

In some embodiments, the production unit includes a unit lighting device, which is in a normally-off state, thereby saving a lot of energy and greatly reducing the energy consumption of the production system.

A unit lighting device is located on each of the production units and, when a unit lighting device lights up, it illuminates a corresponding production unit.

The control system is configured to, when it is determined or predicted that there is an equipment failure in a production unit, control a unit lighting equipment corresponding to the production unit to light up, so as to facilitate maintenance by the maintenance personnel.

In some embodiments of FIG. 6, the control system performs data interaction with each of the sub-control systems, and each of the sub-control systems monitors a respective system.

The control system implements the determination of the demand information, the establishment of the production flow, and comprehensively regulate the material transportation and supplement of unqualified materials, and carries out production monitoring, abnormal warning, energy-saving control and quality traceability.

At the same time, an intelligent viewing board can be provided, and relevant information can be transmitted to the intelligent viewing board for real-time displaying.

In some embodiments, the air conditioner production method of an operation and maintenance system for air conditioner production includes:
  acquiring air conditioner demand information;
  determining a production flow according to the air conditioner demand information; and
  controlling working states of the heat exchanger general production system, the indoor unit production system, and the outdoor unit production system according to the production flow; when producing the outdoor unit in the production flow, controlling the outdoor heat exchanger fin production unit, the general production units, and the bending unit to produce the outdoor heat exchanger, and controlling the outdoor unit production system to produce the outdoor unit; when producing the indoor unit in the production flow, controlling the indoor heat exchanger fin production unit and the general production units to produce the indoor heat exchanger, and controlling the indoor unit production system to produce the indoor unit.

In some embodiments, a required number of indoor units and a required number of outdoor units corresponding to an air conditioner model to be produced are determined according to the air conditioner demand information, and the number n of indoor heat exchangers to be continuously produced is determined, and the production flow is:
  controlling the heat exchanger general production system to first produce an outdoor heat exchanger to the outdoor unit production system, and then produce n indoor heat exchangers to the indoor unit production system;
  when the number of the indoor units reaches the required number of indoor units and the number of the outdoor units does not reach the required number of outdoor units, changing the production flow to controlling the heat exchanger general production system to produce the outdoor heat exchanger to the outdoor unit production system; and
  when the number of the outdoor units reaches the required number of outdoor units and the number of the indoor units does not reach the required number of indoor units, changing the production flow to controlling the heat exchanger general production system to produce the indoor unit heat exchanger to the indoor unit production system, where n is a natural number.

Through the above control method, the increase of energy consumption caused by no-load of the production line is effectively reduced, the entering and exit of the warehouse are convenient, and the management efficiency is improved.

In some embodiments, the method of determining the number n of the indoor heat exchangers to be continuously produced is: determining the number n of the indoor heat exchangers to be continuously produced as being the number n of the indoor units included in one set of air conditioner system.

In some embodiments, the method of determining the number n of the indoor heat exchangers to be continuously produced is:
  determining a time t3 for producing the indoor units and a time t4 for producing the outdoor units according to the air conditioner model to be produced, and determining the n by dividing the time t4 for the outdoor units by the time t3 for the indoor units and then performing rounding.

In some embodiments, when the production flow is to produce an outdoor heat exchanger, the outdoor heat exchanger fin production unit is controlled to produce an outdoor heat exchanger fin, a pipe bending unit of the general production units cuts a tube through a first cutting station, an operating frequency of a pipe expansion unit of the general production units is a first frequency, and the bending unit bends the unbent outdoor heat exchanger;

when the production flow is to produce an indoor heat exchanger, the indoor heat exchanger fin production unit is controlled to produce an indoor heat exchanger fin, the pipe bending unit of the general production units cuts a tube through a second cutting station, the operating frequency of the pipe expansion unit of the general production units is a second frequency, and the bending unit do not work;

Where the length of the tube cut by the first cutting station is the length of the outdoor heat exchanger tube, the length of the tube cut by the second cutting station is the length of the indoor heat exchanger tube, and the second frequency is lower than the first frequency.

The following is the theoretical derivation of the threshold of power:

(1) Derivation of a formula of a friction force for the relative motion between the pipe expansion device and the copper pipe wall to overcome. Contact area: a cylindrical surface is expanded into a rectangle, and the area is:

$$A = 2\pi r_i L \quad (1)$$

The pressure is:

$$F_{positive} = \pi \cdot 2\pi r_i L \quad (2)$$

The friction force is:

$$F_f = \mu \cdot F_{positive} = 2\pi L \cdot p \cdot r_i \cdot \mu \quad (3)$$

Where, p (in unit Pa) is the contact pressure of the expansion head on the copper pipe (normal pressure per unit area); $r_i$ (in unit m) is the initial inner radius of the copper pipe; L (in unit m) is the contact length between the expansion device and the copper pipe; and $\mu$ is the coefficient of friction.

(2) The derivative of the plastic deformation force is the radial expansion of the copper pipe, that is, the energy required for material yield and other effects. In the plastic phase, according to the Tresca yield criterion, when $\sigma_\theta - \sigma_r$ reaches the yield strength $\sigma_y$ of the material, the material yields. The circumferential stress $\sigma_e$ is satisfied.

$$\sigma_e - \sigma_r = \sigma_y \quad (4)$$

Since the radial stress is much less than the circumferential stress ($\sigma_r \ll \sigma_\theta$), this approximation has the dominant stress:

$$\sigma_\theta \approx \sigma_y \quad (5)$$

Where $\sigma_r$ is the radial stress; $\sigma_y$ is the yield strength of copper pipe; $r_o$ (in unit m) is the expanded outer radius; and r (in unit m) is the average radius of the deformation zone. Assuming that:

$$r = \frac{r_i + r_o}{2} \quad (6)$$

The circumferential strain is:

$$\varepsilon_\theta = \ln\left(\frac{r_o}{r_i}\right) \quad (7)$$

The work of the plastic deformation is:

$$W = \sigma_y \cdot \varepsilon_\theta \cdot V \quad (8)$$

In the above equations (assuming that the plastic deformation zone is cylindrical), $V = \sigma r^2 L$. Assuming that the displacement $\Delta L$ of the expansion device is consistent with the volume change, the equivalent force of plastic deformation of the expanded pipe is:

$$F_p = \frac{W}{\Delta L} = \pi r^2 \cdot \sigma_y \cdot \ln\left(\frac{r_o}{r_i}\right) \quad (9)$$

The pipe expansion force is the sum of the friction force and the plastic deformation force:

$$F_{expansion} = F_f + F_p = 2\pi L \cdot p \cdot r_i \cdot \mu + \pi r^2 \cdot \sigma_y \cdot \ln\left(\frac{r_o}{r_i}\right) \quad (10)$$

Based on the above derivation, the following parameters are substituted into:

Effective contact length: L=0.0050 m
Radial pressure: p=50×10$^6$ Pa (experimental calibration)
Coefficient of friction: $\mu$=0.01
Pipe yield strength: $\sigma_y$=60×10$^6$ Pa.
Inner pipe radius range: $r_i$=the pipe is expanded from 0.006 m to 0.008 m $$F_{expansion} \approx 2750 \text{ N}$$

From the above, it can be derived that, the threshold of the pipe expansion power is calculated to be about 2750 N, and the forces below this value correspond to a primary pipe expansion force zone, which matches the primary pipe expansion power in the equipment of the production line, and the forces equal to or higher than this value correspond to a secondary pipe expansion force zone, which matches the secondary power. This formula provides guidance for the selection of the model of the expander and the optimization of the machine power, followed by the control system to switch to the corresponding expansion device and the corresponding frequency to match the expansion task. In some embodiments, the forces below 2750 N correspond to the second power of the device, and the forces equal to or higher than 2750 N correspond to the first power.

In some embodiments, the method of acquiring the air conditioner demand information includes:

acquiring an order, and acquiring the air conditioner demand information according to the order;

and/or, predicting air conditioner demand information for a future time period based on historical data.

The production flow is interconnected with user needs, the information is transmitted in real time, and the user orders are used to drive collaborative manufacturing and accurate matching between processes, forming a mode of production by order and flexible manufacturing, which can quickly respond to the diverse needs of users.

By predicting the demand information of air conditioners for the future period according to the historical data, productions can be performed in advance, so as to meet the market demand as soon as possible.

In some embodiments, the crane of the conveying system identifies a storage position of a material and loads the material;

the crane identifies a position of a target unit shelf, and transfers a material to the target unit shelf;

a material quantity on the unit shelf is detected, and the conveying system is controlled to convey a material when the material quantity is lower than a threshold.

In some embodiments, when a detection result by a detection unit is unqualified, the conveying system conveys materials before the detection unit and re-produces the material before the detection unit.

In some embodiments, the conveying system transmits the conveyed heat exchange material information to the control system;

an end plate information creating unit of the heat exchanger general production system uses a unique identification of each end plate to form end plate information and create the end plate information onto the end plate; the control system acquires the end plate information;

a support plate information creating unit of the indoor unit production system or the outdoor unit production system forms a unique identification of each support plate as support plate information and create the support plate information onto the support plate; the control system acquires the support plate information; and the control system associates the end plate information, the support plate information and the conveyed material information, and records production product information and production process information. In this way, a transparent production process is formed, which is conducive to the quality traceability of the product.

In some embodiments, the control system transmits the conveyed material information to an end plate information creating unit, and the end plate information creating unit uses the material information and a unique identification of each end plate to from end plate information and create the end plate information onto the end plate, so as to facilitate quality traceability by scanning the end plate information when a failure occurs in the air conditioner.

Figure 8:
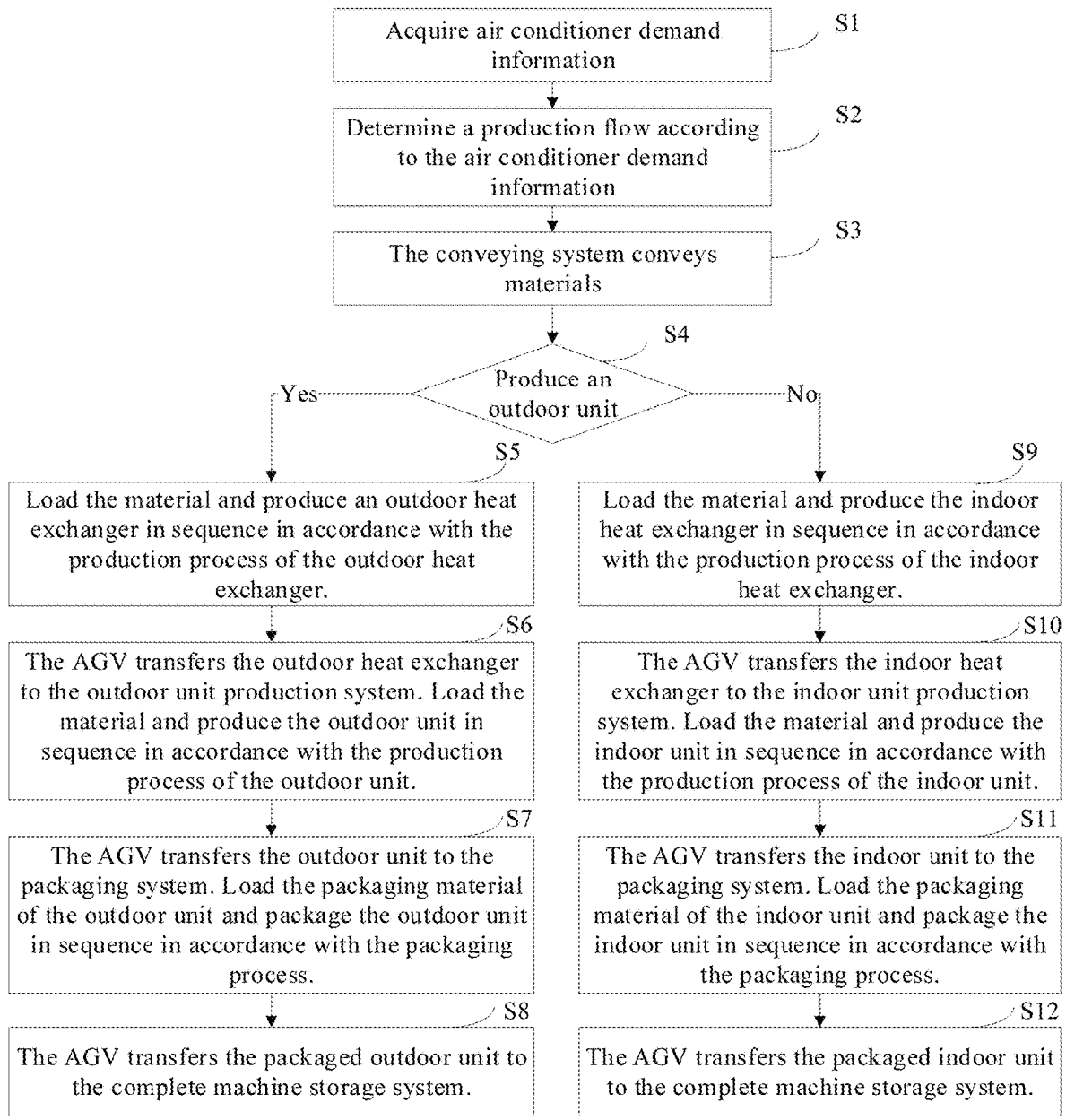
FIG. 8 is a flowchart of an air conditioner production method provided by some embodiments of the present disclosure.

In some embodiments of FIG. 8, the air conditioner production method includes the following steps:

In S1, air conditioner demand information is acquired.

In S2, a production flow is determined according to the air conditioner demand information.

The production flow includes a production flow by a heat exchanger general production system, in which, in some embodiments, n indoor heat exchangers are produced after one outdoor heat exchanger is produced, n indoor heat exchangers are produced after one outdoor heat exchanger is produced, and these are circularly repeated in sequence, until the number of the indoor units or the number of the outdoor units reaches the required number, at that time, the production flow is changed.

When the number of the indoor units reaches the required number of indoor units and the number of the outdoor units does not reach the required number of outdoor units, the production flow is changed to controlling the heat exchanger general production system to produce the outdoor heat exchanger to the outdoor unit production system, until the number of the outdoor units reaches the required number;

when the number of the outdoor units reaches the required number of outdoor units and the number of the indoor units does not reach the required number of indoor units, changing the production flow to controlling the heat exchanger general production system to produce the indoor unit heat exchanger to the indoor unit production system, until the number of the indoor units reaches the required number of the indoor units.

In S3, the conveying system conveys materials.

In S4, when it is determined to produce an outdoor unit according to the production flow, the process proceeds to step S5, otherwise, the process proceeds to step S9.

In S5, the material is loaded and an outdoor heat exchanger is produced in sequence in accordance with the production process of the outdoor heat exchanger.

During the production process, the end plate information creating unit creates the end plate information onto the end plate and uploads the end plate information to the control system. The information acquisition module acquires the end plate information and uploads it to the control system, and the control system can determine the position of the end plate according to the information acquisition module.

The detection unit detects whether it is qualified or not, when it is qualified, it is proceeded to the next process, and when it is unqualified, it is output through an unqualified conveyor line, and the control system is notified. The control system controls the conveying system to convey all the materials in the upstream processes of the detection unit, including this system and the upstream systems.

In S6, the AGV transfers the outdoor heat exchanger to the outdoor unit production system, and the material is loaded and the outdoor unit is produced in sequence in accordance with the production process of the outdoor unit.

During the production process, the support plate information creating unit creates the support plate information onto the support plate and uploads the support plate information to the control system. The information acquisition module acquires the support plate information and uploads it to the control system, and the control system can determine the position of the support plate according to the support plate information acquisition module.

The detection unit detects whether it is qualified or not, when it is qualified, it is proceeded to the next process, and when it is unqualified, it is output through an unqualified conveyor line, and the control system is notified. The control system controls the conveying system to convey all the materials in the upstream processes of the detection unit, including this system and the upstream systems.

In S7, the AGV transfers the outdoor unit to the packaging system, and the packaging material of the outdoor unit is loaded and the outdoor unit is packaged in sequence in accordance with the packaging process.

During the production process, the packaging support plate information creating unit creates the packaging support plate information onto the support plate and uploads the packaging support plate information to the control system. The information acquisition module acquires the packaging support plate information and uploads it to the control system, and the control system can determine the position of the packaging support plate according to the packaging support plate information acquisition module.

The control system forms production information by using material information, supplier information, production product information, production process information, and the like associated with the end plate information, and uses the production information to create a production label and place it onto the packaging.

The detection unit detects whether it is qualified or not, when it is qualified, it is proceeded to the next process, and when it is unqualified, it is output through an unqualified conveyor line, and the control system is notified. The control system controls the conveying system to convey all materials in the upstream processes of the detection unit in the packaging system.

In S8, the AGV transfers the packaged outdoor unit to the complete machine storage system.

The process proceeds to step S4.

In S9, the material is loaded and the indoor heat exchanger is produced in sequence in accordance with the production process of the indoor heat exchanger.

During the production process, the end plate information creating unit creates the end plate information onto the end plate and uploads the end plate information to the control system. The information acquisition module acquires the end plate information and uploads it to the control system, and the control system can determine the position of the end plate according to the information acquisition module.

The detection unit detects whether it is qualified or not, when it is qualified, it is proceeded to the next process, and when it is unqualified, it is output through an unqualified conveyor line, and the control system is notified. The control system controls the conveying system to convey all the materials in the upstream processes of the detection unit, including this system and the upstream systems.

In S10, the AGV transfers the indoor heat exchanger to the indoor unit production system, and the material is loaded and the indoor unit is produced in sequence in accordance with the production process of the indoor unit.

During the production process, the support plate information creating unit creates the support plate information onto the support plate and uploads the support plate information to the control system. The information acquisition module acquires the support plate information and uploads it to the control system, and the control system can determine the position of the support plate according to the support plate information acquisition module.

The detection unit detects whether it is qualified or not, when it is qualified, it is proceeded to the next process, and when it is unqualified, it is output through an unqualified conveyor line, and the control system is notified. The control system controls the conveying system to convey all the materials in the upstream processes of the detection unit, including this system and the upstream systems. In some embodiments, before the production starts, the control system instructs the conveying system (such as a crane material transportation system) to convey m sets of complete production materials from the material storage system to each unit shelf of the corresponding production system (such as the indoor unit production system and the heat exchanger general production system upstream thereof) according to a determined production plan (for example, to produce m indoor units). During the production process, if a detection unit (e.g., the welding appearance detection unit or the air tightness detection unit) in a certain production system detects a unqualified product, the system will immediately trigger the following parallel operations: the unqualified product is immediately guided to a dedicated unqualified conveyor line for output, and is separated from the main production flow, so as to avoid affecting or blocking the subsequent processes. At the same time, the detection unit immediately uploads data containing information such as the identity of the product, the type of the unqualification, the location, and the like to the control system.

Figure 9:
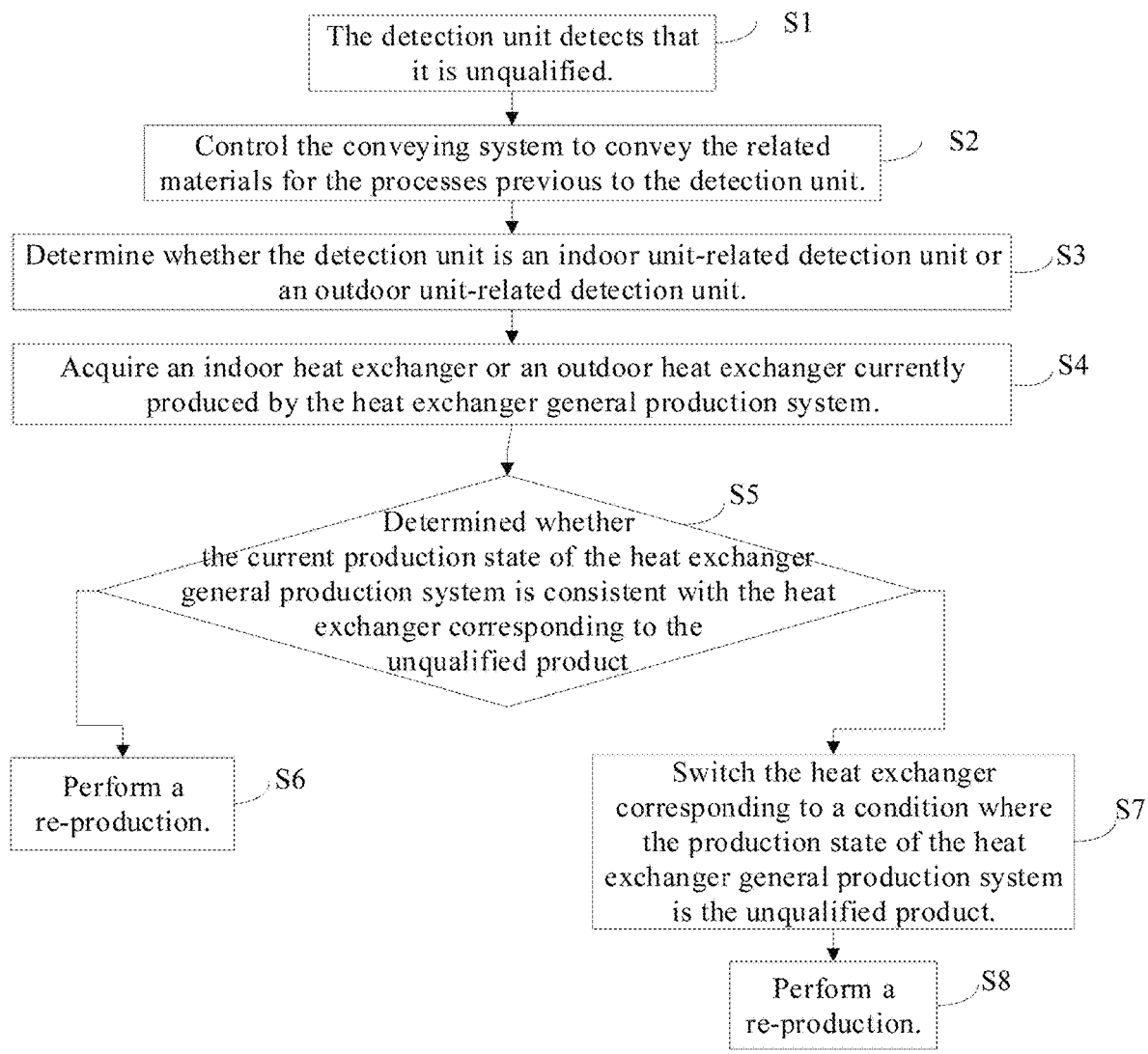
FIG. 9 is a schematic diagram of the changing the production flow when the air conditioner detection unit detects that it's unqualified provided by some embodiments of the present disclosure.
Figure 10:
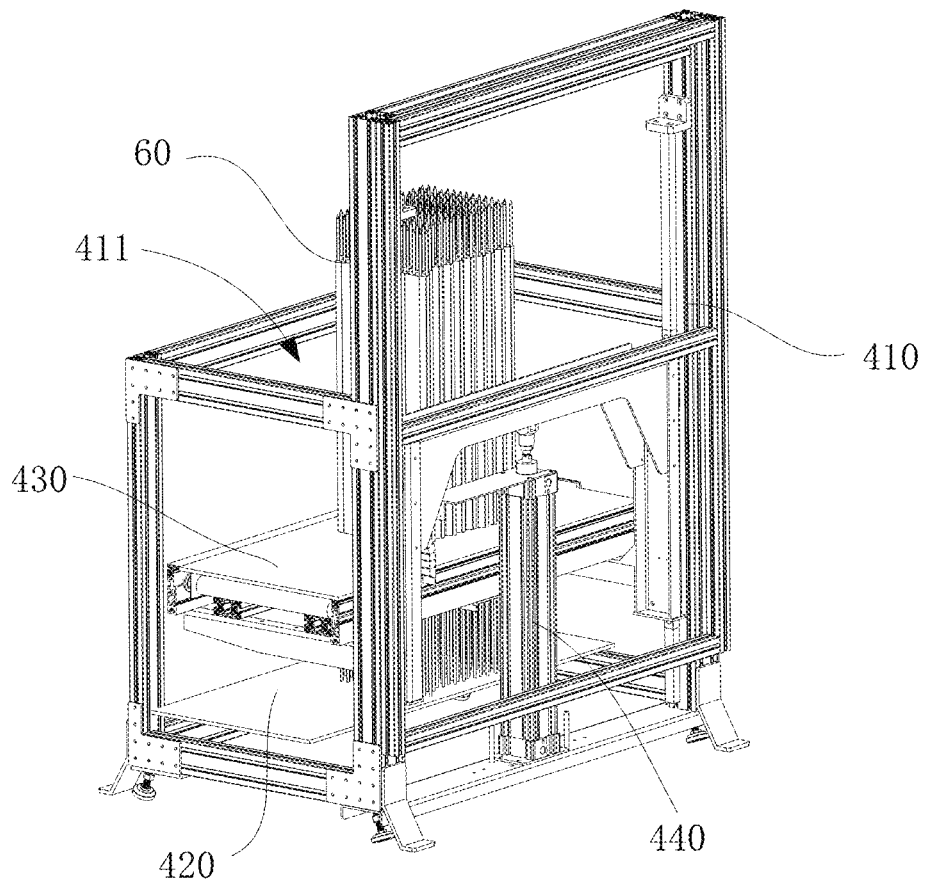
FIG. 10 is a partial structural diagram of a fin deposit-withdraw equipment provided by some embodiments of the present disclosure.
Figure 11:
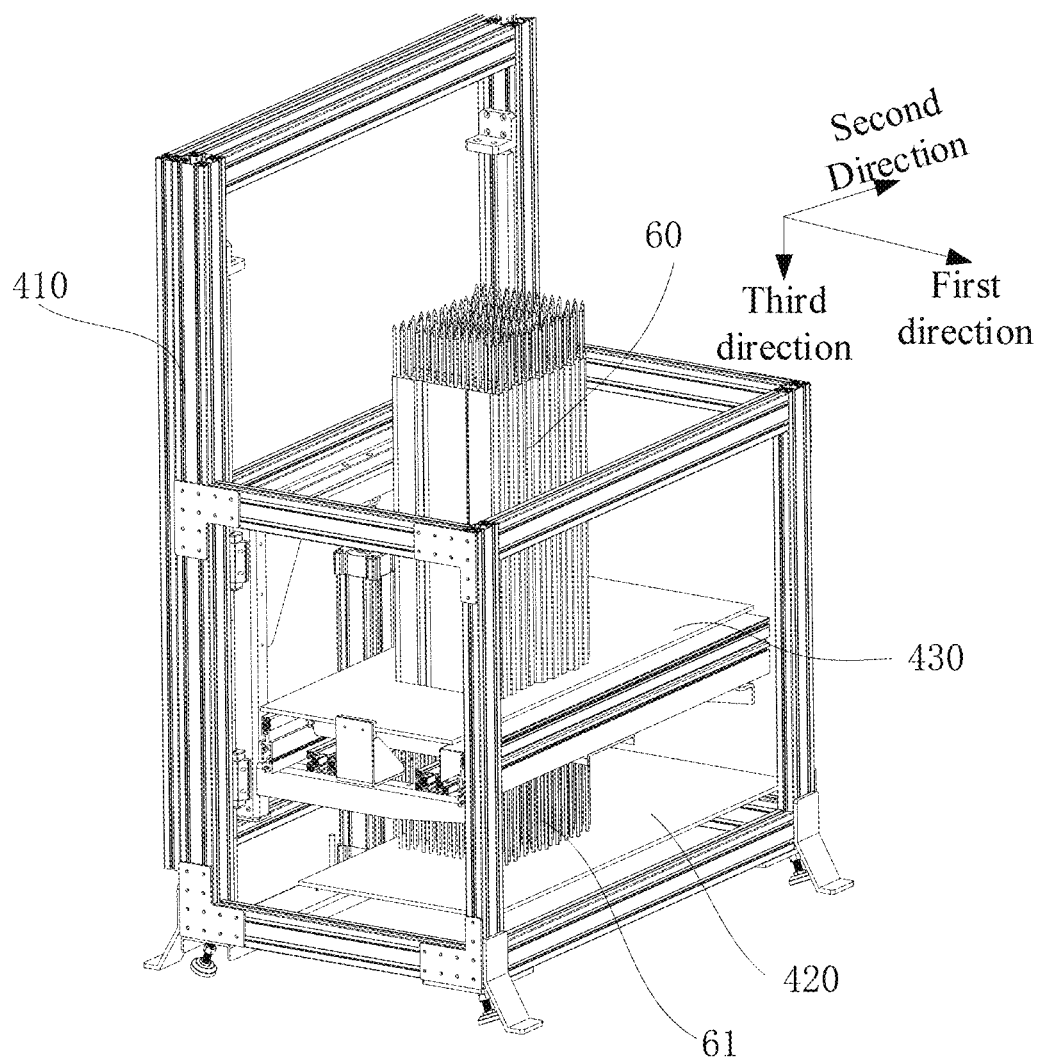
FIG. 11 is a position diagram of a lifting support plate in a material deposit state provided by some embodiments of the present disclosure.
Figure 12:
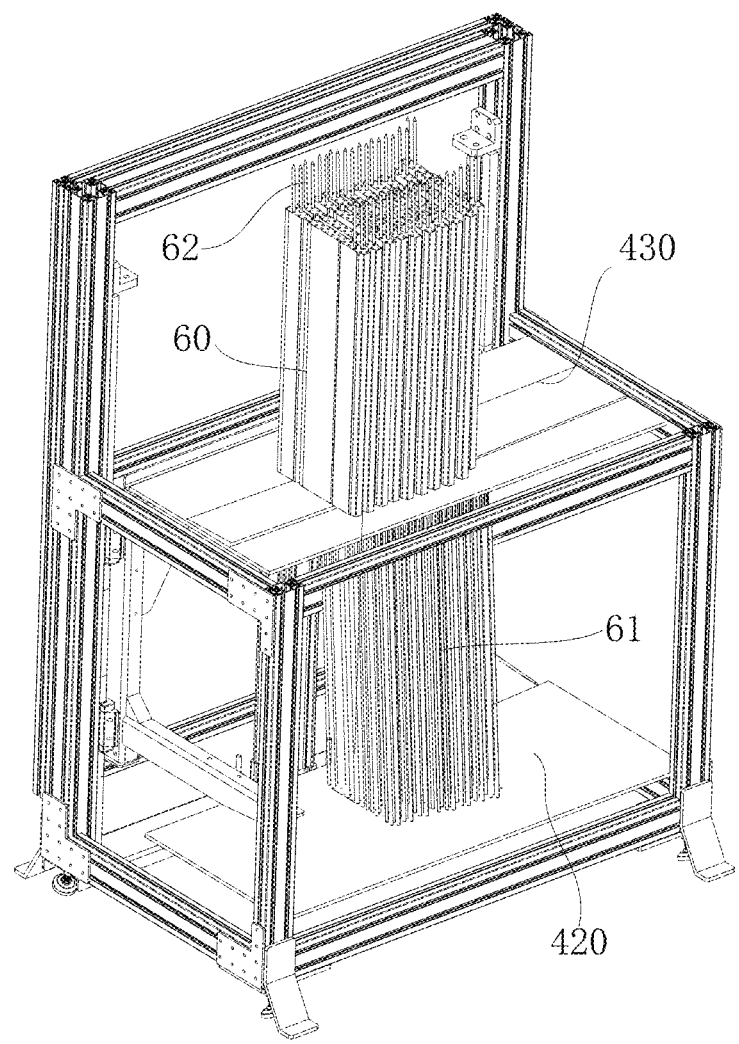
FIG. 12 is a position diagram of a lifting support plate in a material withdraw state provided by some embodiments of the present disclosure.

After receiving the unqualification information, the control system does not interrupt the current production plan that is underway, but executes a material supplement instruction. It will instruct the conveying system to convey an additional complete set of materials required for producing this product, and involving the detection unit and all the upstream processes thereof, to the corresponding unit shelf. For example, if it is detected to be unqualified at the indoor unit pipeline welding station, the control system will instruct to supplement a set of materials for all the previous processes of the heat exchangers, the pipelines, the valves, etc. The production line will continue to produce according to the original rhythm, until the production tasks of all m products in the initial plan are completed. This design ensures that the overall operation efficiency and planning of the production line is not disturbed by the individual unqualified products. After completing the original production plan, the control system automatically starts the supplementary production mode according to the previously recorded number of unqualified products (the process is shown in FIG. 9). It will use the materials that have been sufficiently supplemented in advance to produce the corresponding quantity of qualified products as needed, to make up for the quantity gap caused by the unqualified products. The process mechanism for the unqualified products is recyclable. If k unqualified products are detected in total in the process of producing m products, the control system will trigger k "material supplement" instructions successively, and k sets of supplement materials will be prepared besides the production line. After the original plan is completed, the supplementary production mode will run continuously k times to ensure that m qualified products will eventually off-line.

In S11, the AGV transfers the indoor unit to the packaging system, and the packaging material of the indoor unit is loaded and the indoor unit is packaged in sequence in accordance with the packaging process.

During the production process, the packaging support plate information creating unit creates the packaging support plate information onto the support plate and uploads the packaging support plate information to the control system. The information acquisition module acquires the packaging support plate information and uploads it to the control system, and the control system can determine the position of the packaging support plate according to the packaging support plate information acquisition module.

The control system forms production information by using material information, supplier information, production product information, production process information, and the like associated with the end plate information, and uses the production information to create a production label and place it onto the packaging.

The detection unit detects whether it is qualified or not, when it is qualified, it is proceeded to the next process, and when it is unqualified, it is output through an unqualified conveyor line, and the control system is notified. The control system controls the conveying system to convey all materials in the upstream processes of the detection unit in the packaging system.

In S12, the AGV transfers the packaged indoor unit to the complete machine storage system.

The process proceeds to step S4.

In some embodiments of FIG. 9, when the detection unit detects that it is unqualified, the production flow is adjusted:

In S1, the detection unit detects that it is unqualified.

In S2, the conveying system is controlled to convey the related materials for the processes before the detection unit.

In S3, it is determined whether the detection unit is an indoor unit-related detection unit or an outdoor unit-related detection unit.

The indoor unit-related detection unit includes detection units of the indoor unit production system and the indoor heat exchanger production system, and the outdoor unit-related detection unit includes detection units of the outdoor unit production system and the outdoor heat exchanger production system.

In S4, an indoor heat exchanger or an outdoor heat exchanger currently produced by the heat exchanger general production system is acquired.

In S5, it is determined whether the current production state of the heat exchanger general production system is consistent with the heat exchanger corresponding to the unqualified product; if yes, the process proceeds to step S6; otherwise, the process proceeds to step S7.

In S6, a re-production is performed.

In S7, the heat exchanger corresponding to a condition where the production state of the heat exchanger general production system is the unqualified product is switched.

In S8, a re-production is performed.

In some embodiments, operation state information of an equipment of the production unit is detected;
an equipment failure is determined or predicted according to the operation state information.

In some embodiments, a unit lighting equipment of the production unit is controlled to be in a normally-off state;
when the equipment failure of the production unit is determined or predicted, the unit lighting equipment corresponding to the production unit is controlled to light up.

Referring to FIGS. 10 to 13, the indoor heat exchanger fin production unit and the outdoor heat exchanger fin production unit each include a fin deposit-withdraw equipment, the fin deposit-withdraw equipment includes a deposit-withdraw bracket 410, a supporting bottom plate 420, a lifting support plate 430, and an off-line robot 450. The deposit-withdraw bracket 410 is a frame structure as a whole, and a storage position is formed therein, and the supporting bottom plate 420 is horizontally arranged on the deposit-withdraw bracket 410, specifically, at the bottom of the storage position formed in the deposit-withdraw bracket 410.

Falling needles 61 are vertically arranged on the support bottom plate 420, the bottoms of the falling needles 61 are fixed on the support bottom plate 420, and the tops of the falling needles 61 are arranged vertically upward, and are configured for falling and positioning of the fins fall into the storage position after being processed and shaped.

It is defined that the length direction of the fin is a first direction, the width direction of the fin is a second direction, and the thickness direction of the fin is a third direction. Along the second direction, the fins in the storage position form a plurality of sets of fin stacks 60, and each set of fin stack 60 includes a plurality of fins stacked on the falling needles 61 along the third direction.

Figure 14:
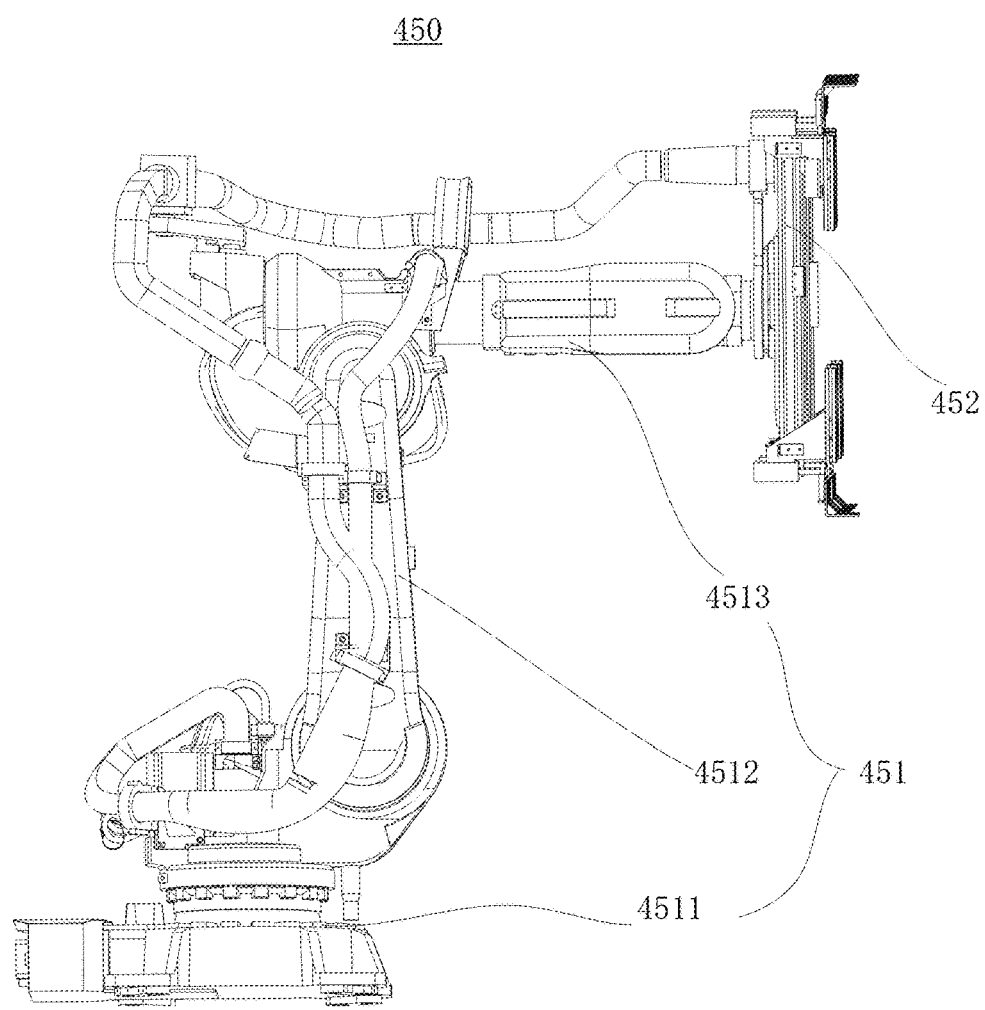
FIG. 14 is a structural diagram of an off-line robot provided by some embodiments of the present disclosure.

Referring to FIG. 14, the off-line robot 450 is configured to transfer each set of fin stack 60 onto the roller conveyor line.

The lifting support plate 430 is arranged above the support bottom plate 420 in parallel, and is connected to the deposit-withdraw bracket 410 in a manner of being movable along the third direction, the lifting support plate 430 is formed with communication holes 432, and the fin is formed with penetrating insertion holes, and the falling needles 61 are connected to the corresponding insertion holes through the communication holes 432.

The deposit-withdraw bracket 410 is provided with a lifting cylinder 440, and the output end of the lifting cylinder 440 is connected to the lifting support plate 430, and is configured to drive the lifting support plate 430 to move along the height direction of the deposit-withdraw bracket 410.

When the lifting support plate 430 moves up and down along the third direction, the falling needles 61 are fixed and do not move, and the insertion holes and the communication holes 432 move up and down with respect to the falling needles 61.

After a fin stack 60 is formed in the storage position, a positioning needle 62 is further provided on the fin stack 60.

The positioning needle 62 is arranged in a reserved insertion hole, one end of the positioning needle 62 is supported on the lifting support plate 430, and the other end thereof extends above the fin stack 60.

No communication hole 432 is designed at the position of the lifting support plate 430 that corresponds to the positioning needle 62. As the lifting support plate 430 moves up and down, the positioning needle 62 also moves along with it, so that the fins in the same set of fin stack 60 are always connected together in series.

Referring to FIG. 14, the off-line robot 450 includes an off-line robot body 451 and an off-line clamp 452, and the off-line clamp 452 is provided on the off-line robot body 451.

The off-line robot body 451 includes an off-line robot base 4511, an off-line robot big arm 4512, and an off-line robot small arm 4513, which are connected in this order.

In addition, the off-line robot 450 also includes a robot motor and a vision camera, where the off-line robot base 4511 is fixed to the ground by bolts, the robot motor is connected to the off-line robot base 4511 of the off-line robot 450 by bolts, the off-line robot base 4511, the off-line robot big arm 4512, and the off-line robot small arm 4513 are each connected by sliding joints, and the vision camera is provided on the off-line clamp 452, and is configured to acquire position information of the fin stacks 60.

Figure 15:
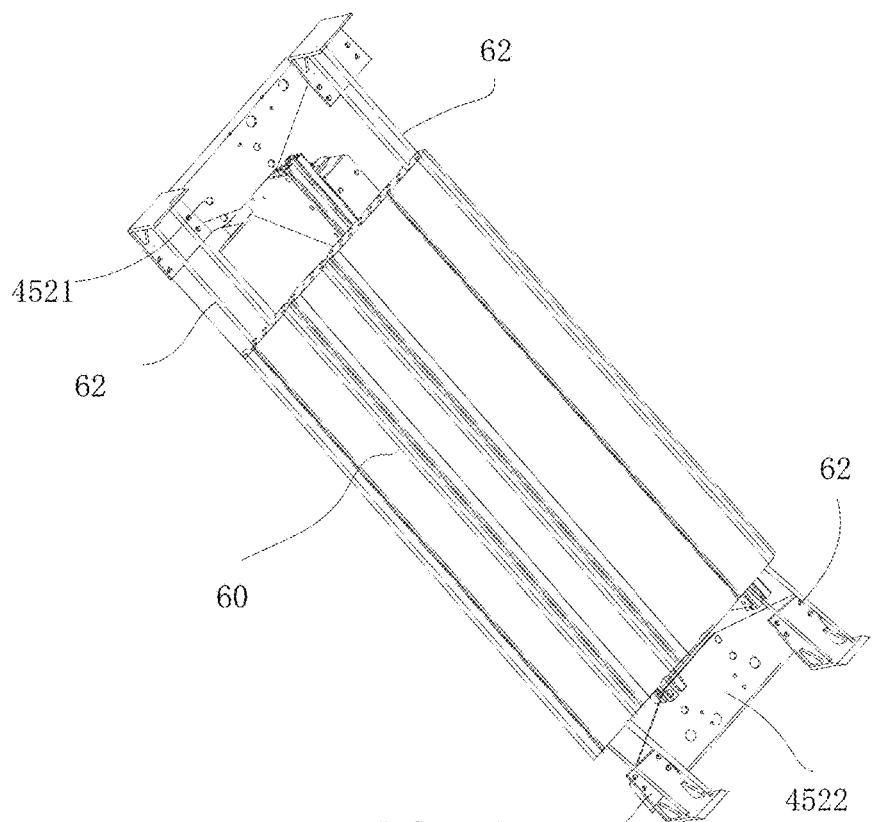
FIG. 15 is a structural diagram of an off-line clamp.
Figure 16:
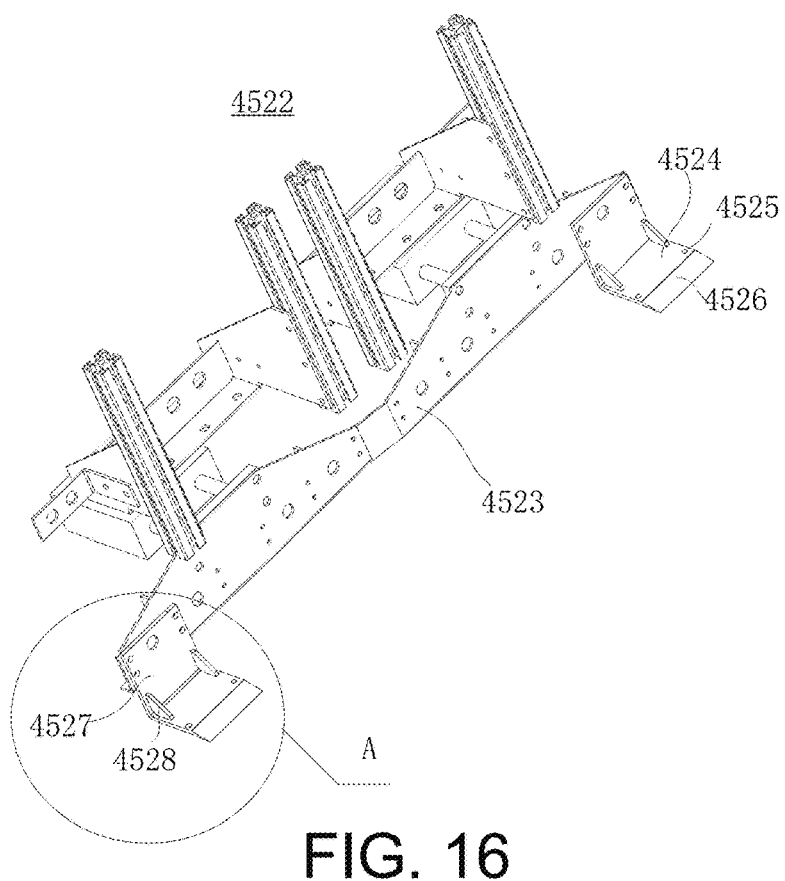
FIG. 16 is a structural diagram of a second off-line clamping member provided by some embodiments of the present disclosure.
Figure 17:
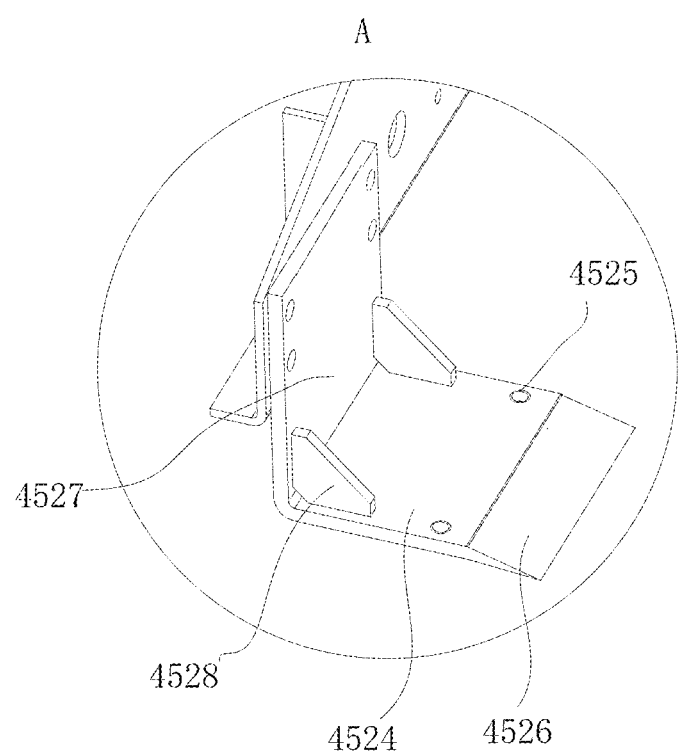
FIG. 17 is an enlarged view of position A in FIG. 16.

Referring to FIGS. 15 to 17, the off-line clamp 452 includes a first off-line clamping member 4521 and a second off-line clamping member 4522 symmetrically disposed, and the first off-line clamping member 4521 and the second off-line clamping member 4522 are respectively provided with clamping portions for clamping at both ends of the positioning needle 62.

The off-line robot 450 is configured to grasp at both ends of the fin stack 60 on the lifting support plate 430, and transfer it to a target position, that is, grasp the fin stack 60 onto the roller conveyor line.

Along the length direction of each fin, at least one positioning needle 62 is respectively inserted at both ends of the fin stack 60, the bottom of the positioning needle 62 is in contact with the lifting support plate 430, the top of the positioning needle 62 extends to the upper end of the fin stack 60, and the first off-line clamping member 4521 and the second off-line clamping member 4522 are respectively configured for clamping the upper end of the positioning needle 62 and the lower end of the positioning needle 62.

The first off-line clamping member 4521 and the second off-line clamping member 4522 are respectively connected to a distal end of the off-line robot small arm 4513 by clamping power members. The first off-line clamping member 4521 includes two first off-line clamping jaws 4513 arranged at interval, and the second off-line clamping member 4522 includes two second off-line clamping jaws 4513 arranged at interval. The first off-line clamping jaws 4513 are configured to clamp the upper end of the positioning needle 62, and the second off-line clamping jaws 4513 are configured to clamp the lower end of the positioning needle 62.

The number of clamping power members may be two, and the clamping power members each include an output end, and the output ends are respectively connected with the first off-line clamping jaws and the second off-line clamping jaws.

Alternatively, the number of the clamping power members is one, and the one clamping power member is provided with two output ends, and the two output ends are respectively located on both sides of the clamping power member, and are respectively connected with the first off-line clamping jaws and the second off-line clamping jaws.

The first off-line clamping jaws and the second off-line clamping jaws are respectively connected to the clamping power members through an adapter plate 4523. That is, the output ends of the clamping power members are connected to the adapter plate 4523, and the first off-line clamping jaws and the second off-line clamping jaws are respectively connected and fixed to the adapter plate 4523 on the corresponding side.

A first positioning clamping plate perpendicular to the adapter plate 4523 is formed on the first off-line clamping jaw, and at least one first positioning recess having an opening toward the second off-line clamping jaw is formed on the first positioning clamping plate.

A second positioning clamping plate 4524 perpendicular to the adapter plate 4523 is formed on the second off-line clamping jaw, and at least one second positioning recess 4525 having an opening toward the first off-line clamping jaw is formed on the second positioning clamping plate 4524.

In the clamped state, the upper end of the positioning needle 62 is inserted into the first positioning recess, and the lower end of the positioning needle 62 is inserted into the second positioning recess 4525.

The first off-line clamping jaw further includes a first connecting plate, the first connecting plate is arranged perpendicular to the first positioning clamping plate, and the first positioning clamping plate is detachably connected to the adapter plate 4523 through the first connecting plate.

The second off-line clamping jaw further includes a second connecting plate 4527, the second connecting plate 4527 is arranged perpendicular to the second positioning clamping plate 4524, and the second positioning clamping plate 4524 is detachably connected to the adapter plate 4523 through the second connecting plate 4527.

The first connecting plate and the first positioning clamping plate are in an integrated structure, the second connecting plate 4527 and the second positioning clamping plate 4524 are in an integrated structure. Reinforcing ribs 4528 are respectively provided between the first connecting plate and the first positioning clamping plate and between the second connecting plate 4527 and the second positioning clamping plate 4524, to improve the connection strength between the first connecting plate and the first positioning clamping plate and between the second connecting plate 4527 and the second positioning clamping plate 4524.

The end of the second positioning clamping plate 4524 corresponding to the lower end of the fin stack 60 is formed with a guide inclined surface 4526 for lifting the bottommost fin of the fin stack 60 and guiding the lower end of the positioning needle 62 into the second positioning recess 4525 during the movement of the second off-line clamping jaw to the bottom of the fin stack 60.

Figure 13:
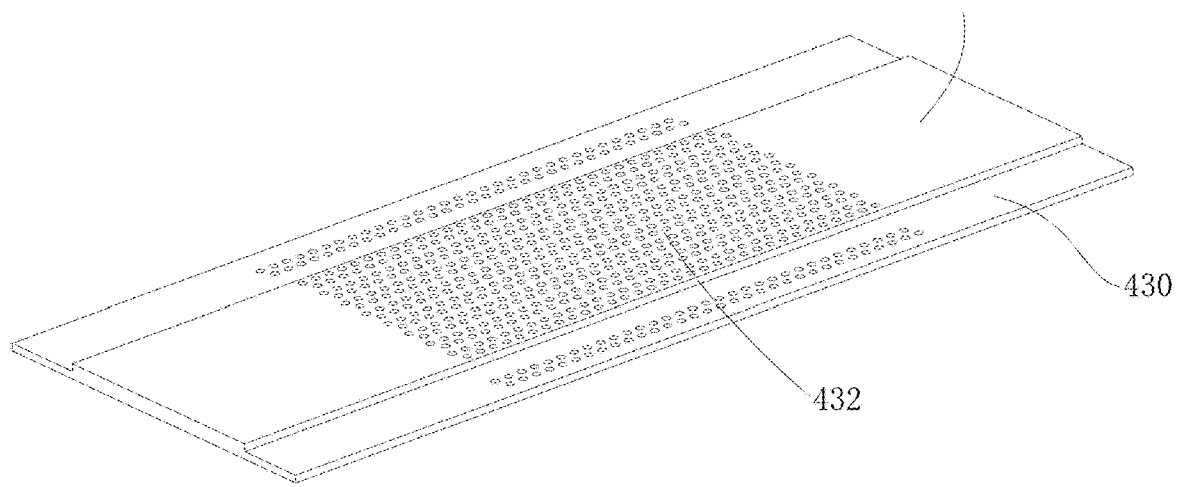
FIG. 13 is a structural diagram of a lifting support plate provided by some embodiments of the present disclosure.

In order to facilitate the clamping by the second positioning clamping plate 4524, in some embodiments of FIG. 13, a support protruding portion 431 extending upwardly is formed on the lifting support plate 430, and the length of the support protruding portion 431 along the first direction is smaller than the length of the fin.

Each fin stack 60 is supported on the support protruding portion 431, and under the action of the support protruding portion 431, a clamping gap is formed between the bottom of each fin stack 60 and the lifting support plate 430. The second off-line clamping member 4522 moves through the clamping gap to the bottom of the fin stack 60 to clamp the positioning needle 62.

In order to avoid interference between the adapter plate 4523 on the second positioning clamping plate 4524 and the support protruding portion 431 during the clamping process, the present disclosure designs the length of the second connecting plate 4527 to extend downward, so that the adapter plate 4523 is located above the support protruding portion 431 during the clamping process of the second positioning clamping plate 4524, thereby avoiding the interference.

Figure 18:
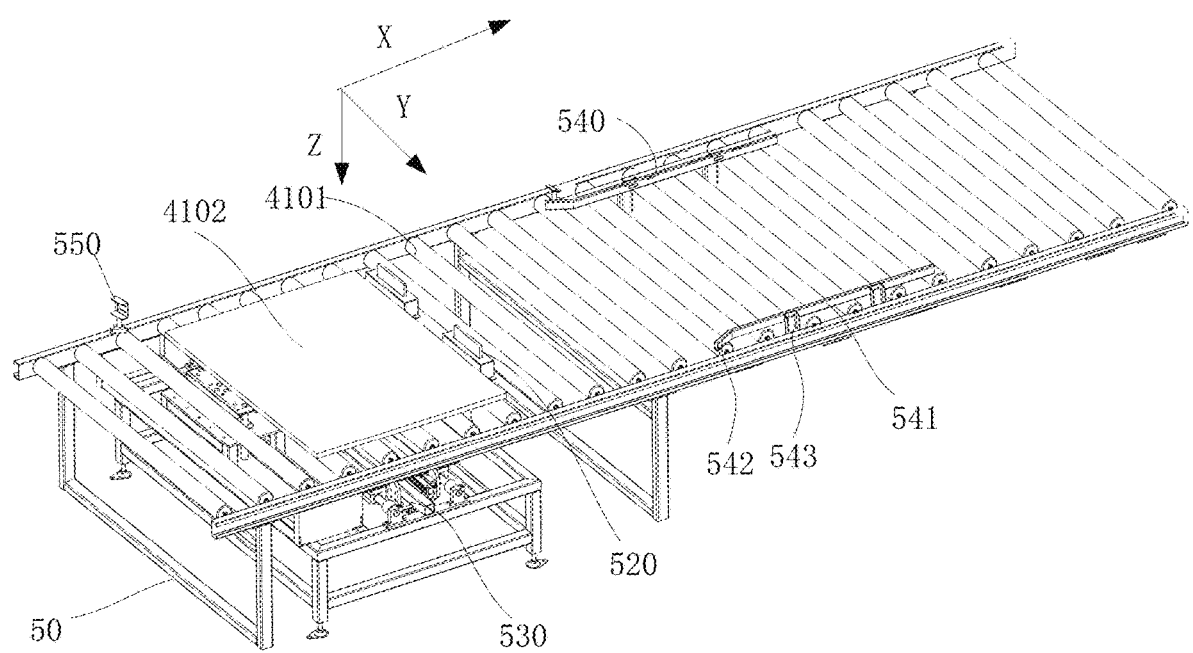
FIG. 18 is a partial structural diagram of an end plate mounting equipment.
Figure 19:
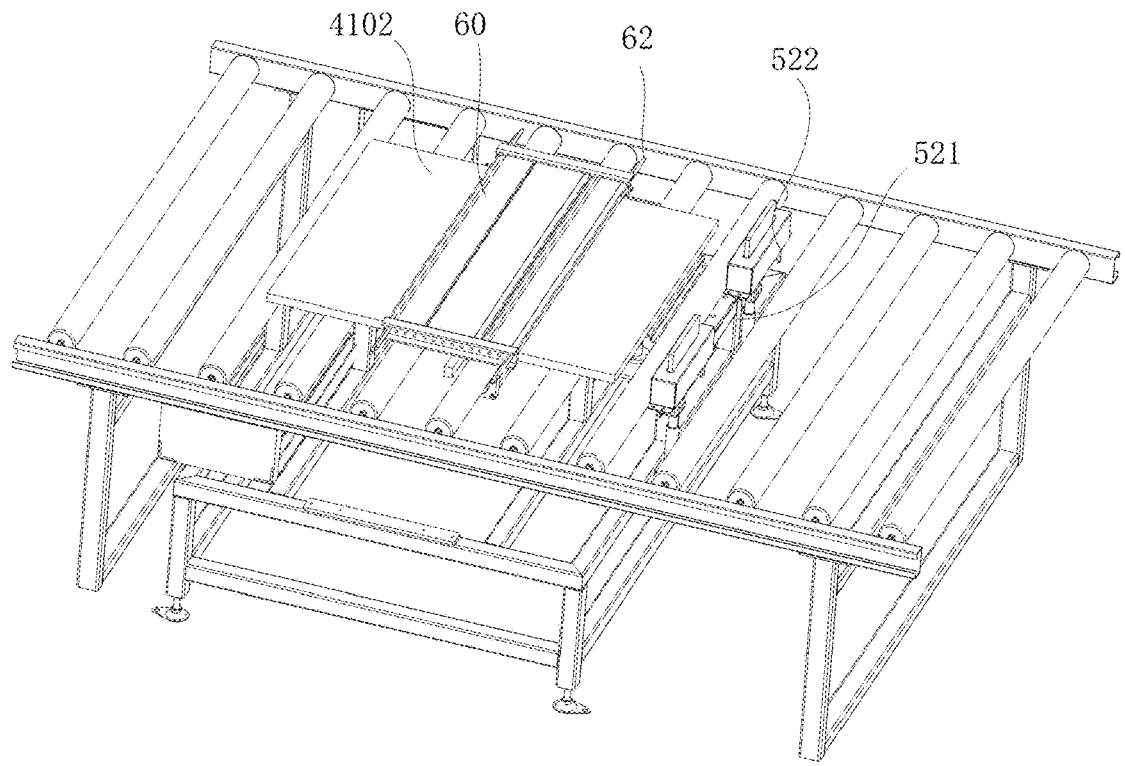
FIG. 19 is a diagram of a conveying state in which a fin stack is on a short board mounting equipment.
Figure 20:
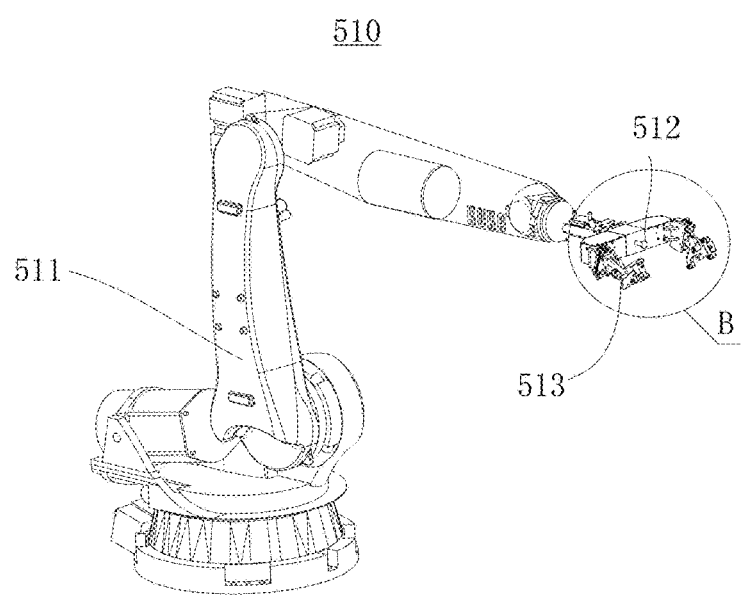
FIG. 20 is a structural diagram of an end plate mounting robot.
Figure 21:
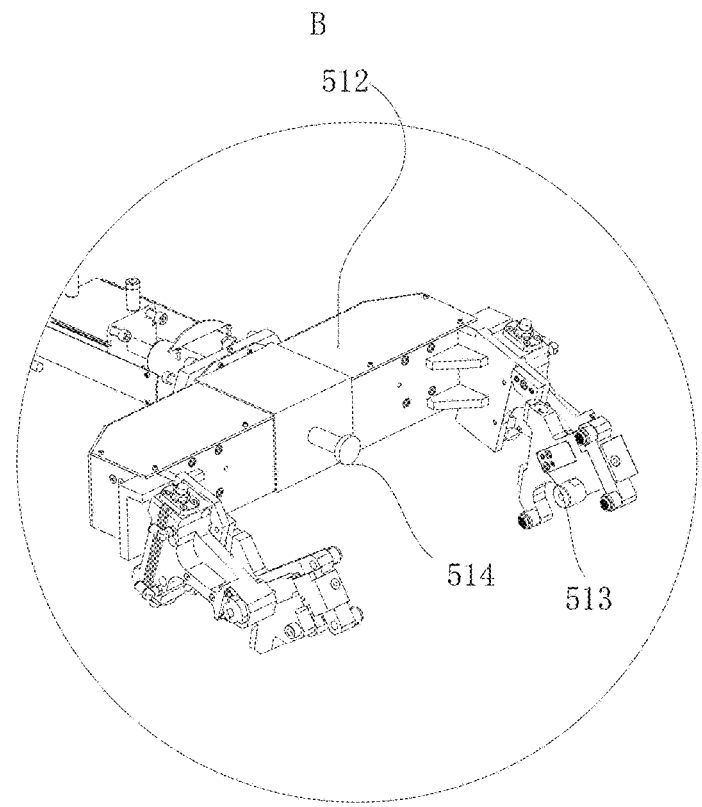
FIG. 21 is a structural diagram of a connection of position B in FIG. 20.
Figure 22:
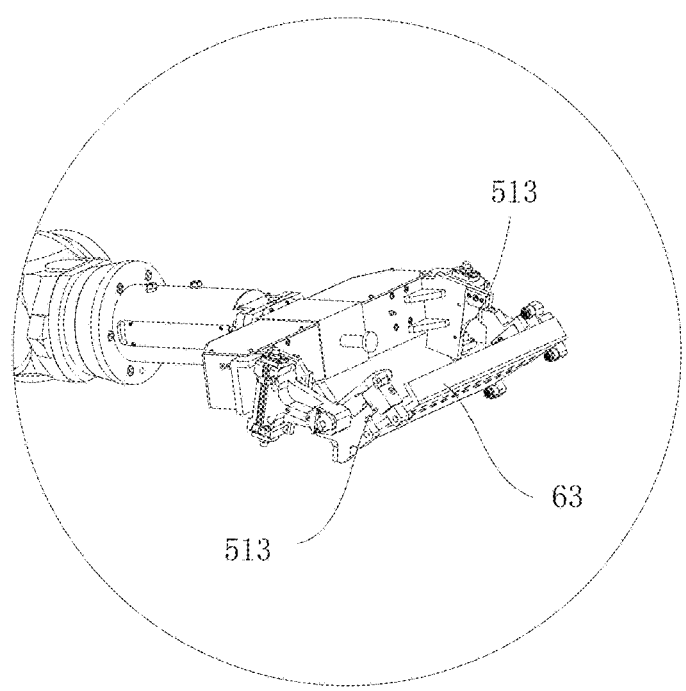
FIG. 22 is a diagram of a state in which the end plate clamp holds an end plate member.

Referring to FIGS. 18-20, the pipe insertion unit has an end plate mounting position and an end plate mounting equipment adapted to the end plate mounting position.

The end plate mounting equipment includes an end plate mounting robot 510 and a lifting stopper 520. The end plate mounting robots 510 are symmetrically arranged on both sides of the roller conveyor line, and are configured to simultaneously mount end plate members 63 onto both ends of the fin stack 60.

Each end plate mounting robot 510 includes an end plate robot body 511, a connecting middle beam 512, a clamping power member, and two end plate clamps 513. The connecting middle beam 512 is mounted on the end plate robot body. The clamping power member is mounted on the connecting middle beam 512, and the two end plate clamps 513 are arranged on the clamping power member. Under the action of the clamping power member, the two end plate clamps 513 move toward each other or away from each other, so as to clamp or release the end plate member 63.

The clamping power member is formed with a first telescopic end and a second telescopic end along the longitudinal direction of the connecting middle beam 512, and the two end plate clamps 513 are respectively mounted on the first telescopic end and the second telescopic end.

Alternatively, in some other embodiments, the clamping power members and the end plate clamps 513 are in a one-to-one correspondence, two clamping power members are respectively symmetrically arranged on the connecting middle beam 512, and the end plate clamps 513 are mounted at the output ends of the clamping power members.

An end plate mounting position is formed on the roller conveyor line, and a stopper portion 522 is located downstream of the end plate mounting position, and when the fin stack 60 is conveyed to the end plate mounting position along the roller conveyor line, the stopper portion 522 rises above the roller 4101.

The lifting stopper 520 is provided on the roller conveyor line, and before the fin stack 60 is conveyed to the end plate mounting position, the lifting stopper 520 rises to stop the fin stack 60.

The lifting stopper 520 specifically includes a lifting driving member 521 and the stopping portion 522. The lifting driving member 521 is arranged below the roller conveyor line, and the stopping part 522 is mounted at an output end of the lifting driving member 521. Under the action of the lifting driving member 521, the stopping portion 522 is raised or lowered between corresponding adjacent rollers 4101 on the roller conveyor line, and is configured to stop and correct the fin stack 60 at a corresponding position on the roller conveyor line.

The stopper portion 522 includes two or more stopping blocks arranged at intervals along the axial direction of the roller 4101, the two stopping blocks are both connected to the output end of the lifting driving member 521, and the lifting driving member 521 drives the two stopping blocks to rise at the same time. Before the fin stack 60 is conveyed to the end plate mounting position, the two stopping blocks are raised above the rollers 4101, to stop the fin stack 60 from being conveyed forward.

When there is an angular deviation between the fin stack 60 and the rollers 4101, the stopping blocks can straighten the fin stack 60 to be parallel to the axial direction of the rollers 4101, so as to facilitate the mounting of the end plate member 63 by the end plate robot.

An end plate clamping position is formed between the two end plate clamps 513 of the end plate mounting robot 510. A pushing member 514 extending in a direction towards the end plate clamping position is provided on the connecting middle beam 512. The pushing member 514 includes a pushing power member and a pushing end portion, the pushing power member is fixed on the connecting middle beam 512, and the pushing end portion is fixed at the output end of the pushing power member.

The roller conveyor line is further provided with a support plate 4102, the fin stack 60 is placed on the support plate 4102. A jacking member 530 is arranged upstream of the lifting stopper 520, including a jacking cylinder and a jacking block. The jacking cylinder is arranged below the end plate mounting position, and the jacking block is mounted at the output end of the jacking cylinder. Under the action of the jacking cylinder, the jacking block is raised or lowered between corresponding rollers 4101, and is configured to jack up the support plate conveyed to the jacking block mounting position.

It is defined that the conveying direction of the roller conveyor line is the X direction, the width direction of the roller conveyor line is the Y direction, and the height direction of the roller conveyor line is the Z direction. The dimension of the end plate member 63 along the Z direction is the width of the end plate member 63, the dimension of the fin stack 60 along the Z direction is the width of the fin stack 60. The width L1 of the end plate member 63 is larger than the width L2 of the fin stack 60, and the thickness L3 of the support plate 4102 satisfies: L3>(L1−L2)/2, so as to avoid the d plate members 63 from interfering with the rollers 4101 when mounting the end plate members 63 to the two ends of the fin stack 60.

A detection member 550 is further provided upstream of the end plate mounting position, the detection member 550 is specifically mounted on a support frame 50 and located on one side of the rollers 4101. The detection member 550 is connected with the heat exchanger sub-control system, and the heat exchanger sub-control system is signal connected with the lifting driving member 521 and the jacking cylinder. The heat exchanger sub-control system is configured to receive the detection signal of the detection member 550 and control the movements of the lifting driving member 521 and the jacking cylinder.

The heat exchanger sub-control system is the control center of the heat exchanger general production system, and is configured to control the start or stop of the roller conveyor line, the work of each robot and the on or off of each equipment.

In some other embodiments, the roller conveyor line is further provided with a centering assembly 540 including two centering beams 541 symmetrically disposed on the roller conveyor line. The centering beams 541 are positioned downstream of the end plate mounting position, and a centering channel is formed between the centering beams 541 for centering the support plate to the middle position of the roller conveyor line.

A guide section 542 is provided at one end of each centering beam 541 close to the end plate mounting position, and a guide channel tapering along the conveying direction of the fin stack 60 is formed between the two guide sections 542.

The centering beam 541 is fixed to the support frame 50 by a centering bracket 543, and the height of the centering beam 541 is lower than the positioning needle 62 on the fin stack.

After the mounting of the end plate is finished, the stopping blocks on the lifting stopper 520 is lowered, and the fin stack 60 continues to be conveyed down along the roller conveyor line.

After the end plate members 63 at both ends of the fin stack 60 pass through the guide channel, under the action of the guide sections 542, the fin stack 60 is moved to the middle position of the roller conveyor line, thereby improving the position accuracy of the fin stack 60 when conveying, and making it convenient for the tube insertion robot 610 to operate during subsequent tube insertion.

A plurality of limit protrusions are respectively provided on opposite sides of the two end plate clamps 513, and a clamping position for limiting the end plate member 63 is formed between the limit protrusions of each of the end plate clamps 513. When clamped, the end portion of the end plate member 63 is located between the limit protrusions, to limit the position of the end plate member 63, so as to prevent the end plate member 63 from falling off the end plate clamps 513.

Referring to FIGS. 20 to 23, similar to the off-line robot body 451, the end plate robot body 511 includes an end plate robot base, an end plate robot big arm, and an end plate robot small arm, which are connected in this order.

In addition, the end plate robot also includes a robot motor and a vision camera, where the end plate robot base is fixed to the ground by bolts, the robot motor is connected to the end plate robot base by bolts, the end plate robot base, the end plate robot big arm, and the end plate robot small arm are each connected by sliding joints, and the vision camera is provided on the end plate clamp 513, and is configured to acquire position information of the fin stack 60 and the positioning needle 62.

The end plate member 63 is also provided with through holes which are in a one-to-one correspondence with the fins, and the end plate member 63 is inserted with the positioning needle 62 through the corresponding through hole. After the end plate member 63 is inserted, the pushing power member drives the pushing end portion to push the end plate member 63 forward, and the end plate members 63 on both sides are simultaneously pushed towards the middle, in addition to mounting the end plate members 63 in place, this further eliminates the gap between the fins and makes the connection between the fins tight.

After the mounting is finished, the fin stack 60 is conveyed down along the roller conveyor line to the tube insertion station.

A tube insertion equipment is arranged on the side of the tube insertion station, and the tube insertion equipment grasps a pipeline member 64 and inserts the pipeline member 64 into an insertion hole in the fin stack 60.

Referring to FIGS. 24 to 29, the nitrogen charging unit includes a nitrogen charging device 710, a nitrogen charging coupling member 720, and a nitrogen charging robot 730. The nitrogen charging device 710 is connected to a nitrogen charging pipeline 711 outside the nitrogen charging device 710. The nitrogen charging coupling member 720 is provided at an end of the nitrogen charging pipeline 711, and a coupling channel gradually expanding along a direction away from the nitrogen charging pipeline 711 is formed in the nitrogen charging coupling member 720.

The nitrogen charging robot 730 includes a nitrogen charging robot body 731 and a nitrogen charging clamp 732. The nitrogen charging robot 730 is provided on the side of the nitrogen charging station on the roller conveyor line, and the nitrogen charging clamp 732 is provided on the nitrogen charging robot 730. The nitrogen charging clamp 732 is configured to clamp the nitrogen charging coupling member 720 to couple with the pipeline member on the fin stack 60, and charge nitrogen gas into the pipeline member.

In some embodiments, the nitrogen charging device 710 is disposed in a nitrogen charging chamber 740, the nitrogen charging chamber 740 is provided with a mounting port, and the nitrogen charging pipeline 711 extends through the mounting port to the outside of the nitrogen charging chamber 740.

The nitrogen charging chamber 740 is supported directly above the nitrogen charging station by supporting legs, the mounting port is arranged on the bottom wall of the nitrogen charging chamber 740, the nitrogen charging pipeline 711 extends out from directly below the nitrogen charging chamber 740, and the nitrogen charging coupling member 720 is connected to the nitrogen charging pipeline 711.

Figure 23:
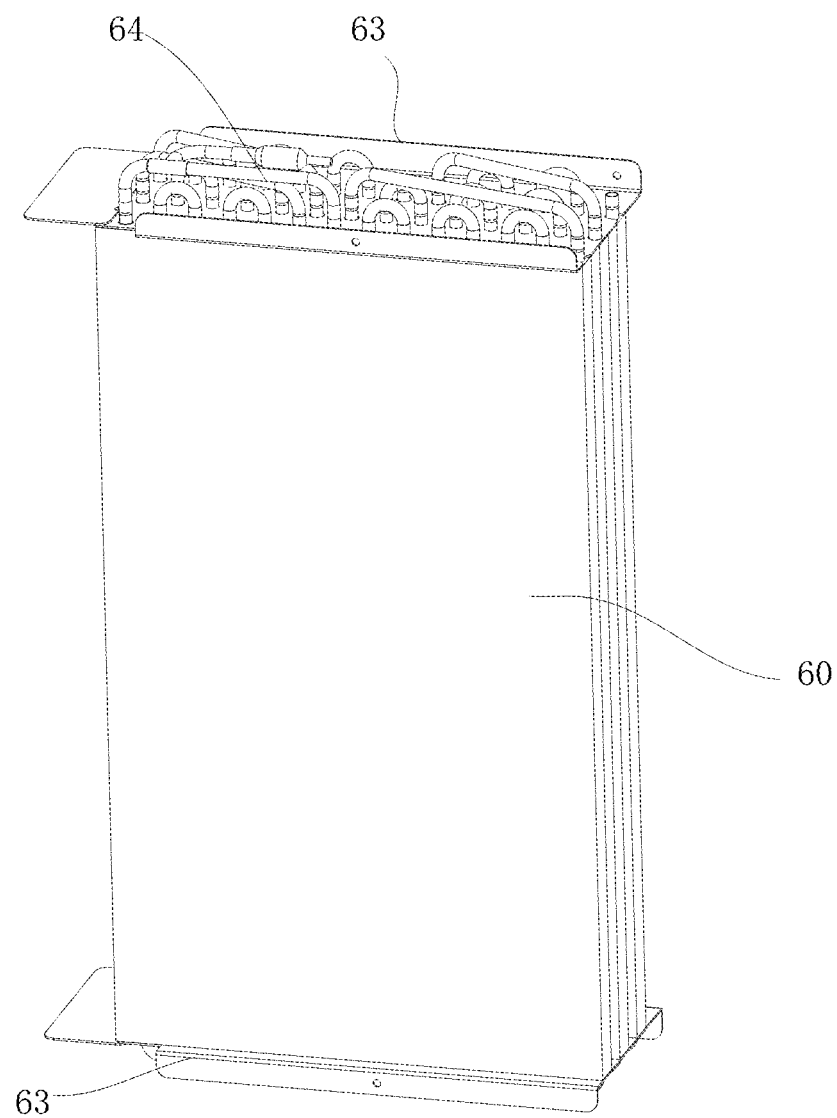
FIG. 23 is a structural diagram of a heat exchanger.
Figure 24:
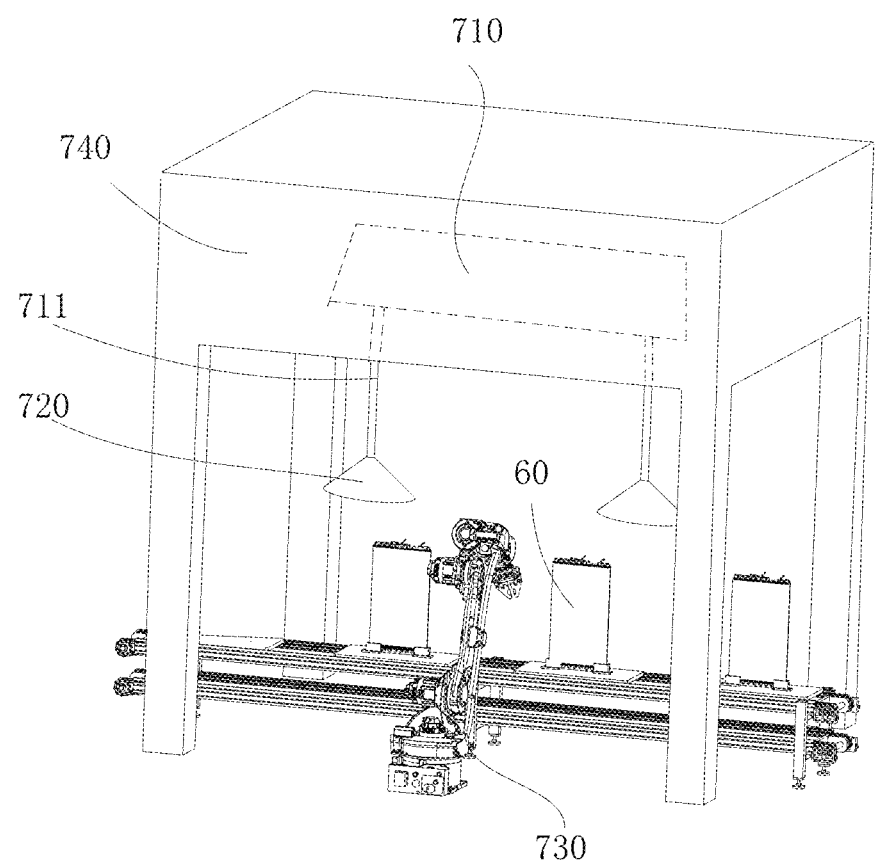
FIG. 24 is a structural diagram of a nitrogen charging equipment.
Figure 25:
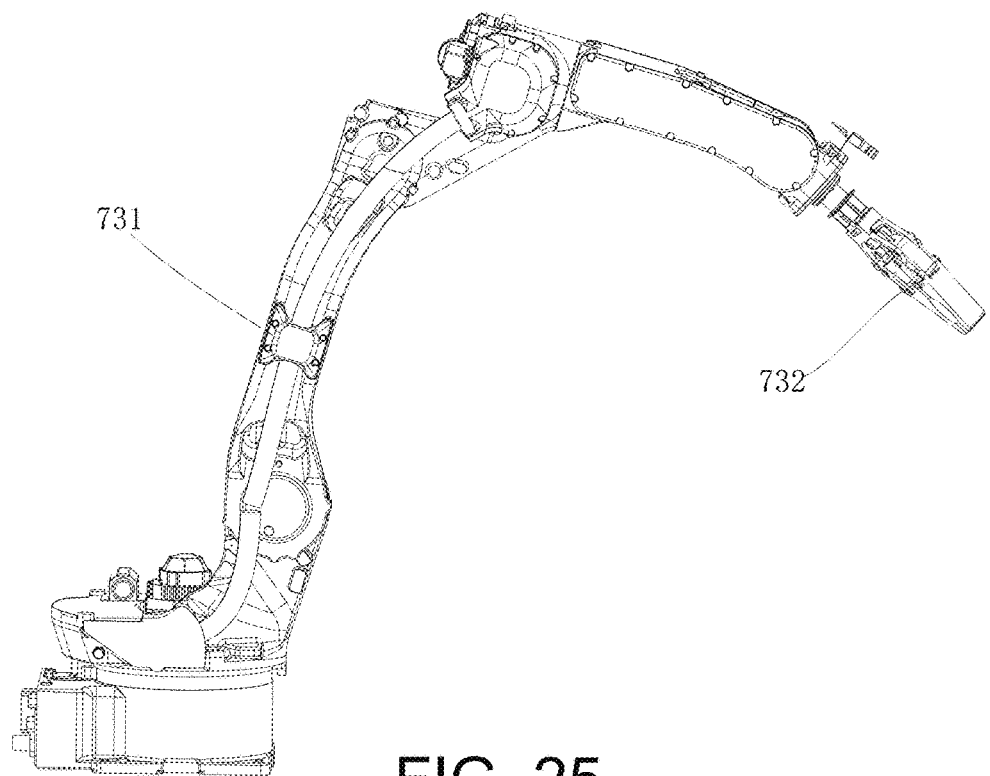
FIG. 25 is a structural diagram of a tube insertion robot.
Figure 26:
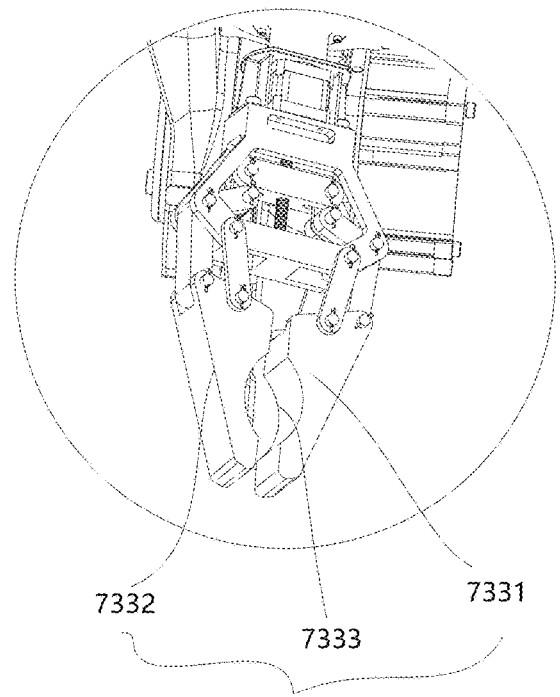
FIG. 26 is a structural diagram of a pipeline clamp.
Figure 27:
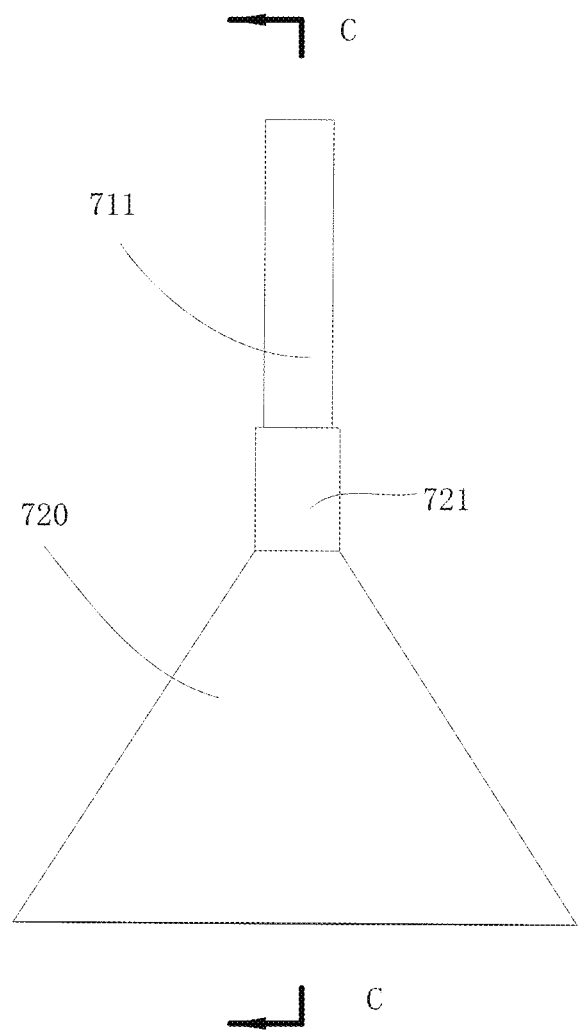
FIG. 27 is a first diagram of the connection between the nitrogen charging coupling member and the pipeline member.
Figure 28:
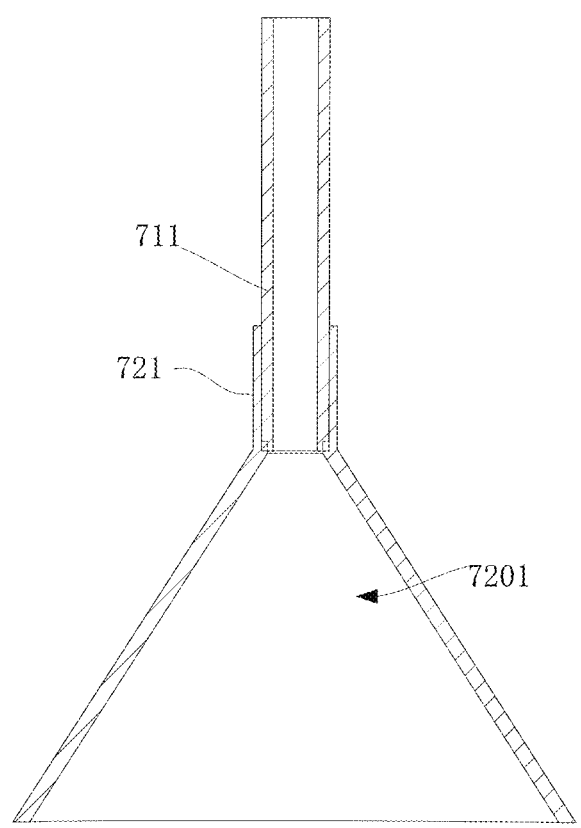
FIG. 28 is a C-C sectional view of FIG. 23.

Referring specifically to FIGS. 23 and 24, in some embodiments of the present disclosure, the nitrogen charging coupling member 720 is detachably connected to the nitrogen charging pipeline 711. One end of the nitrogen charging coupling member 720 connected to the nitrogen charging pipeline 711 is provided with a connection end portion, an internal thread is formed on the inner wall of the connection end portion, an external thread is formed on the end portion of the nitrogen charging pipeline 711, and the nitrogen charging pipeline 711 is threaded into the connection end portion.

During the nitrogen charging process, the nitrogen charging robot 730 clamps the nitrogen charging pipeline 711 above the nitrogen charging coupling member 720, pulls the nitrogen charging pipeline 711 down to the pipeline member, the pipeline member is guided into the nitrogen charging pipeline 711 through the nitrogen charging coupling member 720, and is connected with the nitrogen charging pipeline 711, and then the nitrogen charging device 710 transports nitrogen gas into the pipeline member.

In order to accurately guide the pipeline member into the nitrogen charging pipeline 711, the minimum inner diameter dimension in the coupling channel is not larger than the inner diameter dimension of the nitrogen charging pipeline 711.

Figure 29:
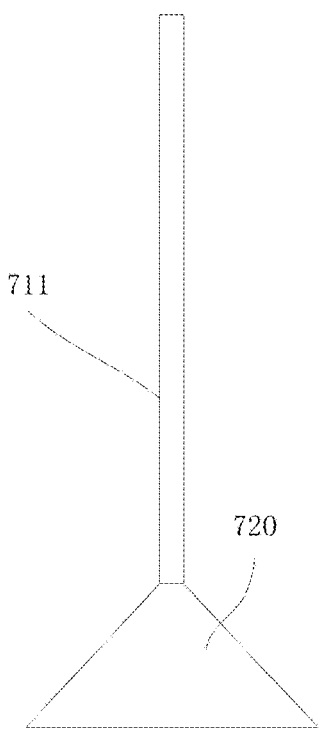
FIG. 29 is a second diagram of the connection between the nitrogen charging coupling member and the pipeline member.

Referring to FIG. 29, in some other embodiments, the nitrogen charging coupling member 720 is integrally formed with the nitrogen charging pipeline 711, and the nitrogen charging coupling member 720 is generally horn-shaped.

Figure 30:
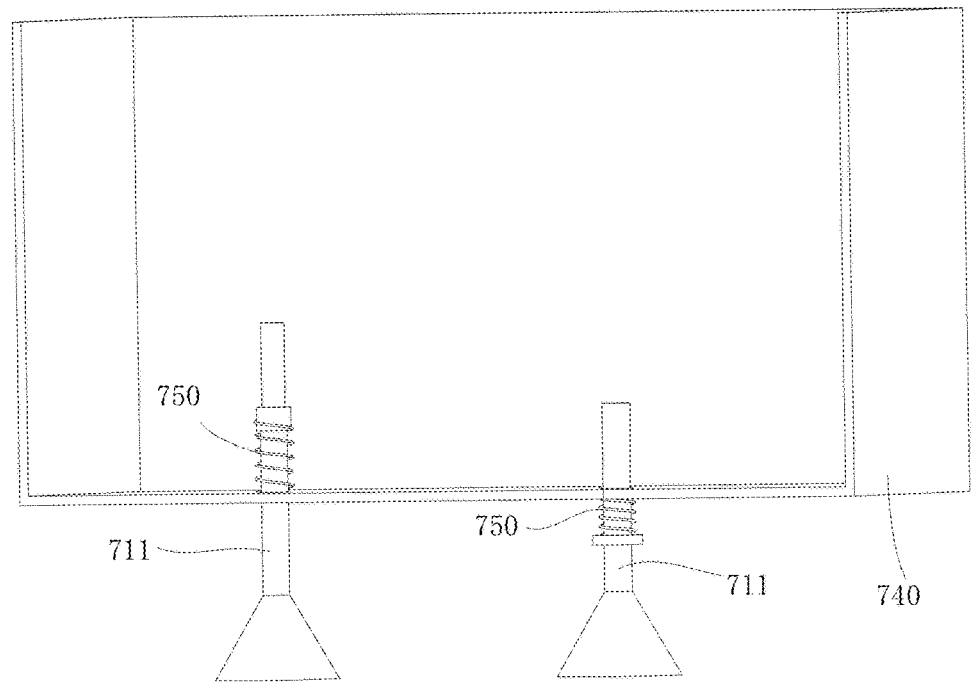
FIG. 30 is a diagram of the connection of an elastic member.

Referring to FIG. 30, in some other embodiments, in order to realize the automatic upward reset of the nitrogen charging pipeline 711 after nitrogen charging, it is designed that an elastic member 750 is provided between the nitrogen charging pipeline 711 and the nitrogen charging chamber 740. One end of the elastic member 750 is fixed on the inner wall of the nitrogen charging chamber 740, and the other end thereof is connected to the nitrogen charging pipeline 711 located in the nitrogen charging chamber 740. When the nitrogen charging pipeline 711 moves outward to a position where it couples with the pipeline member 64, the elastic member 750 is compressed. After the nitrogen charging is completed, the nitrogen charging robot 730 releases the nitrogen charging pipeline 711. Under the restoring force of the elastic member 750, the elastic member 750 drives the nitrogen charging pipeline 711 to move upward and reset.

In some other embodiments, an elastic member 750 is provided between the nitrogen charging pipeline 711 and the nitrogen charging chamber 740. One end of the elastic member 750 is fixed on the outside of the mounting port, and the other end thereof is connected to the nitrogen charging pipeline 711 located outside the nitrogen charging chamber 740. When the nitrogen charging pipeline 711 moves outward to a position where it couples with the pipeline member 64, the elastic member 750 is stretched. After the nitrogen charging is completed, the nitrogen charging robot 730 releases the nitrogen charging pipeline 711. Under the restoring force of the elastic member 750, the elastic member 750 drives the nitrogen charging pipeline 711 to move upward and reset.

In some other embodiments, an elastic pipe section is formed on the nitrogen charging pipeline 711 for enabling the nitrogen charging pipeline 711 to be retractable relative to the mounting port.

The elastic pipe section is at least one section of the nitrogen charging pipeline 711. The elastic pipe section is elongated in the nitrogen charging state. After the nitrogen charging is completed, the elastic pipe section retracts under its own elastic action, so as to realize the upward movement and reset of the nitrogen charging coupling member 720.

The nitrogen charging clamp 732 includes a clamping drive member and a clamping jaw assembly 733 connected with the clamping drive member. The clamping jaw assembly 733 includes a first clamping jaw 7331 and a second clamping jaw 7332 which are symmetrically arranged. The first clamping jaw 7331 and the second clamping jaw 7332 are each formed with a clamping recess 7333. The sizes of the clamping recesses 7333 are adapted to the outer diameter of the nitrogen charging pipeline 711, and the nitrogen charging pipeline 711 is configured to be clamped between the clamping recesses 7333.

The specific connections of the clamping drive member to the first and second clamping jaws 7331, 7332 and the implementation of the opening and closing of the first and second clamping jaws 7331, 7332 are prior art technologies, and will not be described in detail herein.

Similarly, the nitrogen charging robot body 731 also includes that, the nitrogen charging robot body 731 includes a base of the nitrogen charging robot 730, a big arm of the nitrogen charging robot 730, and a small arm of the nitrogen charging robot 730, which are connected in this order.

In addition, the nitrogen charging robot 730 also includes a robot motor and a vision camera, where the base of the nitrogen charging robot 730 is fixed to the ground by bolts, the robot motor is connected to the base of the nitrogen charging robot 730 by bolts, the base of the nitrogen charging robot 730, the big arm of the nitrogen charging robot 730, and the small arm of the nitrogen charging robot 730 are each connected by sliding joints, and the vision camera is provided on the nitrogen charging clamp 732, and is configured to acquire position information of the fin stack 60 and the positioning needle 62.

After the nitrogen charging is completed, the roller conveyor line drives the fin stack 60 forward and convey it to the elbow welding unit for welding.

In some embodiments, the production system has a heat exchanger spraying system 300.

In some embodiments, the indoor heat exchanger assembly unit of the indoor unit production system and the outdoor heat exchanger assembly unit of the outdoor unit production system have the heat exchanger spraying system 300. After the heat exchanger is mounted, it is then sprayed. The heat exchanger spraying process is embedded in the indoor unit production line or the outdoor unit production line, and the production line is more integrated.

Figure 31:
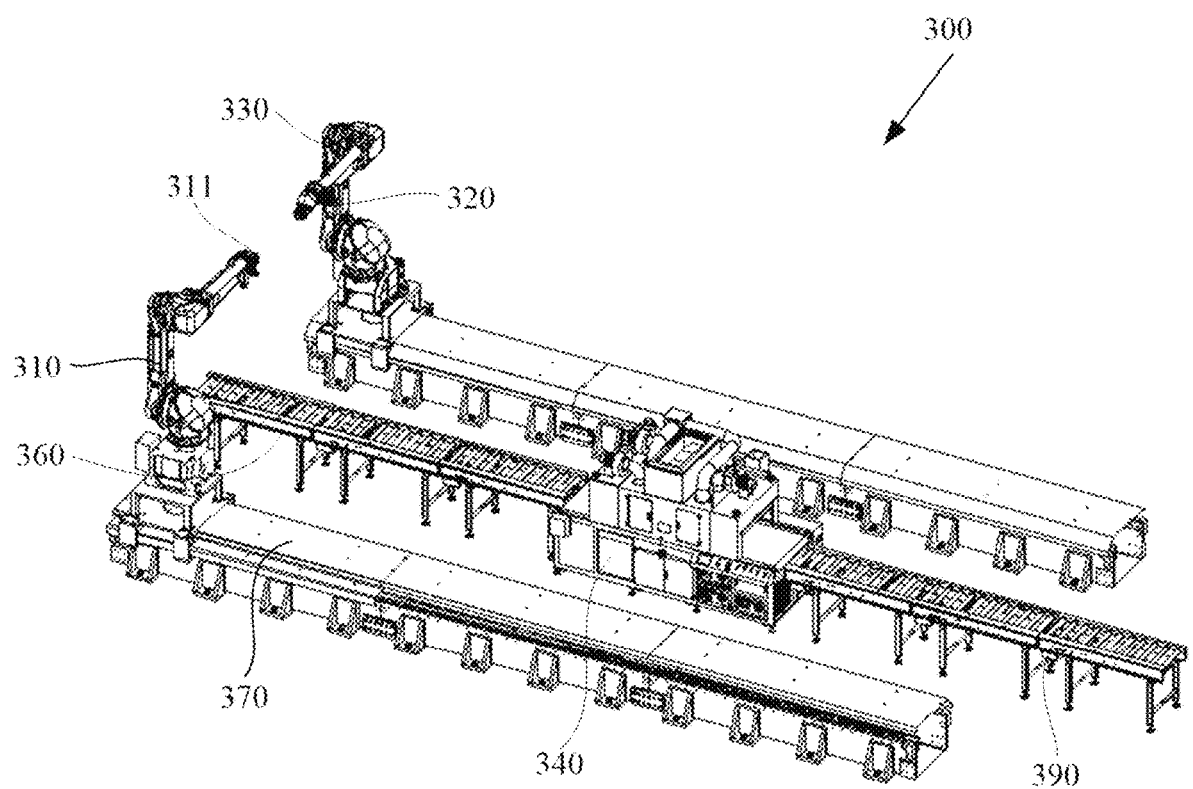
FIG. 31 is a structural diagram of a heat exchanger spraying station according to some embodiments.

FIG. 31 is a structural diagram of a heat exchanger spraying system 300. The spraying system is configured to spray the heat exchanger.

Figure 32:
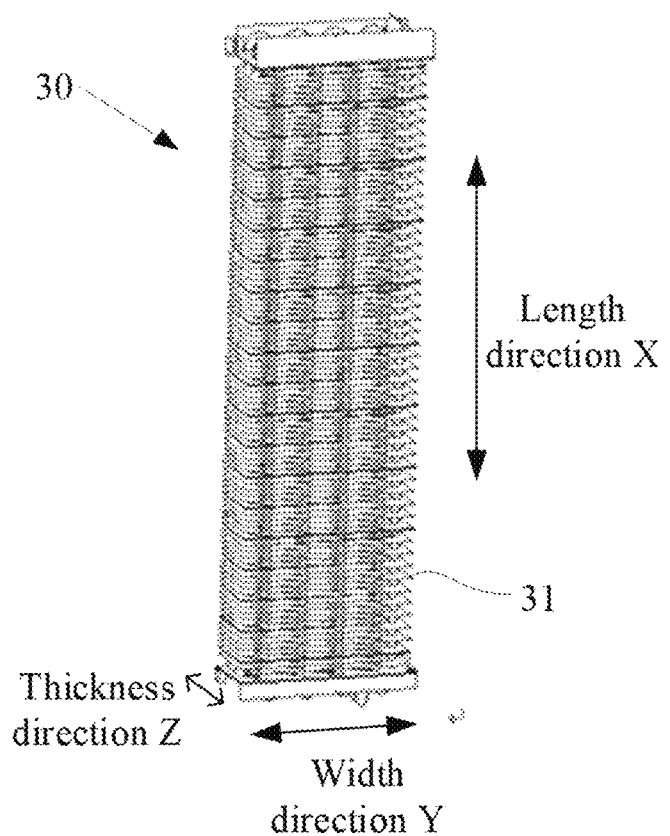
FIG. 32 is a structural diagram of an indoor heat exchanger according to some embodiments.
Figure 33:
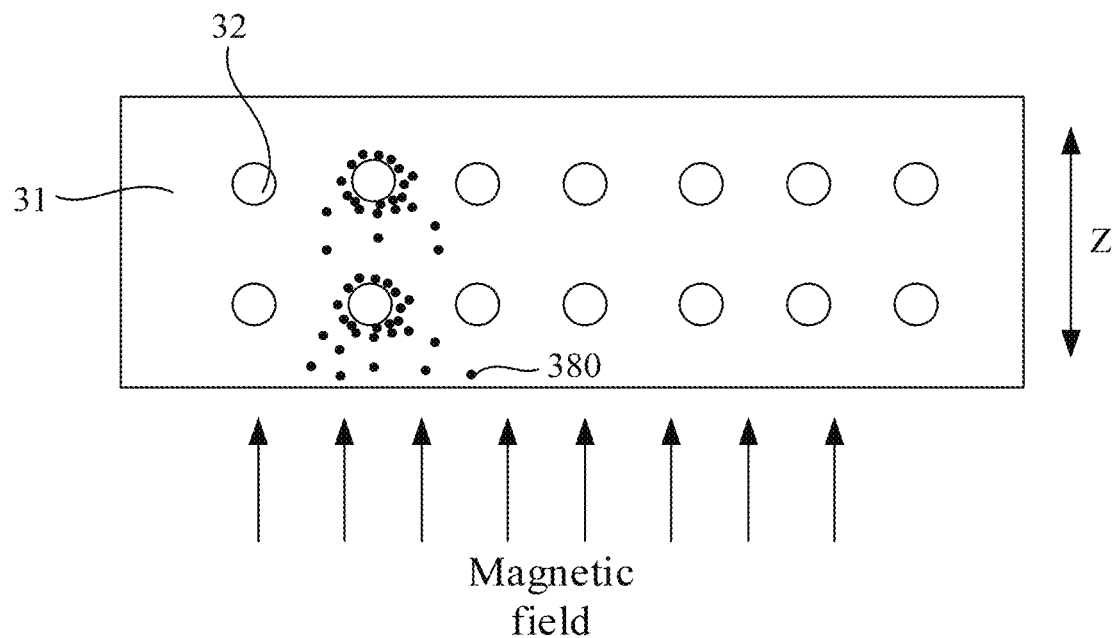
FIG. 33 is a structural diagram of a fin according to some embodiments.

Referring to FIGS. 32-33, the heat exchanger includes heat exchange tubes configured to have the refrigerant flow therein. The heat exchanger also includes a plurality of fins 31 arranged at intervals, and any of the fins 31 is provided with perforations 32 through which the heat exchange tubes pass. FIG. 32 shows a single-line shaped heat exchanger. The heat exchanger further includes a U-shaped heat exchanger. Taking FIG. 32 as an example, the longitudinal direction of the heat exchanger is denoted as X, the width direction thereof is denoted as Y, and the thickness direction thereof is denoted as Z.

Referring to FIG. 31, the spraying system includes a spraying robot 310, and a spraying head 311 configured to spray the fin 31 is provided at a distal end of a robotic arm of the spraying robot 310. A first guide rail 370 is arranged on the ground, and the spraying robot 310 moves along the first guide rail 370.

During spraying, the spraying head 311 is located on one side of the heat exchanger, and sprays paint from one side to the other side of the heat exchanger. The spraying area is controlled by controlling parameters such as the range and amplitude of motion of the spraying head 311, the spraying pressure of the spraying head 311, and the distance between the spraying head 311 and the heat exchanger.

The spraying head 311 is a dual-fluid atomizing spraying head with a spraying head nozzle diameter of 0.3 mm, ensuring that the diameter of the atomized particles is ≤10 μm, and ensuring that the coating uniformly covers the surface of the fin 31.

The spraying system further includes a paint can that is configured to provide paint to the spraying head 311. The paint is mixed with capsule portions 380, and the capsule portions 380 are filled therein with a repair agent.

The spraying system further includes a vision device 320 configured to acquire image information of the heat exchanger.

The indoor unit sub-control system and the outdoor unit sub-control system communicate with the spraying robot 310 and the vision device 320 in the respective systems, and the sub-control system is configured to obtain size data information of the heat exchanger according to the analysis of image information of the heat exchanger to control the movement of the spraying head 311.

The spraying system further includes a magnetic field generating device 360 configured to emit a magnetic field to the heat exchanger.

The capsule portion 380 is configured to move in a direction approaching the perforation 32 under the action of the magnetic field, and the capsule portion 380 is further configured to rupture when receiving an external force to release the internal repair agent, to perform coating repair on the fin 31.

Specifically, the paint sprayed out from the spraying head 311 has a repair function, and the paint is mixed with the capsule portions 380, and the capsule portion 380 is filled with a repair agent inside, and the repair agent contains siloxane and a catalyst.

Figure 34:
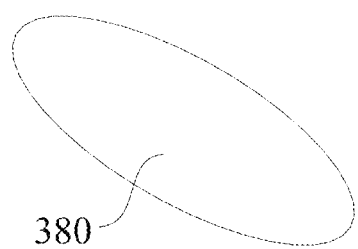
FIG. 34 is a structural diagram of a capsule portion according to some embodiments.

The outer diameter dimension of the capsule portion 380 is in nanometer scale, and the particle diameter of the capsule portion 380 is 5-20 μm. FIG. 34 is a structural diagram of the capsule portion 380. The outer shell of the capsule portion 380 has a spherical core-shell structure to ensure that it is subjected to the force uniformly under the action of the magnetic field.

The capsule portion 380 is made of ferroferric oxide and silicon dioxide. The capsule portion 380 adopt ferric oxide nanoparticles, and is coated with silicon dioxide by a sol-gel method to form a core-shell structure. The ferroferric oxide makes the capsule portion 380 have a high magnetic susceptibility, which facilitates precise control of the motion trajectory by an external magnetic field. The silica makes the capsule portion 380 have a certain chemical inertness and mechanical strength, protects the core from environmental corrosion, and regulates the shell rupture threshold by adjusting the degree of crosslinking.

The repair agent is encapsulated in the inner cavity of the capsule portion 380 by microfluidic technology. When the fin 31 is cracked due to corrosion or mechanical load, a high stress region will be formed at the crack tip, and the local stress, tensile stress, shear stress, etc. generated by crack propagation exceed the mechanical strength threshold of the outer shell of the capsule portion 380, causing the outer shell of the capsule portion 380 to crack and release the repair agent.

By adjusting the thickness and the degree of crosslinking of the outer shell of the capsule portion 380 or adding a toughening agent, the mechanical strength and sensitivity of the outer are balanced, and the capsule portions 380 are pre-embedded in the root portion of the fin 31, in an area susceptible to stress concentration in the coating, so that the triggering efficiency is improved.

The magnetic field generating device 360 employs an electromagnetic array device, and the electromagnetic array device generates a gradient magnetic field. The capsule portions 380 are driven by the magnetic force in the magnetic field, so that the capsule portions 380 are gathered toward the areas of the root portion of the fin 31 (that is, the positions of the perforations 32) having a high magnetic field strength. The equation is:

$$F = \nabla(M \times B)$$

Here, F is a magnetic force (in unit N) that drives the capsule portion to move, M is a magnetization intensity (in unit A/m) of the capsule portion 380, and B is a magnetic induction intensity (in unit T) of a gradient magnetic field generated by the electromagnetic array device.

The electromagnetic array device adjusts the gradient of the magnetic field according to the fin gap, ensuring that the capsule portions 380 are limited to be deposited in the root area where the fin 31 is prone to corrosion. The adjustment of the magnetic field satisfies the formula:

$$\nabla B = k/d^2$$

Where, ∇B is the magnetic field gradient (in T/m), k is the material-process coefficient (in T.m²) and d is the fin gap width, i.e. the minimum distance between adjacent fins (in m).

When processing the fin 31, the periphery of the perforation 32 is formed with a flange, and the presence of the flange minimizes the distance between two adjacent fins 31 at the position of the perforation 32. Therefore, the magnetic field strength at the perforation 32, that is, at the root of the fin 31, is maximized, so that the capsule portion 380 can move towards the perforation 32 under the action of the magnetic field to be deposited near the perforation 32.

The root portion of the fin 31 is a position where corrosion is likely to occur, and after the fin 31 is corroded, cracks are generated on the surface, and when local stress, tensile stress, shear stress, and the like generated by crack propagation exceed the mechanical strength threshold of the outer shell of the capsule portion 380, causing the outer shell of the capsule portion 380 to crack and release the repair agent, thereby repairing the corroded position of the fin 31.

In some embodiments of the present disclosure, the spraying head 311 is located on one side of the heat exchanger, and the spraying head 311 moves along the length direction X of the heat exchanger in a sine wave trajectory and also moves along the width direction Y of the heat exchanger. Compared with the traditional segmented spraying method, this spraying path is more efficient.

In some embodiments of the present disclosure, when the spraying head 311 moves in the Y direction, the spraying head 311 reciprocates in the Y direction, and the swing amplitude of the spraying head 311 is positively correlated with the gap between two adjacent fins 31. The equation is:

$$A = k_A \cdot \sqrt{d}$$

Where A is the amplitude (in unit mm) of the lateral swing of the spraying head 311, kA is the proportional factor (no unit), and d is the gap of the fins 31, that is, the minimum distance (in unit mm) between adjacent fins 31. The smaller the gap of the fins 31 is, the swing amplitude of the spraying head 311 decreases, so as to prevent the paint from blocking the gap.

The lower limit value of the swing amplitude of the spraying head 311 is 0.5 mm, which is applicable to a dense region in which d≤0.8 mm.

The upper limit value of the swing amplitude of the spraying head 311 is 3.0 mm, which is applicable to a sparse region in which d≥2.5 mm.

In some embodiments of the present disclosure, when the spraying head 311 moves in the Y direction, the spraying head 311 reciprocates in the Y direction, and the swing frequency of the spraying head 311 is positively correlated with the density of the fins 31. The equation is:

$$f = k_f \cdot \rho$$

Here, f is the swing frequency (in unit hz) of the spraying head 311, kf is the density-frequency coefficient (in unit hz mm/fin 31), and ρ is the density of the fins 31, that is, the number of fins 31 per unit length (in unit fins 31/mm). As the density of the fins 31 increases, the swing frequency of the spraying head 311 increases, so as to improve the covering efficiency of the spray.

When the spraying pressure increases, the swing frequency of the spraying head increases synchronously, so as to match the output rate of the atomized particles.

The basic swing frequency of the spraying head 311 is 5 Hz, which is applicable to a sparse region in which ρ≤10 fins 31/cm.

The upper limit of the swing frequency of the spraying head 311 is 20 Hz, which is applicable to a dense region in which ρ≥30 fins 31/cm.

In some embodiments of the present disclosure, the heat exchanger has a straight section region and a bent section region, and the spraying head 311 separately sprays the straight section region and the bent section region.

In other words, for the U-shaped heat exchanger, the spraying head 311 sprays the heat exchanger in sections, for example, first sprays the straight section region and then sprays the bent section region. When the spraying head 311 passes through the bent section region, the spraying head 311 generates an arc-shaped or zigzag detour path along the outer edge of the bent section region, to ensure that the spraying head 311 maintains a preset safety distance from the bent section region.

In some embodiments of the present disclosure, the moving path of the spraying head 311 is located within the projection range of the heat exchanger, and the moving speed and swing amplitude of the spraying head 311 are reduced when approaching the boundary of the heat exchanger.

In other words, the vision device 320 extracts the boundary of the fin 31 in real time to generate a dynamic spray exclusion zone. The moving path of the spraying head 311 is strictly limited within the projection range of the fin 31, and the edge area adopts a gradient speed decreasing strategy to reduce the moving speed and the amplitude when approaching the boundary, so as to prevent paint sputtering.

In some embodiments of the present disclosure, the heat exchanger spraying system 300 further includes a UV curing device 340 configured to perform coating curing on the sprayed heat exchanger. The UV curing device 340 is a prior art technology, and will not be described in details herein.

The heat exchanger spraying system 300 further includes a third conveyor line 390, and the magnetic field generating device 360 and the UV curing device 340 are arranged at interval along the longitudinal direction of the third conveyor line 390, and the magnetic field generating device 360 generates a magnetic field to the heat exchanger placed on the third conveyor line 390.

In some embodiments of the present disclosure, the spraying process of the heat exchanger spraying system 300 includes:

The vision device 320 acquires point cloud data of a heat exchanger fin 31, and extracts topological parameters such as inclination angle, pitch, and height of the fin 31.

Based on a graph neural network (GNN), a spatial topological relationship model of the fin 31 is constructed, and a surface curvature distribution and gap width data of the fin 31 are generated.

According to the model, the spraying path is decomposed into "while the spraying head 311 moves along the length direction X of the heat exchanger, it also swings and sprays along the width direction X of the heat exchanger". The spraying head 311 moves along the length direction X of the heat exchanger in a sine wave trajectory, and the amplitude and frequency of the spraying head 311 are adaptively adjusted by the gap of the fins 31, to ensure that the coating penetrates into the root of the fin 31 and does not block the gap.

The compressed air pressure of the spraying head 311 is adjusted in real time by a PID algorithm to adapt to different density regions of the fin 31, and for a dense region, the pressure is increased, and for a sparse region, the pressure is decreased.

A mass flow meter 330 monitors the flow rate of the paint in real time. If the deviation thereof exceeds ±5%, an alarm is triggered and the spraying is suspended, and the MES system records the abnormality.

The spraying robot 310 moves along the planned path of the first guide rail 370, and the spraying head 311 sprays atomized particles with a nozzle diameter of 0.3 mm to uniformly cover the surface of the fin 31.

After the spraying is completed, the heat exchanger enters the UV curing device 340 and is irradiated at a wavelength of 365 nm and a power of 500 W/m² for 30 seconds, to complete the crosslinking and curing of the coating.

The spraying parameters (coating thickness, repair agent content, etc.) are uploaded to the Internet of Things platform through the OPC UA protocol and bound to the MES system, so as to achieve whole life cycle quality traceability.

In the above descriptions of the embodiments, the specific features, structures, materials or characteristics can be combined in any one or more embodiments or examples in a suitable manner.

The above are only specific implementations of some embodiments of the present disclosure, but the scope of protection of some embodiments of the present disclosure is not limited thereto, and any changes or substitutions that can be easily conceived by those skilled in the art within the technical scope disclosed in some embodiments of the present disclosure shall be encompassed within the scope of protection of some embodiments of the present disclosure. Therefore, the protection scope of some embodiments of the present disclosure shall be subject to the protection scope of the appended claims.

What is claimed is:

1. An operation and maintenance system for air conditioner production, comprising:
   a heat exchanger general production system, comprising:
      an indoor heat exchanger fin production unit, configured to produce an indoor heat exchanger fin;
      an outdoor heat exchanger fin production unit, configured to produce an outdoor heat exchanger fin;
      a plurality of heat exchanger general production units, configured to use the outdoor heat exchanger fin and a heat exchanger material to produce an unbent outdoor heat exchanger, and to use the indoor heat exchanger fin and a heat exchanger material to produce an indoor heat exchanger;
   an indoor unit production system, comprising a plurality of indoor unit production units configured to use the indoor heat exchanger and an indoor unit material to produce an indoor unit;
   a bending unit, configured to bend the unbent outdoor heat exchanger into an outdoor heat exchanger;
   an outdoor unit production system, comprising a plurality of outdoor unit production units configured to use the outdoor heat exchanger and an outdoor unit material to produce an outdoor unit;
   a material storage system, configured to store the heat exchanger material, the indoor unit material, and the outdoor unit material;
   a packaging system, configured to receive and package the indoor unit and the outdoor unit;
   a conveying system, configured to convey the heat exchanger material to the heat exchanger general production system, convey the indoor unit material to the indoor unit production system, convey the outdoor unit material to the outdoor unit production system, and convey a packaging material and the indoor unit and the outdoor unit to the packaging system, and comprising a crane system, the crane system comprising:
      a track, part of which is positioned above the heat exchanger general production system, the indoor unit production system, the outdoor unit production system, and the material storage system;
      a crane, located on the track, the crane comprising a grasping device and a position sensing device;
   a control system, communicating with the heat exchanger general production system, the indoor unit production system, the outdoor unit production system, the material storage system, the packaging system, and the conveying system; the control system being configured to control the conveying system to convey materials, control the indoor heat exchanger fin production unit and the general production units to produce the indoor heat exchanger, and the indoor unit production system to use the indoor heat exchanger and the indoor unit material to produce the indoor unit, control the outdoor heat exchanger fin production unit, the general production units, and the bending unit to produce the outdoor heat exchanger, and the outdoor unit production system to use the outdoor heat exchanger and the outdoor unit material to produce the outdoor unit, and control the packaging system to package the material, the indoor unit and the outdoor unit;
   wherein the indoor unit production system and the outdoor unit production system are arranged side by side between the heat exchanger general production system and the material storage system;
   wherein the track comprises:
      a crane standby track section;
      a material track section, located above the material storage system;
      a heat exchanger track section, located above the heat exchanger general production system;
      an indoor unit track section, located above the indoor unit production system;
      an outdoor unit track section, located above the outdoor unit production system;
      a packaging track section, located above the packaging system;
      a first track section, connecting the material track section and the heat exchanger track section, the first track section being located between the indoor unit track section and the outdoor unit track section;
      a second track section, connecting the heat exchanger track section and the indoor unit track section;
      a third track section, connecting the first track section and the indoor unit track section;
      a fourth track section, connecting the indoor unit track section and the crane standby track section;
      a fifth track section, connecting the first track section and the outdoor unit track section;
      a sixth track section, connecting the packaging track section and the crane standby track section; and
      a seventh track section, connecting the material track section and the packaging system track section;
   wherein the crane is configured to run to the material track section to grasp the heat exchanger material, pass through the first track section and arrive at the heat exchanger track section and release the heat exchanger material to the heat exchanger general production system, and then pass through the second track section and the indoor unit track section and arrive at the fourth track section;

wherein the crane is configured to run to the material track section to grasp the indoor unit material, pass through the first track section and the third track section and arrive at the indoor unit track section and release the indoor unit material to the indoor unit production system, and then arrive at the fourth track section;

wherein the crane is configured to run to the material track section to grasp the outdoor unit material, pass through the first track section and the fifth track section and arrive at the outdoor unit track section and release the outdoor unit material to the outdoor unit production system, and then arrive at the sixth track section;

wherein the material storage system is configured to store the packaging material;

wherein the packaging system is located below the sixth track section of the conveying system, and the material track section and the sixth track section are connected through the seventh track section;

wherein the crane of the conveying system is configured to run to the material track section to grasp the packaging material, release the packaging material to the packaging system when arriving at a position above the packaging system after passing through the seventh track section, and then pass through the sixth track section and arrive at the crane standby track section.

2. The operation and maintenance system for air conditioner production according to claim 1, wherein the crane standby track section is located between the fourth track section and the material track section, and between the sixth track section and the material track section;

the fourth track section is or is not in connection with the sixth track section; and the crane is configured to arrive at the crane standby track section after completing conveying of the materials.

3. The operation and maintenance system for air conditioner production according to claim 1, wherein the crane system comprises:

a material container configured to store the material; and wherein the grasping device is configured to grasp the material container.

4. The operation and maintenance system for air conditioner production according to claim 3, wherein the grasping device is connected to the crane through a lifting mechanism, and the grasping device comprises:

a base, connected with the lifting mechanism;

a lead screw, rotatably mounted on the base;

a lead screw driving mechanism, configured to drive the lead screw to rotate; and a clamp, screw-jointed with the lead screw.

5. The operation and maintenance system for air conditioner production according to claim 4, wherein the grasping device comprises a clamp limiting member configured to limit a position of the clamp.

6. The operation and maintenance system for air conditioner production according to claim 1, wherein the crane comprises cantilever arms located on both sides of the grasping device, and a bottom end of each of the cantilever arms is provided with a position sensing device.

7. The operation and maintenance system for air conditioner production according to claim 6, wherein the position sensing device is a laser scanning equipment.

8. The operation and maintenance system for air conditioner production according to claim 1, wherein, the packaging system is located downstream of the outdoor unit production system, and the material storage system is located downstream of the indoor unit production system; and the seventh track section of the conveying system is located between the outdoor unit production system and the packaging system.

9. The operation and maintenance system for air conditioner production according to claim 1, further comprising:

a complete machine storage system, configured to store a complete machine packaged by the packaging system; and wherein the complete machine storage system comprises:

a complete machine warehousing information acquisition unit, configured to acquire complete machine warehousing information and transmit the complete machine warehousing information to a complete machine management system; and the complete machine management system, communicating with the control system;

wherein the conveying system is configured to convey the complete machine packaged by the packaging system to the complete machine storage system; or the material storage system is configured to store the complete machine packaged by the packaging system.

10. The operation and maintenance system for air conditioner production according to claim 1, wherein the material storage system comprises:

a material management system, communicating with the control system;

a material storage shelf, configured to store the materials; and a material handling device, which receives conveyed material information, and when it identifies a material on the material storage shelf as a conveyed material, it handles the conveyed material to the conveying system.

11. The operation and maintenance system for air conditioner production according to claim 10, wherein the material handling device determines whether the handling of the conveyed material is completed, and after the handling of the conveyed material is completed, the material handling device transmits a handling completion information to the material management system, and the conveying system performs the conveying.

12. The operation and maintenance system for air conditioner production according to claim 10, wherein the material storage system comprises:

a material warehousing information acquisition module, configured to acquire material warehousing information and transmit the material warehousing information to the material management system.

13. The operation and maintenance system for air conditioner production according to claim 10, wherein the material storage shelf comprises a heat exchanger material storage shelf, an indoor unit material storage shelf, an outdoor unit material storage shelf, and a packaging material storage shelf, and the material track section of the conveying system comprises a heat exchanger material track section located above the heat exchanger material storage shelf, an outdoor unit material track section located above the outdoor unit material storage shelf, an indoor unit material track section located above the indoor unit material storage shelf, and a packaging material track section located above the packaging material storage shelf.

14. The operation and maintenance system for air conditioner production according to claim 1, wherein the heat exchanger general production system, the indoor unit production system, and the outdoor unit production system each include a sub-control system, and the sub-control system is configured to communicate with the control system, receive detection information of a respective production unit, and control a working state of a respective related production unit.

15. The operation and maintenance system for air conditioner production according to claim 1, wherein,
the heat exchanger general production system comprises:
an end plate information creating unit, configured to use a unique identification of each end plate to form end plate information and create the end plate information onto the end plate;
the production units of the heat exchanger general production system each comprise an information acquisition module configured to acquire end plate information arriving at the production unit;
the indoor unit production system and the outdoor unit production system comprise:
a support plate information creating unit, configured to form a unique identification of each support plate as support plate information and create the support plate information onto the support plate;
the production units of the indoor unit production system and the outdoor unit production system are each provided with the information acquisition module configured to acquire support plate information arriving at the production unit;
the information acquisition module communicates with the control system, and the control system is configured to monitor the end plate information and the support plate information of the production unit and transmit the end plate information and the support plate information of the production unit to the packaging system to form a label traceability code to be attached in the packaging system.

16. The operation and maintenance system for air conditioner production according to claim 15, wherein the control system is configured to transmit conveyed material information for the heat exchanger and the corresponding indoor unit or outdoor unit to the end plate information creating unit, and the end plate information creating unit is configured to use the unique identification of the end plate and the material information associated with this unique identification to form the end plate information.

17. The operation and maintenance system for air conditioner production according to claim 1, wherein the system comprises:
a unit shelf, located adjacent the production unit and configured to receive materials conveyed by the conveying system; and
the unit shelf comprises an identification or a signal generating device to be sensed by the position sensing device of the conveying system.

18. The operation and maintenance system for air conditioner production according to claim 17, wherein,
the production unit comprises a loading device configured to load the materials on the unit shelf to the production unit;
a material detection device, configured to detect a material quantity on the unit shelf, the control system being configured to control the conveying system to convey a material when the material quantity is lower than a threshold, wherein when a detection result of a detection unit is unqualified, the conveying system conveys materials before the detection unit and re-produces the material before the detection unit.

19. The operation and maintenance system for air conditioner production according to claim 1, further comprising:

a ground transfer device, configured to receive control information of the control system and transferring assembled components between units in accordance with the control information;
a roller conveyor line, configured to connect production units within each production system;
wherein the production unit comprises:
a production unit state detection module, configured to detect operation state information of an equipment of the production unit;
wherein the control system is configured to determine or predict an equipment failure according to the operation state information;
wherein the production unit comprises:
a unit lighting equipment, in a normally-off state;
the control system is configured to control the unit lighting equipment corresponding to the production unit to light up when the equipment failure of the production unit is determined or predicted;
wherein the operation and maintenance system for air conditioner production further comprises:
a detection unit, configured to detect whether it is qualified or not, and when the detection result is unqualified, output an unqualified product through an unqualified conveyor line, and transmit unqualification information to the control system;
the control system controls the conveying system to convey materials before the detection unit and re-produce the material before the detection unit.

20. An air conditioner production method of the operation and maintenance system for air conditioner production according to claim 1, further comprising:
acquiring air conditioner demand information;
determining a production flow according to the air conditioner demand information; and
controlling working states of the heat exchanger general production system, the indoor unit production system, and the outdoor unit production system according to the production flow; when producing the outdoor unit in the production flow, controlling the outdoor heat exchanger fin production unit, the general production units, and the bending unit to produce the outdoor heat exchanger, and controlling the outdoor unit production system to produce the outdoor unit; when producing the indoor unit in the production flow, controlling the indoor heat exchanger fin production unit and the general production units to produce the indoor heat exchanger, and controlling the indoor unit production system to produce the indoor unit;
wherein, a required number of indoor units and a required number of outdoor units corresponding to an air conditioner model to be produced are determined according to the air conditioner demand information, and a number n of indoor heat exchangers to be continuously produced is determined, which comprises:
controlling the heat exchanger general production system to first produce an outdoor heat exchanger to the outdoor unit production system, and then produce n indoor heat exchangers to the indoor unit production system;
when the number of the indoor units reaches the required number of indoor units and the number of the outdoor units does not reach the required number of outdoor units, changing the production flow to controlling the heat exchanger general production system to produce the outdoor heat exchanger to the outdoor unit production system;

when the number of the outdoor units reaches the required number of outdoor units and the number of the indoor units does not reach the required number of indoor units, changing the production flow to controlling the heat exchanger general production system to produce the indoor unit heat exchanger to the indoor unit production system, wherein n is a natural number;

wherein the determining the number n of indoor heat exchangers to be continuously produced comprises:

determining a time t3 for producing the indoor units and a time t4 for producing the outdoor units according to the air conditioner model to be produced, and determining the n by dividing the time t4 for the outdoor units by the time t3 for the indoor units and then performing rounding; or determining the number n of indoor heat exchangers to be continuously produced as being a number n of the indoor units included in one set of air conditioner system;

wherein, when the production flow is to produce an outdoor heat exchanger, the outdoor heat exchanger fin production unit is controlled to produce an outdoor heat exchanger fin, a pipe bending unit of the general production units cuts a tube through a first cutting station, an operating frequency of a pipe expansion unit of the general production units is a first frequency, and the bending unit bends the unbent outdoor heat exchanger;

when the production flow is to produce an indoor heat exchanger, the indoor heat exchanger fin production unit is controlled to produce an indoor heat exchanger fin, the pipe bending unit of the general production units cuts a tube through a second cutting station, the operating frequency of the pipe expansion unit of the general production units is a second frequency, and the bending unit do not work;

wherein the second frequency is less than the first frequency;

wherein the acquiring the air conditioner demand information comprises:

acquiring an order, and acquiring the air conditioner demand information according to the order;

and/or, predicting air conditioner demand information for a future time period based on historical data;

wherein, the crane of the conveying system identifies a storage position of a material and loads the material;

the crane identifies a position of a target unit shelf, and transfers a material to the target unit shelf;

a material quantity on the unit shelf is detected, and the conveying system is controlled to convey a material when the material quantity is lower than a threshold;

wherein when a detection result of a detection unit is unqualified, the conveying system conveys materials before the detection unit and re-produces the material before the detection unit, comprises:

detecting, by a detection unit, components within the production system;

when the detection unit detects an unqualified product, outputting the unqualified product from the production flow through the unqualified conveyor line, and transmitting unqualification information to the control system;

in response to the unqualification information, the control system instructing the conveying system to supplement production materials for an upstream process associated with the detection unit; and after a planned production number of the current production flow is finished, starting a supplementary production flow to re-produce components corresponding to the unqualified components by using the supplemented production materials;

wherein the conveying system transmits the conveyed material information to the control system;

an end plate information creating unit of the heat exchanger general production system uses a unique identification of each end plate to form end plate information and create the end plate information onto the end plate; the control system acquires the end plate information;

a support plate information creating unit of the indoor unit production system or the outdoor unit production system forms a unique identification of each support plate as support plate information and create the support plate information onto the support plate; the control system acquires the support plate information;

the control system associates the end plate information, the support plate information and the conveyed material information, and records production product information and production process information;

wherein the control system transmits the conveyed material information to an end plate information creating unit, and the end plate information creating unit uses the material information and a unique identification of each end plate to from end plate information and create the end plate information onto the end plate;

wherein operation state information of an equipment of the production unit is detected;

an equipment failure is determined or predicted according to the operation state information;

wherein a unit lighting equipment of the production unit is controlled to be in a normally-off state; and when the equipment failure of the production unit is determined or predicted, the unit lighting equipment corresponding to the production unit is controlled to light up.

\* \* \* \* \*